(12) United States Patent
Sutherland et al.

(10) Patent No.: US 12,393,677 B2
(45) Date of Patent: Aug. 19, 2025

(54) SYSTEMS AND METHODS FOR METADATA CLASSIFICATION

(71) Applicant: Dover Microsystems, Inc., Wayland, MA (US)

(72) Inventors: Andrew Sutherland, Portland, OR (US); Steven Milburn, Cranston, RI (US); Gregory T. Sullivan, Auburndale, MA (US); Eli Boling, Manchester, MA (US)

(73) Assignee: Dover Microsystems, Inc., Wayland, MA (US)

( * ) Notice: Subject to any disclaimer, the term of this patent is extended or adjusted under 35 U.S.C. 154(b) by 626 days.

(21) Appl. No.: 17/423,701

(22) PCT Filed: Jan. 15, 2020

(86) PCT No.: PCT/US2020/013678
§ 371 (c)(1),
(2) Date: Jul. 16, 2021

(87) PCT Pub. No.: WO2020/150351
PCT Pub. Date: Jul. 23, 2020

(65) Prior Publication Data
US 2022/0092173 A1 Mar. 24, 2022

Related U.S. Application Data

(60) Provisional application No. 62/794,499, filed on Jan. 18, 2019.

(51) Int. Cl.
*G06F 21/54* (2013.01)
*G06F 21/12* (2013.01)
(Continued)

(52) U.S. Cl.
CPC ............ *G06F 21/54* (2013.01); *G06F 21/125* (2013.01); *G06F 21/51* (2013.01); *G06F 21/6209* (2013.01); *G06F 21/78* (2013.01)

(58) Field of Classification Search
CPC ........ G06F 21/54; G06F 21/125; G06F 21/51; G06F 21/6209; G06F 21/78
See application file for complete search history.

(56) References Cited

U.S. PATENT DOCUMENTS 5,377,336 A  12/1994 Eickemeyer et al.
5,488,730 A   1/1996 Brown, III et al.
(Continued)

FOREIGN PATENT DOCUMENTS

CN    101558388 A    10/2009
CN    102160033 A     8/2011
(Continued)

OTHER PUBLICATIONS

International Search Report and Written Opinion for International Application No. PCT/US2022/042492 mailed Jan. 11, 2023.
(Continued)

*Primary Examiner* — Matthew T Henning
(74) *Attorney, Agent, or Firm* — Wolf, Greenfield & Sacks, P.C.

(57) ABSTRACT

Systems and methods for metadata processing. In some embodiments, one or more metadata inputs may be processed to determine whether to allow an instruction. For instance, one or more classification bits may be identified from a metadata input of the one or more metadata inputs, and the metadata input may be processed based on the one or more classification bits.

23 Claims, 13 Drawing Sheets

(51) Int. Cl.
  *G06F 21/51* (2013.01)
  *G06F 21/62* (2013.01)
  *G06F 21/78* (2013.01)

(56) References Cited

U.S. PATENT DOCUMENTS

| | | |
|---|---|---|
| 5,521,910 A | 5/1996 | Matthews |
| 5,559,952 A | 9/1996 | Fujimoto |
| 5,655,100 A | 8/1997 | Ebrahim et al. |
| 5,664,197 A | 9/1997 | Kardach et al. |
| 5,664,223 A | 9/1997 | Bender et al. |
| 5,684,977 A | 11/1997 | Van Loo et al. |
| 5,764,946 A | 6/1998 | Tran et al. |
| 5,778,423 A | 7/1998 | Sites et al. |
| 5,848,433 A | 12/1998 | Tran et al. |
| 5,890,008 A | 3/1999 | Panwar et al. |
| 5,941,981 A | 8/1999 | Tran |
| 6,014,734 A | 1/2000 | Tran et al. |
| 6,035,374 A | 3/2000 | Panwar et al. |
| 6,058,466 A | 5/2000 | Panwar et al. |
| 6,240,502 B1 | 5/2001 | Panwar et al. |
| 6,269,436 B1 | 7/2001 | Tran et al. |
| 6,298,432 B1 | 10/2001 | Goto |
| 6,321,297 B1 | 11/2001 | Shamanna et al. |
| 6,324,599 B1 | 11/2001 | Zhou et al. |
| 6,351,784 B1 | 2/2002 | Neal et al. |
| 6,438,673 B1 | 8/2002 | Jourdan et al. |
| 6,449,714 B1 | 9/2002 | Sinharoy |
| 6,549,903 B1 | 4/2003 | Babaian et al. |
| 6,549,959 B1 | 4/2003 | Yates et al. |
| 6,622,182 B1 | 9/2003 | Miller et al. |
| 6,625,146 B1 | 9/2003 | Merchant et al. |
| 6,636,523 B1 | 10/2003 | Lau et al. |
| 6,748,589 B1 | 6/2004 | Johnson et al. |
| 6,922,740 B2 | 7/2005 | Kondratiev et al. |
| 6,976,147 B1 | 12/2005 | Isaac et al. |
| 7,047,394 B1 | 5/2006 | Van Dyke et al. |
| 7,058,918 B2 | 6/2006 | Abramovici et al. |
| 7,095,783 B1 | 8/2006 | Sotheran et al. |
| 7,137,086 B2 | 11/2006 | Abramovici |
| 7,146,548 B1 | 12/2006 | Abramovici |
| 7,213,247 B1 | 5/2007 | Wilner et al. |
| 7,263,572 B2 | 8/2007 | Hiji |
| 7,296,201 B2 | 11/2007 | Abramovici |
| 7,301,541 B2 | 11/2007 | Hansen et al. |
| 7,305,635 B1 | 12/2007 | Abramovici et al. |
| 7,313,820 B2 | 12/2007 | Kilroy |
| 7,340,469 B1 | 3/2008 | Alghathbar et al. |
| 7,348,796 B2 | 3/2008 | Crouch et al. |
| 7,426,705 B1 | 9/2008 | Kolaric |
| 7,430,650 B1 | 9/2008 | Ross |
| 7,434,002 B1 | 10/2008 | Zedlewski et al. |
| 7,467,414 B2 | 12/2008 | Schlesinger |
| 7,487,264 B2 | 2/2009 | Pandya |
| 7,493,247 B2 | 2/2009 | Memmi |
| 7,493,434 B1 | 2/2009 | Abramovici |
| 7,574,536 B2 | 8/2009 | Johnsen et al. |
| 7,580,914 B2 | 8/2009 | Wang et al. |
| 7,581,064 B1 | 8/2009 | Zedlewski et al. |
| 7,631,107 B2 | 12/2009 | Pandya |
| 7,688,838 B1 | 3/2010 | Aloni et al. |
| 7,698,402 B2 | 4/2010 | Santos et al. |
| 7,813,342 B2 | 10/2010 | Gadelrab |
| 7,886,148 B2 | 2/2011 | Kiriansky et al. |
| 8,074,052 B2 | 12/2011 | Iadonato et al. |
| 8,121,828 B2 | 2/2012 | Yates, Jr. et al. |
| 8,127,121 B2 | 2/2012 | Yates, Jr. et al. |
| 8,131,663 B1 | 3/2012 | Taylor |
| 8,131,762 B2 | 3/2012 | Smetters et al. |
| 8,166,404 B2 | 4/2012 | Grinstein |
| 8,181,219 B2 | 5/2012 | Golan et al. |
| 8,271,447 B1 | 9/2012 | Natanzon et al. |
| 8,326,774 B2 | 12/2012 | Candelore |
| 8,335,754 B2 | 12/2012 | Dawson et al. |
| 8,346,760 B2 | 1/2013 | Wang et al. |
| 8,364,910 B2 | 1/2013 | Wilkerson et al. |
| 8,380,933 B2 | 2/2013 | Uchiyama |
| 8,423,720 B2 | 4/2013 | Döring |
| 8,516,193 B1 | 8/2013 | Clinton et al. |
| 8,543,606 B2 | 9/2013 | Pulfer et al. |
| 8,572,410 B1 | 10/2013 | Tkacik et al. |
| 8,677,457 B2 | 3/2014 | Fullerton |
| 8,701,200 B2 | 4/2014 | Naldurg et al. |
| 8,738,860 B1 | 5/2014 | Griffin et al. |
| 8,756,185 B2 | 6/2014 | Dawson et al. |
| 8,788,792 B2 | 7/2014 | Yates, Jr. et al. |
| 8,826,391 B2 | 9/2014 | Tkacik et al. |
| 8,843,734 B2 | 9/2014 | Lim |
| 8,874,850 B1 | 10/2014 | Goodson et al. |
| 8,875,170 B1 | 10/2014 | Daniel |
| 8,887,230 B2 | 11/2014 | Barton et al. |
| 8,904,477 B2 | 12/2014 | Barton et al. |
| 8,938,783 B2 | 1/2015 | Becker et al. |
| 9,026,733 B1 | 5/2015 | Clinton et al. |
| 9,047,178 B2 | 6/2015 | Talagala et al. |
| 9,087,200 B2 | 7/2015 | McKeen et al. |
| 9,165,078 B2 | 10/2015 | Bester et al. |
| 9,208,082 B1 | 12/2015 | Cheriton et al. |
| 9,219,752 B2 | 12/2015 | Balinksy et al. |
| 9,251,052 B2 | 2/2016 | Talagala et al. |
| 9,311,093 B2 | 4/2016 | Gschwind et al. |
| 9,317,708 B2 | 4/2016 | Lee et al. |
| 9,323,684 B2 | 4/2016 | Koker et al. |
| 9,467,474 B2 | 10/2016 | Barton et al. |
| 9,507,589 B2 | 11/2016 | Rao et al. |
| 9,507,598 B1 | 11/2016 | Bonnano et al. |
| 9,513,884 B2 | 12/2016 | Bates et al. |
| 9,525,606 B1 | 12/2016 | Staggs et al. |
| 9,571,509 B1 | 2/2017 | Satish et al. |
| 9,576,147 B1 | 2/2017 | McClintock et al. |
| 9,665,603 B2 | 5/2017 | Bester et al. |
| 9,680,736 B2 | 6/2017 | Kamboh |
| 9,680,738 B2 | 6/2017 | Jackson et al. |
| 9,703,956 B1 | 7/2017 | Watson et al. |
| 9,736,185 B1 | 8/2017 | Belamaric et al. |
| 9,785,440 B2 | 10/2017 | DeHon |
| 9,792,472 B1 | 10/2017 | Robshaw et al. |
| 9,906,557 B2 | 2/2018 | Hsiung et al. |
| 9,953,095 B1 | 4/2018 | Scott et al. |
| 10,073,977 B2 | 9/2018 | Pappachan et al. |
| 10,078,763 B2 | 9/2018 | Chiricescu et al. |
| 10,114,958 B2 | 10/2018 | Sell |
| 10,133,866 B1 | 11/2018 | Kumar et al. |
| 10,152,330 B2 | 12/2018 | Chiricescu et al. |
| 10,235,176 B2 | 3/2019 | DeHon et al. |
| 10,261,794 B2 | 4/2019 | DeHon |
| 10,424,043 B1 | 9/2019 | Koston et al. |
| 10,503,904 B1 | 12/2019 | Singh et al. |
| 10,521,230 B2 | 12/2019 | DeHon |
| 10,545,760 B2 | 1/2020 | DeHon |
| 10,642,616 B2 | 5/2020 | DeHon et al. |
| 10,642,753 B1 | 5/2020 | Steinberg |
| 10,719,630 B2 | 7/2020 | Chiricescu et al. |
| 10,725,778 B2 | 7/2020 | DeHon et al. |
| 10,754,650 B2 | 8/2020 | DeHon et al. |
| 10,936,713 B2 | 3/2021 | DeHon et al. |
| 11,150,910 B2 | 10/2021 | Milburn et al. |
| 11,182,162 B2 | 11/2021 | DeHon et al. |
| 11,340,902 B2 | 5/2022 | DeHon |
| 11,417,109 B1 | 8/2022 | Theimer et al. |
| 11,507,373 B2 | 11/2022 | Dehon et al. |
| 11,556,664 B2 | 1/2023 | Levy et al. |
| 11,635,960 B2 | 4/2023 | DeHon |
| 11,841,956 B2 * | 12/2023 | Sullivan .............. G06F 21/602 |
| 12,079,197 B2 * | 9/2024 | Boling ................ G06F 9/30101 |
| 2002/0083298 A1 | 6/2002 | Cook et al. |
| 2002/0087795 A1 | 7/2002 | Hum et al. |
| 2002/0124156 A1 | 9/2002 | Yoaz et al. |
| 2003/0014466 A1 | 1/2003 | Berger et al. |
| 2003/0023783 A1 | 1/2003 | Arimilli et al. |
| 2003/0058889 A1 | 3/2003 | Lansing et al. |
| 2003/0120892 A1 | 6/2003 | Hum et al. |
| 2003/0145235 A1 | 7/2003 | Choo |
| 2003/0149895 A1 | 8/2003 | Choo et al. |

(56) References Cited

U.S. PATENT DOCUMENTS

| | | |
|---|---|---|
| 2003/0172109 A1 | 9/2003 | Dalton et al. |
| 2003/0196108 A1 | 10/2003 | Kung |
| 2004/0015845 A1 | 1/2004 | Hickman |
| 2004/0117599 A1 | 6/2004 | Mittal et al. |
| 2004/0133777 A1 | 7/2004 | Kiriansky et al. |
| 2004/0236876 A1 | 11/2004 | Kondratiev et al. |
| 2004/0255267 A1 | 12/2004 | Meijer |
| 2005/0055565 A1 | 3/2005 | Fournet et al. |
| 2005/0108518 A1 | 5/2005 | Pandya |
| 2005/0149521 A1 | 7/2005 | Wang et al. |
| 2005/0149719 A1 | 7/2005 | Kilroy |
| 2005/0154838 A1 | 7/2005 | DeWitt et al. |
| 2005/0182667 A1 | 8/2005 | Metzger et al. |
| 2006/0004548 A1 | 1/2006 | Santos et al. |
| 2006/0059567 A1 | 3/2006 | Bird et al. |
| 2006/0080489 A1 | 4/2006 | Hiji |
| 2006/0080553 A1 | 4/2006 | Hall |
| 2006/0090084 A1 | 4/2006 | Buer |
| 2006/0112261 A1 | 5/2006 | Yourst et al. |
| 2006/0143689 A1 | 6/2006 | Yu et al. |
| 2006/0242332 A1 | 10/2006 | Johnsen et al. |
| 2006/0277392 A1 | 12/2006 | Bittner |
| 2007/0006294 A1 | 1/2007 | Hunter |
| 2007/0050586 A1 | 3/2007 | Shin et al. |
| 2007/0226365 A1 | 9/2007 | Hildreth et al. |
| 2007/0239861 A1 | 10/2007 | Reeves et al. |
| 2007/0261033 A1 | 11/2007 | Chen et al. |
| 2007/0279264 A1 | 12/2007 | Nakagawa |
| 2008/0010233 A1 | 1/2008 | Sack et al. |
| 2008/0016547 A1 | 1/2008 | Anderson et al. |
| 2008/0028196 A1 | 1/2008 | Kailas |
| 2008/0052488 A1 | 2/2008 | Fritz et al. |
| 2008/0066160 A1 | 3/2008 | Becker et al. |
| 2008/0083298 A1 | 4/2008 | Lin |
| 2008/0126841 A1 | 5/2008 | Benhanokh et al. |
| 2008/0140737 A1 | 6/2008 | Garst et al. |
| 2008/0168529 A1 | 7/2008 | Anderson et al. |
| 2008/0201333 A1 | 8/2008 | Rowley |
| 2008/0216073 A1 | 9/2008 | Yates et al. |
| 2008/0216102 A1 | 9/2008 | Quinn |
| 2008/0222397 A1 | 9/2008 | Wilkerson et al. |
| 2008/0240111 A1 | 10/2008 | Gadelrab |
| 2008/0244232 A1 | 10/2008 | Sherman et al. |
| 2008/0248599 A1 | 10/2008 | Jaiswal et al. |
| 2008/0250216 A1 | 10/2008 | Kershaw et al. |
| 2008/0282040 A1 | 11/2008 | Doring |
| 2008/0282093 A1 | 11/2008 | Hatakeyama |
| 2008/0288941 A1 | 11/2008 | Adams et al. |
| 2008/0301256 A1 | 12/2008 | McWilliams et al. |
| 2008/0301471 A1 | 12/2008 | Demarest et al. |
| 2008/0320235 A1 | 12/2008 | Beckmann et al. |
| 2009/0006519 A1 | 1/2009 | Nandan et al. |
| 2009/0063951 A1 | 3/2009 | Rjaibi et al. |
| 2009/0097815 A1 | 4/2009 | Lahr et al. |
| 2009/0113110 A1 | 4/2009 | Chen et al. |
| 2009/0113132 A1 | 4/2009 | Cain, III et al. |
| 2009/0113135 A1 | 4/2009 | Cain et al. |
| 2009/0144388 A1 | 6/2009 | Gross et al. |
| 2009/0164705 A1 | 6/2009 | Gorobets |
| 2009/0164766 A1 | 6/2009 | Suggs et al. |
| 2009/0165078 A1 | 6/2009 | Samudrala et al. |
| 2009/0178102 A1 | 7/2009 | Alghathbar et al. |
| 2009/0204785 A1 | 8/2009 | Yates, Jr. et al. |
| 2009/0241097 A1 | 9/2009 | Wang et al. |
| 2009/0254543 A1 | 10/2009 | Ber et al. |
| 2009/0254572 A1 | 10/2009 | Redlich et al. |
| 2010/0011209 A1 | 1/2010 | Kiriansky et al. |
| 2010/0011446 A1 | 1/2010 | Klucher et al. |
| 2010/0022869 A1 | 1/2010 | Kimura |
| 2010/0049974 A1 | 2/2010 | Winjum et al. |
| 2010/0138613 A1 | 6/2010 | Parker |
| 2010/0154026 A1 | 6/2010 | Chatterjee et al. |
| 2010/0169382 A1 | 7/2010 | Sheaffer et al. |
| 2010/0191922 A1 | 7/2010 | Dickey et al. |
| 2010/0228693 A1 | 9/2010 | Dawson et al. |
| 2010/0235580 A1 | 9/2010 | Bouvier |
| 2010/0250729 A1 | 9/2010 | Morris |
| 2010/0332456 A1 | 12/2010 | Prahlad et al. |
| 2010/0332716 A1 | 12/2010 | Sheaffer et al. |
| 2011/0016295 A1 | 1/2011 | Catherwood et al. |
| 2011/0078389 A1 | 3/2011 | Patel et al. |
| 2011/0099336 A1 | 4/2011 | Yasufuku et al. |
| 2011/0126265 A1 | 5/2011 | Fullerton |
| 2011/0161623 A1 | 6/2011 | Eichenberger et al. |
| 2011/0219424 A1 | 9/2011 | Panasyuk et al. |
| 2011/0238805 A1 | 9/2011 | Signori |
| 2012/0036507 A1 | 2/2012 | Jonnala et al. |
| 2012/0079458 A1 | 3/2012 | Williams et al. |
| 2012/0117610 A1 | 5/2012 | Pandya |
| 2012/0144167 A1 | 6/2012 | Yates, Jr. et al. |
| 2012/0151184 A1 | 6/2012 | Wilkerson et al. |
| 2012/0180031 A1 | 7/2012 | Eichenberger et al. |
| 2012/0203970 A1 | 8/2012 | Biran et al. |
| 2012/0210066 A1 | 8/2012 | Joshi et al. |
| 2012/0210068 A1 | 8/2012 | Joshi et al. |
| 2012/0233212 A1 | 9/2012 | Newton et al. |
| 2012/0236756 A1 | 9/2012 | Bennett et al. |
| 2012/0255018 A1 | 10/2012 | Sallam |
| 2012/0297057 A1 | 11/2012 | Ghosh et al. |
| 2013/0006993 A1 | 1/2013 | Kobayashi |
| 2013/0010779 A1 | 1/2013 | Fischer et al. |
| 2013/0016075 A1 | 1/2013 | Kim et al. |
| 2013/0047142 A1 | 2/2013 | Bates et al. |
| 2013/0067593 A1 | 3/2013 | Candelore |
| 2013/0081134 A1 | 3/2013 | Glew et al. |
| 2013/0097369 A1 | 4/2013 | Talagala et al. |
| 2013/0097421 A1 | 4/2013 | Lim |
| 2013/0097667 A1 | 4/2013 | Pulfer et al. |
| 2013/0138892 A1 | 5/2013 | Loh et al. |
| 2013/0159726 A1 | 6/2013 | McKeen et al. |
| 2013/0160075 A1 | 6/2013 | Schlesinger et al. |
| 2013/0160775 A1 | 6/2013 | Curnow |
| 2013/0185475 A1 | 7/2013 | Talagala et al. |
| 2013/0185488 A1 | 7/2013 | Talagala et al. |
| 2013/0212321 A1 | 8/2013 | Talagala et al. |
| 2013/0227218 A1 | 8/2013 | Chang et al. |
| 2013/0254838 A1 | 9/2013 | Ahuja et al. |
| 2013/0275656 A1 | 10/2013 | Talagala et al. |
| 2013/0283017 A1 | 10/2013 | Wilkerson et al. |
| 2013/0290607 A1 | 10/2013 | Chang et al. |
| 2013/0312099 A1 | 11/2013 | Edwards et al. |
| 2013/0326117 A1 | 12/2013 | Aune |
| 2014/0006804 A1 | 1/2014 | Tkacik et al. |
| 2014/0019385 A1 | 1/2014 | Dawson et al. |
| 2014/0047181 A1 | 2/2014 | Peterson et al. |
| 2014/0047183 A1 | 2/2014 | Chawla et al. |
| 2014/0101396 A1 | 4/2014 | Bonanno et al. |
| 2014/0140342 A1 | 5/2014 | Narad |
| 2014/0173211 A1 | 6/2014 | Loh et al. |
| 2014/0223445 A1 | 8/2014 | Beckmann et al. |
| 2014/0280248 A1 | 9/2014 | Bester et al. |
| 2014/0281192 A1 | 9/2014 | Gilda et al. |
| 2014/0282832 A1 | 9/2014 | Chanoch et al. |
| 2014/0283040 A1 | 9/2014 | Wilkerson et al. |
| 2014/0283107 A1 | 9/2014 | Walton et al. |
| 2015/0012689 A1 | 1/2015 | Atkisson et al. |
| 2015/0046658 A1 | 2/2015 | Wilson |
| 2015/0058997 A1 | 2/2015 | Lee et al. |
| 2015/0089186 A1 | 3/2015 | Kim et al. |
| 2015/0092778 A1 | 4/2015 | Jackson et al. |
| 2015/0120699 A1 | 4/2015 | Faerber et al. |
| 2015/0149673 A1 | 5/2015 | Balkan et al. |
| 2015/0205535 A1 | 7/2015 | Joshi et al. |
| 2015/0220453 A1 | 8/2015 | Heisswolf et al. |
| 2015/0249668 A1 | 9/2015 | Reddy et al. |
| 2015/0278311 A1 | 10/2015 | Isherwood et al. |
| 2015/0339062 A1 | 11/2015 | Toyoda et al. |
| 2015/0339329 A1 | 11/2015 | Bester et al. |
| 2015/0378780 A1 | 12/2015 | Busaba et al. |
| 2015/0381660 A1 | 12/2015 | Hsiung et al. |
| 2016/0048551 A1 | 2/2016 | Baldwin et al. |
| 2016/0062803 A1 | 3/2016 | Beckmann et al. |
| 2016/0077816 A1 | 3/2016 | Eilam et al. |
| 2016/0092702 A1 | 3/2016 | Durham et al. |

(56) References Cited

U.S. PATENT DOCUMENTS

| | | |
|---|---|---|
| 2016/0132536 A1 | 5/2016 | Lee |
| 2016/0140363 A1 | 5/2016 | Chiricescu et al. |
| 2016/0154833 A1 | 6/2016 | Isherwood, Jr. et al. |
| 2016/0170769 A1 | 6/2016 | LeMay |
| 2016/0182408 A1 | 6/2016 | Jani et al. |
| 2016/0188891 A1 | 6/2016 | Schlesinger et al. |
| 2016/0196432 A1 | 7/2016 | Main et al. |
| 2016/0239223 A9 | 8/2016 | Joshi et al. |
| 2016/0274810 A1 | 9/2016 | Godard et al. |
| 2016/0335187 A1 | 11/2016 | Greenspan et al. |
| 2016/0350019 A1 | 12/2016 | Koufaty et al. |
| 2016/0350230 A1 | 12/2016 | Murphy |
| 2016/0366102 A1 | 12/2016 | Smith |
| 2016/0371496 A1 | 12/2016 | Sell |
| 2017/0024568 A1 | 1/2017 | Pappachan et al. |
| 2017/0031708 A1 | 2/2017 | Chen et al. |
| 2017/0048249 A1 | 2/2017 | Berrangé |
| 2017/0061160 A1 | 3/2017 | Simonov et al. |
| 2017/0083338 A1 | 3/2017 | Burger et al. |
| 2017/0091107 A1 | 3/2017 | Peterson et al. |
| 2017/0126687 A1 | 5/2017 | Martinelli |
| 2017/0126738 A1 | 5/2017 | Wilkerson et al. |
| 2017/0177367 A1 | 6/2017 | DeHon |
| 2017/0177368 A1 | 6/2017 | DeHon et al. |
| 2017/0192986 A1 | 7/2017 | Isherwood et al. |
| 2017/0220806 A1 | 8/2017 | Munoz et al. |
| 2017/0235840 A1 | 8/2017 | Bester et al. |
| 2017/0286119 A1 | 10/2017 | Al Sheikh et al. |
| 2017/0286151 A1 | 10/2017 | Landers et al. |
| 2017/0293563 A1 | 10/2017 | DeHon et al. |
| 2017/0308480 A1 | 10/2017 | Wilson |
| 2017/0329961 A1 | 11/2017 | Shanbhogue et al. |
| 2018/0011708 A1 | 1/2018 | DeHon |
| 2018/0046579 A1 | 2/2018 | Greenspan et al. |
| 2018/0082055 A1 | 3/2018 | Fleming et al. |
| 2018/0121650 A1 | 5/2018 | Brown |
| 2018/0143890 A1 | 5/2018 | Ogawa et al. |
| 2018/0189062 A1 | 7/2018 | Baghsorkhi et al. |
| 2018/0276085 A1 | 9/2018 | Mitkar et al. |
| 2018/0302443 A1 | 10/2018 | Weiss et al. |
| 2018/0336031 A1 | 11/2018 | DeHon et al. |
| 2018/0336032 A1 | 11/2018 | DeHon et al. |
| 2018/0336033 A1 | 11/2018 | DeHon |
| 2018/0341490 A1 | 11/2018 | DeHon |
| 2019/0034665 A1 | 1/2019 | Chiricescu et al. |
| 2019/0141059 A1 | 5/2019 | Shimizu et al. |
| 2019/0155606 A1 | 5/2019 | Rotem et al. |
| 2019/0171457 A1 | 6/2019 | DeHon et al. |
| 2019/0205244 A1 | 7/2019 | Smith |
| 2019/0213322 A1 | 7/2019 | DeHon et al. |
| 2019/0236272 A1 | 8/2019 | Piatt |
| 2019/0243655 A1 | 8/2019 | Milburn et al. |
| 2019/0243768 A1 | 8/2019 | Doshi et al. |
| 2019/0354675 A1 | 11/2019 | Gan et al. |
| 2019/0384604 A1 | 12/2019 | DeHon et al. |
| 2019/0392146 A1 | 12/2019 | Gezalov et al. |
| 2019/0392147 A1 | 12/2019 | Gezalov et al. |
| 2020/0089500 A1 | 3/2020 | DeHon |
| 2020/0125502 A1 | 4/2020 | Durham et al. |
| 2020/0201576 A1 | 6/2020 | Yudanov et al. |
| 2020/0387374 A1* | 12/2020 | DeHon ................ G06F 9/3867 |
| 2020/0387384 A1 | 12/2020 | Huang |
| 2021/0004231 A1 | 1/2021 | DeHon |
| 2021/0026934 A1 | 1/2021 | Boling et al. |
| 2021/0042100 A1 | 2/2021 | Boling et al. |
| 2021/0055954 A1 | 2/2021 | Milburn et al. |
| 2021/0073375 A1 | 3/2021 | Milburn et al. |
| 2021/0075797 A1 | 3/2021 | Gan et al. |
| 2021/0255890 A1 | 8/2021 | Milburn et al. |
| 2021/0406028 A1 | 12/2021 | Boling et al. |
| 2021/0406137 A1 | 12/2021 | Sutherland et al. |
| 2022/0012329 A1 | 1/2022 | Boling et al. |
| 2022/0043654 A1 | 2/2022 | DeHon et al. |
| 2022/0050904 A1 | 2/2022 | Sullivan et al. |
| 2022/0129343 A1 | 4/2022 | Milburn et al. |
| 2022/0198014 A1 | 6/2022 | Boling et al. |
| 2022/0300583 A1 | 9/2022 | Boling et al. |
| 2022/0309134 A1 | 9/2022 | Boling et al. |
| 2022/0374415 A1 | 11/2022 | Boling et al. |
| 2022/0398312 A1 | 12/2022 | Sutherland et al. |
| 2023/0054942 A1 | 2/2023 | Milburn et al. |

FOREIGN PATENT DOCUMENTS

| | | |
|---|---|---|
| CN | 103282889 A | 9/2013 |
| CN | 104657500 A | 5/2015 |
| CN | 104794067 A | 7/2015 |
| GB | 2519608 A | 4/2015 |
| JP | 2013-242633 A | 12/2013 |
| TW | 201333722 A | 8/2013 |
| TW | 201729068 A | 8/2017 |
| TW | 201737675 A | 10/2017 |
| WO | WO 92/03779 A1 | 3/1992 |
| WO | WO 2010/028316 A1 | 3/2010 |
| WO | WO 2015/047295 A1 | 4/2015 |
| WO | WO 2015/183481 A1 | 12/2015 |
| WO | WO 2017/106101 A1 | 6/2017 |
| WO | WO 2017/106103 A2 | 6/2017 |
| WO | WO 2017/221373 A1 | 12/2017 |
| WO | WO 2019/152772 A1 | 8/2019 |
| WO | WO 2019/152792 A1 | 8/2019 |
| WO | WO 2019/152795 A1 | 8/2019 |
| WO | WO 2019/152805 A1 | 8/2019 |
| WO | WO 2019/152822 A1 | 8/2019 |
| WO | WO 2019/213061 A1 | 11/2019 |
| WO | WO 2020/097177 A1 | 5/2020 |
| WO | WO 2020/097179 A1 | 5/2020 |
| WO | WO 2020/102064 A1 | 5/2020 |
| WO | WO 2020/132012 A1 | 6/2020 |
| WO | WO 2020/150351 A1 | 7/2020 |
| WO | WO 2021/076871 A1 | 4/2021 |
| WO | WO 2021/092138 A1 | 5/2021 |

OTHER PUBLICATIONS

International Search Report and Written Opinion for International Application No. PCT/US2019/016242 mailed Mar. 29, 2019.
International Search Report and Written Opinion for International Application No. PCT/US2016/066194 mailed Apr. 7, 2017.
International Search Report and Written Opinion for International Application No. PCT/US2016/066188 mailed Jul. 13, 2017.
Invitation to Pay Additional Fees for International Application No. PCT/US2019/016295 mailed May 3, 2019.
International Search Report and Written Opinion for International Application No. PCT/US2019/016295 mailed Jun. 26, 2019.
International Preliminary Report on Patentability for International Application No. PCT/US2019/016295 mailed Aug. 13, 2020.
International Search Report and Written Opinion for International Application No. PCT/US2019/016276 mailed Apr. 26, 2019.
International Search Report and Written Opinion for International Application No. PCT/US2019/029880 mailed Aug. 8, 2019.
International Search Report and Written Opinion for International Application No. PCT/US2019/016317 mailed Apr. 16, 2019.
International Search Report and Written Opinion for International Application No. PCT/US2020/059057 mailed Feb. 8, 2021.
International Search Report and Written Opinion for International Application No. PCT/US2019/060030 mailed May 20, 2021.
International Search Report and Written Opinion for International Application No. PCT/US2019/060698 mailed May 20, 2021.
International Search Report and Written Opinion for International Application No. PCT/US2019/067084 mailed Jul. 1, 2021.
International Search Report and Written Opinion for International Application No. PCT/US2019/013678 mailed Jul. 29, 2021.
Invitation to Pay Additional Fees for International Application No. PCT/US2019/013678 mailed Apr. 15, 2020.
International Search Report and Written Opinion for International Application No. PCT/US2021/020602 mailed May 11, 2021.
International Search Report and Written Opinion for International Application No. PCT/US2020/055952 mailed Jan. 28, 2021.

(56) References Cited

OTHER PUBLICATIONS

International Preliminary Report on Patentability for International Application No. PCT/US2019/060028 mailed May 20, 2021.
International Search Report and Written Opinion for International Application No. PCT/US2019/060028 mailed Mar. 23, 2020.
International Search Report and Written Opinion for International Application No. PCT/US2019/016272 mailed Apr. 8, 2019.
International Preliminary Report on Patentability for International Application No. PCT/US2019/016272 mailed Aug. 13, 2020.
International Preliminary Report on Patentability for International Application No. PCT/US2019/016276 mailed Aug. 13, 2020.
International Preliminary Report on Patentability for International Application No. PCT/US2019/029880 mailed Nov. 12, 2020.
International Preliminary Report on Patentability for International Application No. PCT/US2019/016317 mailed Aug. 13, 2020.
International Preliminary Report on Patentability for International Application No. PCT/US2020/055952 mailed Aug. 13, 2020.
[No Author Listed], Arm Limited: AMBA® AXI™ and ACE™ Protocol Specification. Oct. 28, 2011:1-306. [https://capocaccia.ethz.ch/capo/raw-attachment/wiki/2014/microblaze14/AX14_specification.pdf.].
Alves-Foss et al., Evaluating the Use of Security Tags in Security Policy Enforcement Mechanisms. 2015 48th Hawaii International Conference on System Sciences Jan. 5, 2015:5201-10.
Berlekamp, Algebraic coding theory (revised edition). World Scientific; Mar. 26, 2015. 34 pages.
Calder et al., Process Algebra for Event-Driven Runtime Verification: A Case Study of Wireless Network Management. IFM LNCS 2012;21-23.
Dalton et al., Raksha: a flexible information flow architecture for software security. ACM Proceedings of the $34^{th}$ Annual International Symposium In Computer Architecture. Jun. 9, 2007;35(2):482-93.
Dalton et al., Real-World Buffer Overflow Protection for Userspace and Kernelspace. USENIX Security Symposium Jul. 28, 2008;395-410.
De Amorim et al., A verified information-flow architecture. Proceedings of the 41st ACM SIGPLAN-SIGACT Symposium on Principles of Programming Languages Jan. 8, 2014:165-78.
De Amorim et al., Micro-policies: Formally verified, tag-based security monitors. 2015 IEEE Symposium on Security and Privacy May 17, 2015:813-30.
Dehon et al., Dover A Metadata-Extended RISC-V. Jan. 6, 2016:34. [https://web.archive.org/web/20160331131339 if /http://riscv.org/wp-content/uploads/2016/01/Wed1430-dover riscv Jan2016 v3.pdf].
Dehon et al., Dover: A metadata-extended Risc-V. Risc-V Workshop Oracle Conference Center, Redwood Shores, CA. Jan. 6, 2016. 33 pages.
Dhawan et al., Architectural support for software-defined metadata processing. Proceedings of the Twentieth International Conference on Architectural Support for Programming Languages and Operating Systems (ASPLOS). Mar. 14, 2015:487-502.
Dhawan et al., Area-efficient near-associative memories on FPGAs. ACM Transactions on Reconfigurable Technology and Systems (TRETS). Jan. 23, 2015;7(4):1-22.
Dhawan et al., PUMP: a programmable unit for metadata processing. Proceedings of the Third Workshop on Hardware and Architectural Support for Security and Privacy (HASP). Jun. 15, 2014:1-8.
Engelke et al., Efficient LLVM-Based Dynamic Binary Translation. ACM VEE. Apr. 16, 2021;165-71.
Evans et al., Melding security metadata between software and hardware. Proceedings of the Posters and Demo Track Dec. 3, 2012:1-2.
Geater, Tee requirements for ISA. Thales eSecurity. 2018. 21 pages.
Hriţcu, Micro-policies: Formally verified, tag-based security monitors. Proceedings of the 10th ACM Workshop on Programming Languages and Analysis for Security Jul. 4, 2015.
Hunt et al., The Seven Properties of Highly Secure Devices. 2021. 10 pages.

Juglaret et al., Towards a fully abstract compiler using Micro-Policies: Secure compilation for mutually distrustful components. arXiv preprint arXiv:1510.00697. Oct. 2, 2015. 31 pages.
Kane, Runtime Monitoring for Safety-Critical Embedded Systems. Carnegie Mellon University. Feb. 2015;207 pages.
Kannan et al., Decoupling dynamic information flow tracking with a dedicated coprocessor. 2009 IEEE/IFIP International Conference on Dependable Systems & Networks. Jun. 29, 2009:105-14.
Mambretti et al., Trellis: Privilege separation for multi-user applications made easy. International Symposium on Research in Attacks, Intrusions, and Defenses. Springer, Cham. Sep. 19, 2016:437-56.
Nagarakatte et al., SoftBound: Highly Compatible and Complete Spatial Memory Safety for C. University of Pennsylvania Department of Computer and Information Science Technical Report. Jan. 2009. 12 pages.
Okhravi et al., One Giant Leap for Computer Security. IEEE Computer and Reliability Societies. Jul./Aug. 2020;18(4):8-19.
Ozsoy et al., SIFT: A low-overhead dynamic information flow tracking architecture for smt processors. Proceedings of the 8th ACM International Conference on Computing Frontiers. May 3, 2011:1-11.
Roessler et al., Protecting the stack with metadata policies and tagged hardware. 2018 IEEE Symposium on Security and Privacy (SP) May 20, 2018;478-95.
Song et al., Security tagging for a zero-kernel operating system. 2013 46th Hawaii International Conference on System Sciences Jan. 7, 2013:5049-58.
Song et al., The 4th lowRISC Release: Tagged Memory and Minion Core. University of Cambridge. May 2017. 20 pages. https://riscv.org/wp-content/uploads/2017/05/Wed0930riscv201705_ppt.pdf [Last accessed Mar. 31, 2022].
Suh et al., Secure Program Execution via Dynamic Information Flow Tracking. MIT CSAIL. Jul. 2003. 14 pages.
Sullivan et al., The dover inherently secure processor. 2017 IEEE International Symposium on Technologies for Homeland Security (HST) Apr. 25, 2017:1-5.
Tiwari et al., A small cache of large ranges: Hardware methods for efficiently searching, storing, and updating big dataflow tags. 2008 41st IEEE/ACM International Symposium on Microarchitecture Nov. 8, 2008:94-105.
Tiwari et al., Complete information flow tracking from the gates up. InProceedings of the 14th international conference on Architectural support for programming languages and operating systems Mar. 7, 2009;109-20.
Waterman et al., The RISC-V Instruction Set Manual, vol. I: Unprivileged ISA, Document Version 20191213. RISC-V Foundation. Dec. 2019. 238 pages.
Watson et al., Cheri: A hybrid capability-system architecture for scalable software compartmentalization. 2015 IEEE Symposium on Security and Privacy Sep. 2015;20-37.
Witchel et al., Mondrian Memory Protection. ASPLOS-X. 2002; 13 pages.
Woodruff, Cheri: A RISC capability machine for practical memory safety. University of Cambridge, Computer Laboratory; 2014. 112 pages.
Zeldovich et al., Hardware Enforcement of Application Security Policies Using Tagged Memory. USENIX Symposium on Operating Systems Design and Implementation. Dec. 8, 2008:8;225-40.
U.S. Appl. No. 17/880,539, filed Aug. 3, 2022, Milburn et al.
U.S. Appl. No. 17/908,879, filed Sep. 1, 2022, Milburn et al.
International Preliminary Report on Patentability for International Application No. PCT/US2020/059057, mailed May 19, 2022.
International Search Report and Written Opinion for International Application No. PCT/US2019/060030 mailed Mar. 19, 2020.
International Search Report and Written Opinion for International Application No. PCT/US2019/060698 mailed Feb. 3, 2020.
International Search Report and Written Opinion for International Application No. PCT/US2019/067084 mailed Mar. 19, 2020.
International Search Report and Written Opinion for International Application No. PCT/US2019/013678 mailed Jun. 23, 2020.
International Preliminary Report on Patentability for International Application No. PCT/US2021/020602, mailed Sep. 15, 2022.

(56) References Cited

OTHER PUBLICATIONS

International Preliminary Report on Patentability for International Application No. PCT/US2020/055952 mailed Apr. 28, 2022.
Mutlu, 18-447 Computer Architecture Lecture 11: Precise Exceptions, State Maintenance, State Recovery. Carnegie Mellon University Lecture. Feb. 11, 2015, 49 pages.

* cited by examiner

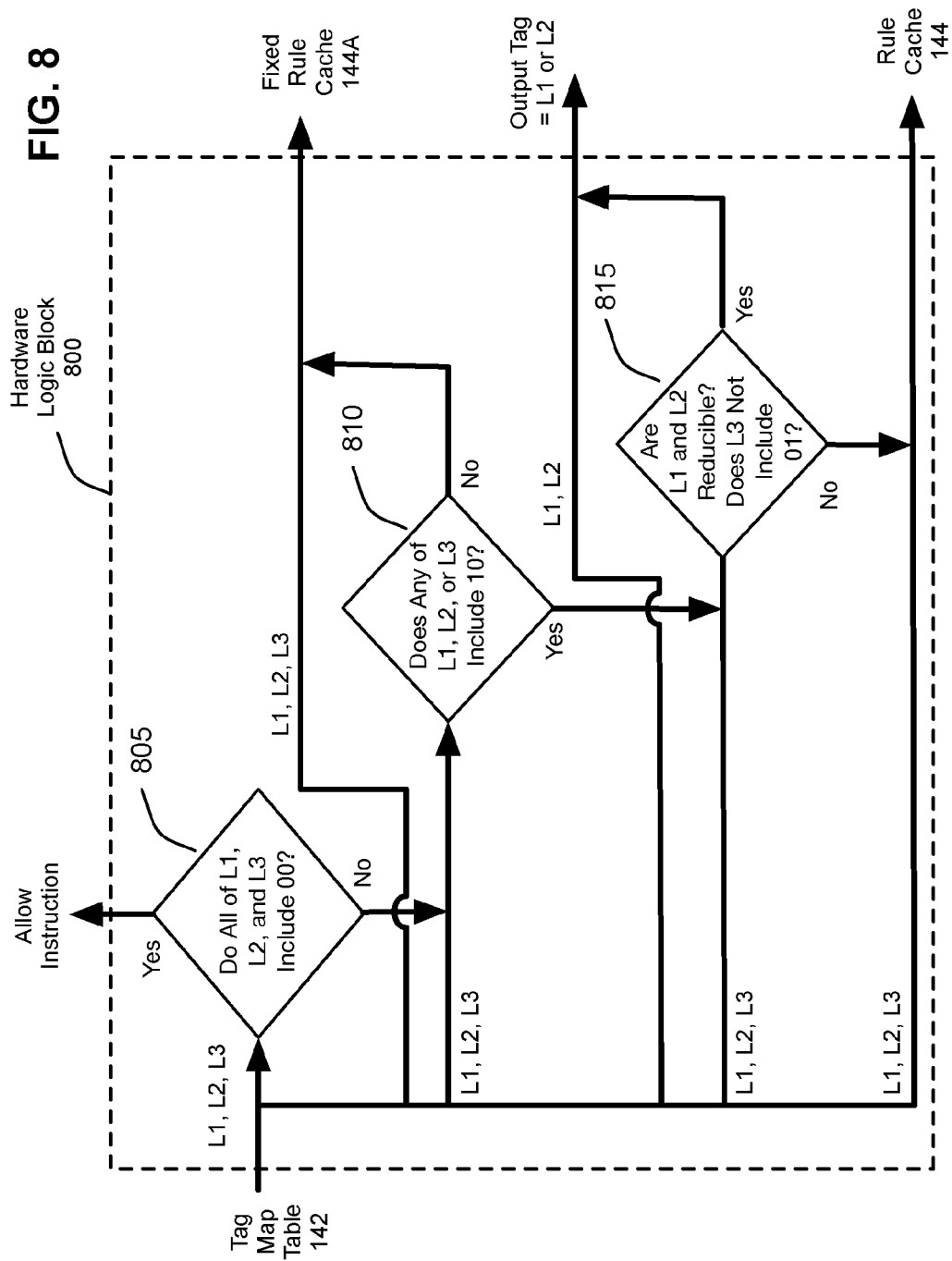

SYSTEMS AND METHODS FOR METADATA CLASSIFICATION

RELATED APPLICATIONS

This application is a national stage filing under 35 U.S.C. § 371 of International Patent Application Serial No. PCT/US2020/013678, filed Jan. 15, 2020, which claims the benefit under 35 U.S.C. § 119(e) of U.S. Provisional Patent Application Ser. No. 62/794,499, filed on Jan. 18, 2019, titled "SYSTEMS AND METHODS FOR METADATA CLASSIFICATION". The contents of these applications are incorporated herein by reference in their entirety.

BACKGROUND

Computer security has become an increasingly urgent concern at all levels of society, from individuals to businesses to government institutions. For example, in 2015, security researchers identified a zero-day vulnerability that would have allowed an attacker to hack into a Jeep Cherokee's on-board computer system via the Internet and take control of the vehicle's dashboard functions, steering, brakes, and transmission. In 2017, the WannaCry ransomware attack was estimated to have affected more than 200,000 computers worldwide, causing at least hundreds of millions of dollars in economic losses. Notably, the attack crippled operations at several National Health Service hospitals in the UK. In the same year, a data breach at Equifax, a US consumer credit reporting agency, exposed person data such as full names, social security numbers, birth dates, addresses, driver's license numbers, credit card numbers, etc. That attack is reported to have affected over 140 million consumers.

Security professionals are constantly playing catch-up with attackers. As soon as a vulnerability is reported, security professionals rush to patch the vulnerability. Individuals and organizations that fail to patch vulnerabilities in a timely manner (e.g., due to poor governance and/or lack of resources) become easy targets for attackers.

Some security software monitors activities on a computer and/or within a network, and looks for patterns that may be indicative of an attack. Such an approach does not prevent malicious code from being executed in the first place. Often, the damage has been done by the time any suspicious pattern emerges.

SUMMARY

In accordance with some embodiments, a method for metadata processing is provided, comprising acts of: receiving one or more metadata inputs; and processing the one or more metadata inputs to determine whether to allow an instruction, comprising: identifying one or more classification bits from a metadata input of the one or more metadata inputs; and processing the metadata input based on the one or more classification bits.

In accordance with some embodiments, a method for metadata processing is provided, comprising acts of: receiving an application memory address; accessing mapping information associated with the application memory address; and using the mapping information to retrieve metadata from a memory region of a plurality of metadata memory regions, wherein the plurality of metadata memory regions correspond, respectively, to a plurality of metadata classifications.

In accordance with some embodiments, a method for metadata processing is provided, comprising acts of: identifying at least one metadata symbol from a metadata label; identifying at least one attribute value associated with the at least one metadata symbol; using the at least one attribute value to determine one or more classification bits; generating a binary representation for the metadata label, wherein: the binary representation comprises at least one portion representing the at least one metadata symbol; and the binary representation associates the one or more classification bits with the at least one portion representing the at least one metadata symbol.

In accordance with some embodiments, a method for metadata processing is provided, comprising acts of: identifying one or more registers and/or one or more application memory locations used by an instruction; accessing one or more classification bits for the one or more registers and/or one or more application memory locations; and determining, based on the one or more classification bits, whether to allow the instruction.

In accordance with some embodiments, a system is provided, comprising circuitry and/or one or more processors programmed by executable instructions, wherein the circuitry and/or the one or more programmed processors are configured to perform any of the methods described herein.

In accordance with some embodiments, at least one computer-readable medium is provided, having stored thereon at least one netlist for any of the circuitries described herein.

In accordance with some embodiments, at least one computer-readable medium is provided, having stored thereon at least one hardware description that, when synthesized, produces any of the netlists described herein.

In accordance with some embodiments, at least one computer-readable medium is provided, having stored thereon any of the executable instructions described herein.

BRIEF DESCRIPTION OF DRAWINGS

FIG. 8 shows an illustrative hardware logic block 800, in accordance with some embodiments.

DETAILED DESCRIPTION

Many vulnerabilities exploited by attackers trace back to a computer architectural design where data and executable instructions are intermingled in a same memory. This intermingling allows an attacker to inject malicious code into a remote computer by disguising the malicious code as data. For instance, a program may allocate a buffer in a computer's memory to store data received via a network. If the program receives more data than the buffer can hold, but does not check the size of the received data prior to writing the data into the buffer, part of the received data would be written beyond the buffer's boundary, into adjacent memory. An attacker may exploit this behavior to inject malicious code into the adjacent memory. If the adjacent memory is allocated for executable code, the malicious code may eventually be executed by the computer.

Techniques have been proposed to make computer hardware more security aware. For instance, memory locations may be associated with metadata for use in enforcing security policies, and instructions may be checked for compliance with the security policies. For example, given an instruction to be executed, metadata associated with the instruction and/or metadata associated with one or more operands of the instruction may be checked to determine if the instruction should be allowed. Additionally, or alternatively, appropriate metadata may be associated with an output of the instruction.

Figure 1:
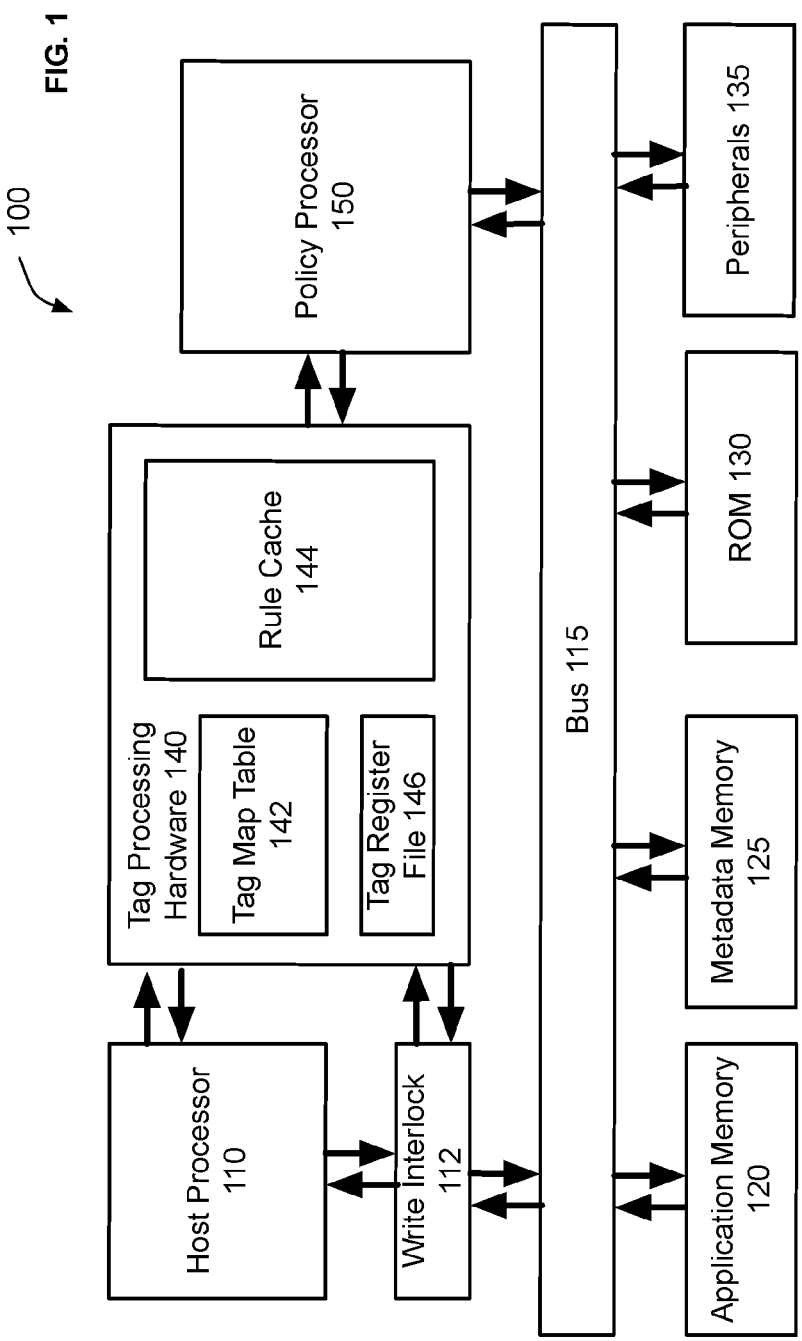
FIG. 1 shows an illustrative hardware system 100 for enforcing policies, in accordance with some embodiments.

FIG. 1 shows an illustrative hardware system 100 for enforcing policies, in accordance with some embodiments. In this example, the system 100 includes a host processor 110, which may have any suitable instruction set architecture (ISA) such as a reduced instruction set computing (RISC) architecture or a complex instruction set computing (CISC) architecture. The host processor 110 may perform memory accesses via a write interlock 112. The write interlock 112 may be connected to a system bus 115 configured to transfer data between various components such as the write interlock 112, an application memory 120, a metadata memory 125, a read-only memory (ROM) 130, one or more peripherals 135, etc.

In some embodiments, data that is manipulated (e.g., modified, consumed, and/or produced) by the host processor 110 may be stored in the application memory 120. Such data is referred to herein as "application data," as distinguished from metadata used for enforcing policies. The latter may be stored in the metadata memory 125. It should be appreciated that application data may include data manipulated by an operating system (OS), instructions of the OS, data manipulated by one or more user applications, and/or instructions of the one or more user applications.

In some embodiments, the application memory 120 and the metadata memory 125 may be physically separate, and the host processor 110 may have no access to the metadata memory 125. In this manner, even if an attacker succeeds in injecting malicious code into the application memory 120 and causing the host processor 110 to execute the malicious code, the metadata memory 125 may not be affected. However, it should be appreciated that aspects of the present disclosure are not limited to storing application data and metadata on physically separate memories. Additionally, or alternatively, metadata may be stored in a same memory as application data, and a memory management component may be used that implements an appropriate protection scheme to prevent instructions executing on the host processor 110 from modifying the metadata. Additionally, or alternatively, metadata may be intermingled with application data in a same memory, and one or more policies may be used to protect the metadata.

In some embodiments, tag processing hardware 140 may be provided to ensure that instructions being executed by the host processor 110 comply with one or more policies. The tag processing hardware 140 may include any suitable circuit component or combination of circuit components. For instance, the tag processing hardware 140 may include a tag map table 142 that maps addresses in the application memory 120 to addresses in the metadata memory 125. For example, the tag map table 142 may map an address X in the application memory 120 to an address Y in the metadata memory 125. A value stored at the address Y is sometimes referred to herein as a "metadata tag" or simply a "tag."

In some embodiments, a value stored at the address Y may in turn be an address Z. Such indirection may be repeated any suitable number of times, and may eventually lead to a data structure in the metadata memory 125 for storing metadata. Such metadata, as well as any intermediate address (e.g., the address Z), are also referred to herein as "metadata tags" or simply "tags."

It should be appreciated that aspects of the present disclosure are not limited to a tag map table that stores addresses in a metadata memory. In some embodiments, a tag map table entry itself may store metadata, so that the tag processing hardware 140 may be able to access the metadata without performing a memory operation. In some embodiments, a tag map table entry may store a selected bit pattern, where a first portion of the bit pattern may encode metadata, and a second portion of the bit pattern may encode an address in a metadata memory where further metadata may be stored. This may provide a desired balance between speed and expressivity. For instance, the tag processing hardware 140 may be able to check certain policies quickly, using only the metadata stored in the tag map table entry itself. For other policies with more complex rules, the tag processing hardware 140 may access the further metadata stored in the metadata memory 125.

Referring again to FIG. 1, by mapping application memory addresses to metadata memory addresses, the tag map table 142 may create an association between application data and metadata that describes the application data. In one example, metadata stored at the metadata memory address Y and thus associated with application data stored at the application memory address X may indicate that the application data may be readable, writable, and/or executable. In another example, metadata stored at the metadata memory address Y and thus associated with application data stored at the application memory address X may indicate a type of the application data (e.g., integer, pointer, 16-bit word, 32-bit word, etc.). Depending on a policy to be enforced, any suitable metadata relevant for the policy may be associated with a piece of application data.

In some embodiments, a metadata memory address Z may be stored at the metadata memory address Y. Metadata to be associated with the application data stored at the application memory address X may be stored at the metadata memory address Z, instead of (or in addition to) the metadata memory address Y. For instance, a binary representation of a metadata label RED may be stored at the metadata memory address Z. By storing the metadata memory address Z in the metadata memory address Y, the application data stored at the application memory address X may be tagged RED.

In this manner, the binary representation of the metadata label RED may be stored only once in the metadata memory 125. For instance, if application data stored at another application memory address X' is also to be tagged RED, the tag map table 142 may map the application memory address X' to a metadata memory address Y' where the metadata memory address Z is also stored.

Moreover, in this manner, tag update may be simplified. For instance, if the application data stored at the application memory address X is to be tagged BLUE at a subsequent time, a metadata memory address Z' may be written at the metadata memory address Y, to replace the metadata memory address Z, and a binary representation of the metadata label BLUE may be stored at the metadata memory address Z'.

Thus, the inventors have recognized and appreciated that a chain of metadata memory addresses of any suitable length N may be used for tagging, including N=0 (e.g., where a binary representation of a metadata label is stored at the metadata memory address Y itself).

The association between application data and metadata (also referred to herein as "tagging") may be done at any suitable level of granularity, and/or variable granularity. For instance, tagging may be done on a word-by-word basis. Additionally, or alternatively, a region in memory may be mapped to a single tag, so that all words in that region are associated with the same metadata. This may advantageously reduce a size of the tag map table 142 and/or the metadata memory 125. For example, a single tag may be maintained for an entire address range, as opposed to maintaining multiple tags corresponding, respectively, to different addresses in the address range.

In some embodiments, the tag processing hardware 140 may be configured to apply one or more rules to metadata associated with an instruction and/or metadata associated with one or more operands of the instruction to determine if the instruction should be allowed. For instance, the host processor 110 may fetch and execute an instruction, and may queue a result of executing the instruction into the write interlock 112. Before the result is written back into the application memory 120, the host processor 110 may send, to the tag processing hardware 140, an instruction type (e.g., opcode), an address where the instruction is stored, one or more memory addresses referenced by the instruction, and/or one or more register identifiers. Such a register identifier may identify a register used by the host processor 110 in executing the instruction, such as a register for storing an operand or a result of the instruction.

In some embodiments, destructive read instructions may be queued in addition to, or instead of, write instructions. For instance, subsequent instructions attempting to access a target address of a destructive read instruction may be queued in a memory region that is not cached. If and when it is determined that the destructive read instruction should be allowed, the queued instructions may be loaded for execution.

In some embodiments, a destructive read instruction may be allowed to proceed, and data read from a target address may be captured in a buffer. If and when it is determined that the destructive read instruction should be allowed, the data captured in the buffer may be discarded. If and when it is determined that the destructive read instruction should not be allowed, the data captured in the buffer may be restored to the target address. Additionally, or alternatively, a subsequent read may be serviced by the buffered data.

It should be appreciated that aspects of the present disclosure are not limited to performing metadata processing on instructions that have been executed by a host processor, such as instructions that have been retired by the host processor's execution pipeline. In some embodiments, metadata processing may be performed on instructions before, during, and/or after the host processor's execution pipeline.

In some embodiments, given an address received from the host processor 110 (e.g., an address where an instruction is stored, or an address referenced by an instruction), the tag processing hardware 140 may use the tag map table 142 to identify a corresponding tag. Additionally, or alternatively, for a register identifier received from the host processor 110, the tag processing hardware 140 may access a tag from a tag register file 146 within the tag processing hardware 140.

In some embodiments, if an application memory address does not have a corresponding entry in the tag map table 142, the tag processing hardware 140 may send a query to a policy processor 150. The query may include the application memory address in question, and the policy processor 150 may return a tag for that application memory address. Additionally, or alternatively, the policy processor 150 may create a new tag map entry for an address range including the application memory address. In this manner, the appropriate tag may be made available, for future reference, in the tag map table 142 in association with the application memory address in question.

In some embodiments, the tag processing hardware 140 may send a query to the policy processor 150 to check if an instruction executed by the host processor 110 should be allowed. The query may include one or more inputs, such as an instruction type (e.g., opcode) of the instruction, a tag for a program counter, a tag for an application memory address from which the instruction is fetched (e.g., a word in memory to which the program counter points), a tag for a register in which an operand of the instruction is stored, and/or a tag for an application memory address referenced by the instruction. In one example, the instruction may be a load instruction, and an operand of the instruction may be an application memory address from which application data is to be loaded. The query may include, among other things, a tag for a register in which the application memory address is stored, as well as a tag for the application memory address itself. In another example, the instruction may be an arithmetic instruction, and there may be two operands. The query may include, among other things, a first tag for a first register in which a first operand is stored, and a second tag for a second register in which a second operand is stored.

It should also be appreciated that aspects of the present disclosure are not limited to performing metadata processing on a single instruction at a time. In some embodiments, multiple instructions in a host processor's ISA may be checked together as a bundle, for example, via a single query to the policy processor 150. Such a query may include more inputs to allow the policy processor 150 to check all of the instructions in the bundle. Similarly, a CISC instruction, which may correspond semantically to multiple operations, may be checked via a single query to the policy processor 150, where the query may include sufficient inputs to allow the policy processor 150 to check all of the constituent operations within the CISC instruction.

In some embodiments, the policy processor 150 may include a configurable processing unit, such as a microprocessor, a field-programmable gate array (FPGA), and/or any other suitable circuitry. The policy processor 150 may have loaded therein one or more policies that describe allowed operations of the host processor 110. In response to a query from the tag processing hardware 140, the policy processor 150 may evaluate one or more of the policies to determine if an instruction in question should be allowed. For instance, the tag processing hardware 140 may send an interrupt signal to the policy processor 150, along with one or more inputs relating to the instruction in question (e.g., as described above). The policy processor 150 may store the inputs of the query in a working memory (e.g., in one or more queues) for immediate or deferred processing. For example, the policy processor 150 may prioritize processing of queries in some suitable manner (e.g., based on a priority flag associated with each query).

In some embodiments, the policy processor 150 may evaluate one or more policies on one or more inputs (e.g., one or more input tags) to determine if an instruction in question should be allowed. If the instruction is not to be allowed, the policy processor 150 may so notify the tag processing hardware 140. If the instruction is to be allowed, the policy processor 150 may compute one or more outputs (e.g., one or more output tags) to be returned to the tag processing hardware 140. As one example, the instruction may be a store instruction, and the policy processor 150 may compute an output tag for an application memory address to which application data is to be stored. As another example, the instruction may be an arithmetic instruction, and the policy processor 150 may compute an output tag for a register for storing a result of executing the arithmetic instruction.

In some embodiments, the policy processor 150 may be programmed to perform one or more tasks in addition to, or instead of, those relating to evaluation of policies. For instance, the policy processor 150 may perform tasks relating to tag initialization, boot loading, application loading, memory management (e.g., garbage collection) for the metadata memory 125, logging, debugging support, and/or interrupt processing. One or more of these tasks may be performed in the background (e.g., between servicing queries from the tag processing hardware 140).

In some embodiments, the tag processing hardware 140 may include a rule cache 144 for mapping one or more inputs to a decision and/or one or more outputs. For instance, a query into the rule cache 144 may be similarly constructed as a query to the policy processor 150 to check if an instruction executed by the host processor 110 should be allowed. If there is a cache hit, the rule cache 144 may output a decision as to whether to the instruction should be allowed, and/or one or more output tags (e.g., as described above in connection with the policy processor 150). Such a mapping in the rule cache 144 may be created using a query response from the policy processor 150. However, that is not required, as in some embodiments, one or more mappings may be installed into the rule cache 144 ahead of time.

In some embodiments, the rule cache 144 may be used to provide a performance enhancement. For instance, before querying the policy processor 150 with one or more input tags, the tag processing hardware 140 may first query the rule cache 144 with the one or more input tags. In case of a cache hit, the tag processing hardware 140 may proceed with a decision and/or one or more output tags from the rule cache 144, without querying the policy processor 150. This may provide a significant speedup. In case of a cache miss, the tag processing hardware 140 may query the policy processor 150, and may install a response from the policy processor 150 into the rule cache 144 for potential future use.

In some embodiments, if the tag processing hardware 140 determines that an instruction in question should be allowed (e.g., based on a hit in the rule cache 144, or a miss in the rule cache 144, followed by a response from the policy processor 150 indicating no policy violation has been found), the tag processing hardware 140 may indicate to the write interlock 112 that a result of executing the instruction may be written back to memory. Additionally, or alternatively, the tag processing hardware 140 may update the metadata memory 125, the tag map table 142, and/or the tag register file 146 with one or more output tags (e.g., as received from the rule cache 144 or the policy processor 150). As one example, for a store instruction, the metadata memory 125 may be updated based on an address translation by the tag map table 142. For instance, an application memory address referenced by the store instruction may be used to look up a metadata memory address from the tag map table 142, and metadata received from the rule cache 144 or the policy processor 150 may be stored to the metadata memory 125 at the metadata memory address. As another example, where metadata to be updated is stored in an entry in the tag map table 142 (as opposed to being stored in the metadata memory 125), that entry in the tag map table 142 may be updated. As another example, for an arithmetic instruction, an entry in the tag register file 146 corresponding to a register used by the host processor 110 for storing a result of executing the arithmetic instruction may be updated with an appropriate tag.

In some embodiments, if the tag processing hardware 140 determines that the instruction in question represents a policy violation (e.g., based on a miss in the rule cache 144, followed by a response from the policy processor 150 indicating a policy violation has been found), the tag processing hardware 140 may indicate to the write interlock 112 that a result of executing the instruction should be discarded, instead of being written back to memory. Additionally, or alternatively, the tag processing hardware 140 may send an interrupt to the host processor 110. In response to receiving the interrupt, the host processor 110 may switch to any suitable violation processing code. For example, the host processor 100 may halt, reset, log the violation and continue, perform an integrity check on application code and/or application data, notify an operator, etc.

In some embodiments, the rule cache 144 may be implemented with a hash function and a designated portion of a memory (e.g., the metadata memory 125). For instance, a hash function may be applied to one or more inputs to the rule cache 144 to generate an address in the metadata memory 125. A rule cache entry corresponding to the one or more inputs may be stored to, and/or retrieved from, that address in the metadata memory 125. Such an entry may include the one or more inputs and/or one or more corresponding outputs, which may be computed from the one or more inputs at run time, load time, link time, or compile time.

In some embodiments, the tag processing hardware 140 may include one or more configuration registers. Such a register may be accessible (e.g., by the policy processor 150) via a configuration interface of the tag processing hardware 140. In some embodiments, the tag register file 146 may be implemented as configuration registers. Additionally, or alternatively, there may be one or more application configuration registers and/or one or more metadata configuration registers.

Although details of implementation are shown in FIG. 1 and discussed above, it should be appreciated that aspects of the present disclosure are not limited to the use of any particular component, or combination of components, or to any particular arrangement of components. For instance, in some embodiments, one or more functionalities of the policy processor 150 may be performed by the host processor 110. As an example, the host processor 110 may have different operating modes, such as a user mode for user applications and a privileged mode for an operating system. Policy-related code (e.g., tagging, evaluating policies, etc.) may run in the same privileged mode as the operating system, or a different privileged mode (e.g., with even more protection against privilege escalation).

Figure 2:
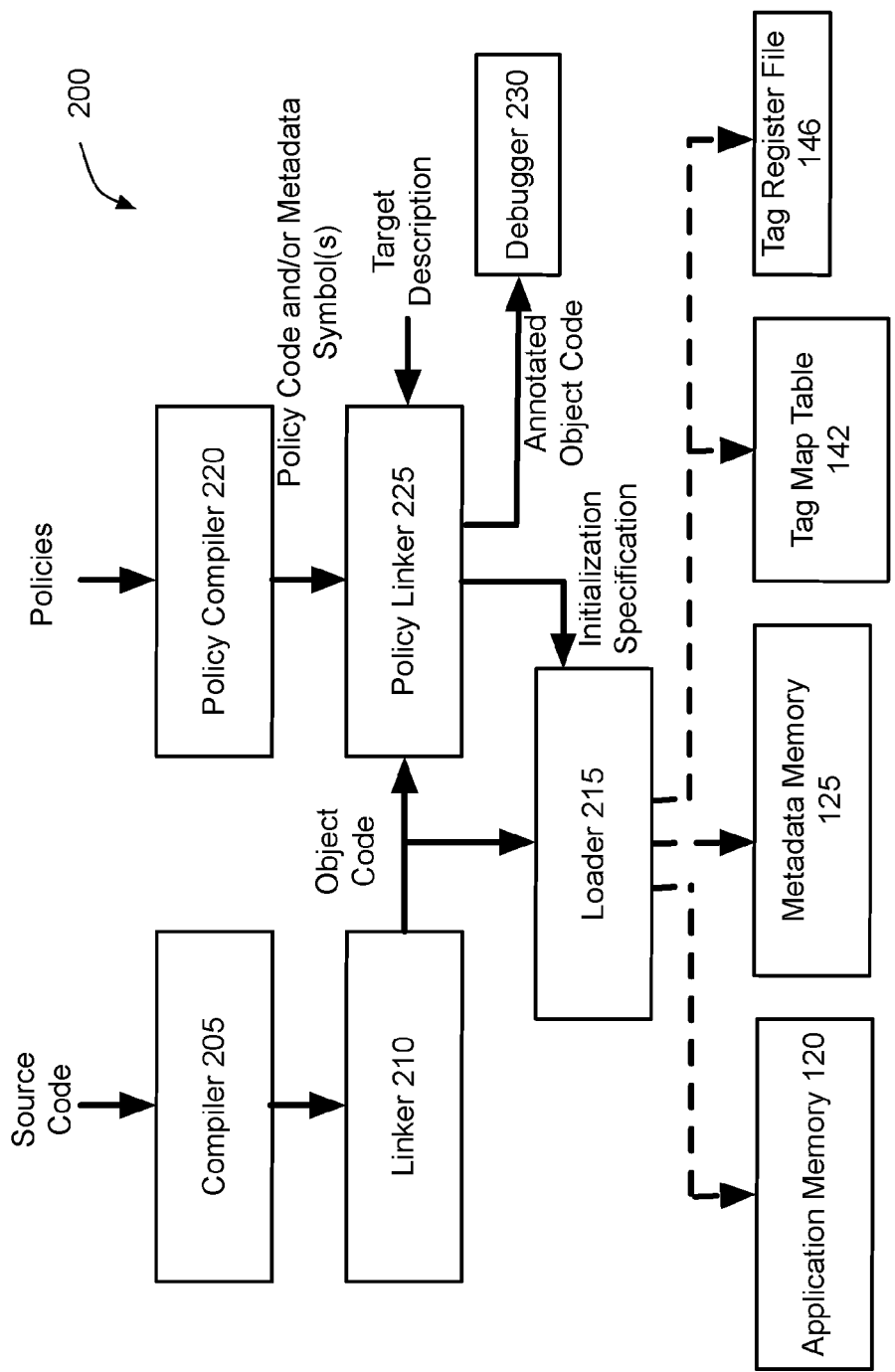
FIG. 2 shows an illustrative software system 200 for enforcing policies, in accordance with some embodiments.

FIG. 2 shows an illustrative software system 200 for enforcing policies, in accordance with some embodiments. For instance, the software system 200 may be programmed to generate executable code and/or load the executable code into the illustrative hardware system 100 shown in FIG. 1.

In the example shown in FIG. 2, the software system 200 includes a software toolchain having a compiler 205, a linker 210, and a loader 215. The compiler 205 may be programmed to process source code into executable code, where the source code may be in a higher-level language and the executable code may be in a lower level language. The linker 210 may be programmed to combine multiple object files generated by the compiler 205 into a single object file to be loaded by the loader 215 into memory (e.g., the illustrative application memory 120 in the example of FIG. 1). Although not shown, the object file output by the linker 210 may be converted into a suitable format and stored in persistent storage, such as flash memory, hard disk, read-only memory (ROM), etc. The loader 215 may retrieve the object file from the persistent storage, and load the object file into random-access memory (RAM).

In some embodiments, the compiler 205 may be programmed to generate information for use in enforcing policies. For instance, as the compiler 205 translates source code into executable code, the compiler 205 may generate information regarding data types, program semantics and/or memory layout. As one example, the compiler 205 may be programmed to mark a boundary between one or more instructions of a function and one or more instructions that implement calling convention operations (e.g., passing one or more parameters from a caller function to a callee function, returning one or more values from the callee function to the caller function, storing a return address to indicate where execution is to resume in the caller function's code when the callee function returns control back to the caller function, etc.). Such boundaries may be used, for instance, during initialization to tag certain instructions as function prologue or function epilogue. At run time, a stack policy may be enforced so that, as function prologue instructions execute, certain locations in a call stack (e.g., where a return address is stored) may be tagged as "frame" locations, and as function epilogue instructions execute, the "frame" tags may be removed. The stack policy may indicate that instructions implementing a body of the function (as opposed to function prologue and function epilogue) only have read access to "frame" locations. This may prevent an attacker from overwriting a return address and thereby gaining control.

As another example, the compiler 205 may be programmed to perform control flow analysis, for instance, to identify one or more control transfer points and respective destinations. Such information may be used in enforcing a control flow policy. As yet another example, the compiler 205 may be programmed to perform type analysis, for example, by applying type labels such as Pointer, Integer, Floating-Point Number, etc. Such information may be used to enforce a policy that prevents misuse (e.g., using a floating-point number as a pointer).

Although not shown in FIG. 2, the software system 200 may, in some embodiments, include a binary analysis component programmed to take, as input, object code produced by the linker 210 (as opposed to source code), and perform one or more analyses similar to those performed by the compiler 205 (e.g., control flow analysis, type analysis, etc.).

In the example of FIG. 2, the software system 200 further includes a policy compiler 220 and a policy linker 225. The policy compiler 220 may be programmed to translate one or more policies written in a policy language into policy code. For instance, the policy compiler 220 may output policy code in C or some other suitable programming language. Additionally, or alternatively, the policy compiler 220 may output one or more metadata labels referenced by the one or more policies. At initialization, such a metadata label may be associated with one or more memory locations, registers, and/or other machine state of a target system, and may be resolved into a binary representation of metadata to be loaded into a metadata memory or some other hardware storage (e.g., registers) of the target system. As discussed above, such a binary representation of metadata, or a pointer to a location at which the binary representation is stored, is sometimes referred to herein as a "tag."

It should be appreciated that aspects of the present disclosure are not limited to resolving metadata labels at load time. In some embodiments, one or more metadata labels may be resolved statically (e.g., at compile time or link time). For example, the policy compiler 220 may process one or more applicable policies, and resolve one or more metadata labels defined by the one or more policies into a statically determined binary representation. Additionally, or alternatively, the policy linker 225 may resolve one or more metadata labels into a statically determined binary representation, or a pointer to a data structure storing a statically determined binary representation. The inventors have recognized and appreciated that resolving metadata labels statically may advantageously reduce load time processing. However, aspects of the present disclosure are not limited to resolving metadata labels in any particular manner.

In some embodiments, the policy linker 225 may be programmed to process object code (e.g., as output by the linker 210), policy code (e.g., as output by the policy compiler 220), and/or a target description, to output an initialization specification. The initialization specification may be used by the loader 215 to securely initialize a target system having one or more hardware components (e.g., the illustrative hardware system 100 shown in FIG. 1) and/or one or more software components (e.g., an operating system, one or more user applications, etc.).

In some embodiments, the target description may include descriptions of a plurality of named entities. A named entity may represent a component of a target system. As one example, a named entity may represent a hardware component, such as a configuration register, a program counter, a register file, a timer, a status flag, a memory transfer unit, an input/output device, etc. As another example, a named entity may represent a software component, such as a function, a module, a driver, a service routine, etc.

In some embodiments, the policy linker 225 may be programmed to search the target description to identify one or more entities to which a policy pertains. For instance, the policy may map certain entity names to corresponding metadata symbols, and the policy linker 225 may search the target description to identify entities having those entity names. The policy linker 225 may identify descriptions of those entities from the target description, and use the descriptions to annotate, with appropriate metadata symbols, the object code output by the linker 210. For instance, the policy linker 225 may apply a Read label to a .rodata section of an Executable and Linkable Format (ELF) file, a Read label and a Write label to a .data section of the ELF file, and an Execute label to a .text section of the ELF file. Such information may be used to enforce a policy for memory access control and/or executable code protection (e.g., by checking read, write, and/or execute privileges).

It should be appreciated that aspects of the present disclosure are not limited to providing a target description to the policy linker 225. In some embodiments, a target description may be provided to the policy compiler 220, in addition to, or instead of, the policy linker 225. The policy compiler 220 may check the target description for errors. For instance, if an entity referenced in a policy does not exist in the target description, an error may be flagged by the policy compiler 220. Additionally, or alternatively, the policy compiler 220 may search the target description for entities that are relevant for one or more policies to be enforced, and may produce a filtered target description that includes entities descriptions for the relevant entities only. For instance, the policy compiler 220 may match an entity name in an "init" statement of a policy to be enforced to an entity description in the target description, and may remove from the target description (or simply ignore) entity descriptions with no corresponding "init" statement.

In some embodiments, the loader 215 may initialize a target system based on an initialization specification produced by the policy linker 225. For instance, referring to the example of FIG. 1, the loader 215 may load data and/or instructions into the application memory 120, and may use the initialization specification to identify metadata labels associated with the data and/or instructions being loaded into the application memory 120. The loader 215 may resolve the metadata labels in the initialization specification into respective binary representations. However, it should be appreciated that aspects of the present disclosure are not limited to resolving metadata labels at load time. In some embodiments, a universe of metadata labels may be known during policy linking, and therefore metadata labels may be resolved at that time, for example, by the policy linker 225. This may advantageously reduce load time processing of the initialization specification.

In some embodiments, the policy linker 225 and/or the loader 215 may maintain a mapping of binary representations of metadata back to human readable versions of metadata labels. Such a mapping may be used, for example, by a debugger 230. For instance, in some embodiments, the debugger 230 may be provided to display a human readable version of an initialization specification, which may list one or more entities and, for each entity, a set of one or more metadata labels associated with the entity. Additionally, or alternatively, the debugger 230 may be programmed to display assembly code annotated with metadata labels, such as assembly code generated by disassembling object code annotated with metadata labels. During debugging, the debugger 230 may halt a program during execution, and allow inspection of entities and/or metadata tags associated with the entities, in human readable form. For instance, the debugger 230 may allow inspection of entities involved in a policy violation and/or metadata tags that caused the policy violation. The debugger 230 may do so using the mapping of binary representations of metadata back to metadata labels.

In some embodiments, a conventional debugging tool may be extended to allow review of issues related to policy enforcement, for example, as described above. Additionally, or alternatively, a stand-alone policy debugging tool may be provided.

In some embodiments, the loader 215 may load the binary representations of the metadata labels into the metadata memory 125, and may record the mapping between application memory addresses and metadata memory addresses in the tag map table 142. For instance, the loader 215 may create an entry in the tag map table 142 that maps an application memory address where an instruction is stored in the application memory 120, to a metadata memory address where metadata associated with the instruction is stored in the metadata memory 125. Additionally, or alternatively, the loader 215 may store metadata in the tag map table 142 itself (as opposed to the metadata memory 125), to allow access without performing any memory operation.

In some embodiments, the loader 215 may initialize the tag register file 146 in addition to, or instead of, the tag map table 142. For instance, the tag register file 146 may include a plurality of registers corresponding, respectively, to a plurality of entities. The loader 215 may identify, from the initialization specification, metadata associated with the entities, and store the metadata in the respective registers in the tag register file 146.

Referring again to the example of FIG. 1, the loader 215 may, in some embodiments, load policy code (e.g., as output by the policy compiler 220) into the metadata memory 125 for execution by the policy processor 150. Additionally, or alternatively, a separate memory (not shown in FIG. 1) may be provided for use by the policy processor 150, and the loader 215 may load policy code and/or associated data into the separate memory.

In some embodiments, a metadata label may be based on multiple metadata symbols. For instance, an entity may be subject to multiple policies, and may therefore be associated with different metadata symbols corresponding, respectively, to the different policies. The inventors have recognized and appreciated that it may be desirable that a same set of metadata symbols be resolved by the loader 215 to a same binary representation (which is sometimes referred to herein as a "canonical" representation). For instance, a metadata label {A, B, C} and a metadata label {B, A, C} may be resolved by the loader 215 to a same binary representation. In this manner, metadata labels that are syntactically different but semantically equivalent may have the same binary representation.

The inventors have further recognized and appreciated it may be desirable to ensure that a binary representation of metadata is not duplicated in metadata storage. For instance, as discussed above, the illustrative rule cache 144 in the example of FIG. 1 may map input tags to output tags, and, in some embodiments, the input tags may be metadata memory addresses where binary representations of metadata are stored, as opposed to the binary representations themselves. The inventors have recognized and appreciated that, if a same binary representation of metadata is stored at two different metadata memory addresses X and Y, the rule cache 144 may not recognize an input pattern having the metadata memory address Y as matching a stored mapping having the metadata memory address X. This may result in a large number of unnecessary rule cache misses, which may degrade system performance.

Moreover, the inventors have recognized and appreciated that having a one-to-one correspondence between binary representations of metadata and their storage locations may facilitate metadata comparison. For instance, equality between two pieces of metadata may be determined simply by comparing metadata memory addresses, as opposed to comparing binary representations of metadata. This may result in significant performance improvement, especially where the binary representations are large (e.g., many metadata symbols packed into a single metadata label).

Accordingly, in some embodiments, the loader 215 may, prior to storing a binary representation of metadata (e.g., into the metadata memory 125), check if the binary representation of metadata has already been stored. If the binary representation of metadata has already been stored, instead of storing it again at a different storage location, the loader 215 may refer to the existing storage location. Such a check may be done at startup and/or when a program is loaded subsequent to startup (with or without dynamic linking).

Additionally, or alternatively, a similar check may be performed when a binary representation of metadata is created as a result of evaluating one or more policies (e.g., by the illustrative policy processor 150). If the binary representation of metadata has already been stored, a reference to the existing storage location may be used (e.g., installed in the illustrative rule cache 144).

In some embodiments, the loader 215 may create a hash table mapping hash values to storage locations. Before storing a binary representation of metadata, the loader 215 may use a hash function to reduce the binary representation of metadata into a hash value, and check if the hash table already contains an entry associated with the hash value. If so, the loader 215 may determine that the binary representation of metadata has already been stored, and may retrieve, from the entry, information relating to the binary representation of metadata (e.g., a pointer to the binary representation of metadata, or a pointer to that pointer). If the hash table does not already contain an entry associated with the hash value, the loader 215 may store the binary representation of metadata (e.g., to a register or a location in a metadata memory), create a new entry in the hash table in association with the hash value, and store appropriate information in the new entry (e.g., a register identifier, a pointer to the binary representation of metadata in the metadata memory, a pointer to that pointer, etc.). However, it should be appreciated that aspects of the present disclosure are not limited to the use of a hash table for keeping track of binary representations of metadata that have already been stored. Additionally, or alternatively, other data structures may be used, such as a graph data structure, an ordered list, an unordered list, etc. Any suitable data structure or combination of data structures may be selected based on any suitable criterion or combination of criteria, such as access time, memory usage, etc.

It should be appreciated that the techniques introduced above and discussed in greater detail below may be implemented in any of numerous ways, as the techniques are not limited to any particular manner of implementation. Examples of implementation details are provided herein solely for illustrative purposes. Furthermore, the techniques disclosed herein may be used individually or in any suitable combination, as aspects of the present disclosure are not limited to the use of any particular technique or combination of techniques.

For instance, while examples are discussed herein that include a compiler (e.g., the illustrative compiler 205 and/or the illustrative policy compiler 220 in the example of FIG. 2), it should be appreciated that aspects of the present disclosure are not limited to using a compiler. In some embodiments, a software toolchain may be implemented as an interpreter. For example, a lazy initialization scheme may be implemented, where one or more default symbols (e.g., UNINITIALIZED) may be used for tagging at startup, and a policy processor (e.g., the illustrative policy processor 150 in the example of FIG. 1) may evaluate one or more policies and resolve the one or more default symbols in a just-in-time manner.

The inventors have recognized and appreciated that certain patterns may arise in metadata processing. As an example, some policies (e.g., compartmentalization, heap protection, etc.) may use metadata symbols that are colloquially referred to as "colors." Processing of such metadata symbols often involve comparisons (e.g., full or partial equality checking). For instance, a load/store instruction may be allowed to proceed if a color associated with an address register of the load/store instruction is the same as, or otherwise matches, a color associated with an application memory location referenced by an application memory address stored in the address register. Metadata involved in comparisons may be referred to herein as "comparison" metadata.

As another example, metadata associated with an address (e.g., an application memory address, a register address, etc.) may sometimes flow with content stored at the address. Such metadata may be referred to herein as "flow" metadata. For instance, if the content is copied to a new address, the metadata may be carried over to the new address. Additionally, or alternatively, if the content is overwritten by new content from another address, the metadata may be overwritten by metadata associated with the other address.

On the other hand, metadata associated with an address may sometimes stay with a location referenced by the address (e.g., one or more application memory cells, one or more registers, etc.). Such metadata may be referred to herein as "fixed" metadata. For instance, if content stored at the address is overwritten by new content, the metadata associated with the address may be preserved. Additionally, or alternatively, if the content is copied to a new address, the metadata may not be carried over.

In some embodiments, flow metadata associated with an address may provide information about a data value stored at a location referenced by the address, whereas fixed metadata associated with the address may provide information about the location itself.

The inventors have recognized and appreciated various advantages provided by classifying metadata based on processing patterns. For instance, in some embodiments, a binary representation of a metadata label may be augmented with one or more designated bits to indicate a metadata class to which the metadata label belongs (e.g., comparison, fixed, and/or flow). In this manner, one or more hardware components may be made aware of classification of metadata, which may allow certain processing logic to be implemented in hardware, thereby improving performance.

Figure 3:
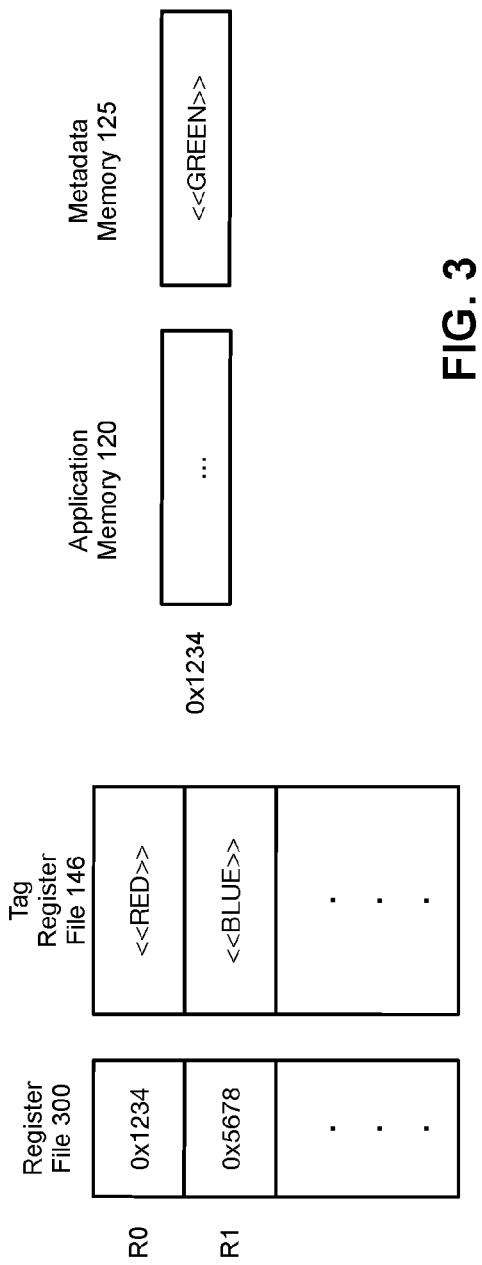
FIG. 3 shows an illustrative register file 300, in accordance with some embodiments.

FIG. 3 shows an illustrative register file 300, in accordance with some embodiments. The register file 300 may be a register file of a host processor (e.g., the illustrative host processor 110 shown in FIG. 1), and may include a plurality of registers, such as registers R0, R1, etc.

In some embodiments, the host processor 110 may execute a store instruction to write data to a location in an application memory (e.g., the illustrative application memory 120 shown in FIG. 1). An address (e.g., 0x1234) of the application memory location may be stored in an address register (e.g., R0), and the data to be written may be stored in a data register (e.g., R1).

In some embodiments, each register in the register file 300 may have a corresponding tag register for storing metadata. The corresponding tag registers may be in a tag register file (e.g., the illustrative tag register file 146 shown in FIG. 1). For instance, the register R0 may have a corresponding tag register in the tag register file 146, and the corresponding tag register may store a binary representation <<RED>> of a metadata label RED. Likewise, the register R1 may have a corresponding tag register in the tag register file 146, and the corresponding tag register may store a binary representation <<BLUE>> of a metadata label BLUE.

Additionally, or alternatively, the application memory address 0x1234 stored in the address register R0 may have a corresponding address in a metadata memory (e.g., the illustrative metadata memory 125 shown in FIG. 1). Metadata associated with the application memory address 0x1234 may be stored at the corresponding metadata memory address. For instance, in the example of FIG. 3, a binary representation <<GREEN>> of a metadata label GREEN may be stored at the metadata memory address corresponding to the application memory address 0x1234.

In some embodiments, tag processing hardware (e.g., the illustrative tag processing hardware 140 shown in FIG. 1) may apply one or more policies to determine whether a store instruction should be allowed to write content of the data register R1 to the application memory address 0x1234. For instance, the tag processing hardware 140 may construct an input metadata pattern, and may use the input metadata pattern to query a policy processor and/or a rule cache (e.g., the illustrative policy processor 150 and/or the illustrative rule cache 144 shown in FIG. 1).

For example, an access control policy may be provided that checks whether metadata associated with an address register matches metadata associated with an application memory location referenced by an application memory address stored in the address register. In the example of FIG. 3, the metadata label RED is associated with the address register R0, but the metadata label GREEN is associated with the application memory address 0x1234. Because of this mismatch, the tag processing hardware may indicate to the host processor that the store instruction violates the access control policy and therefore should not be allowed.

In some embodiments, the rule cache 144 may store one or more entries for use in enforcing the illustrative access control policy described above. For instance, the following entries may be stored in the rule cache 144.

1) If R0=RED and mem=RED, then allow instruction
2) If R0=BLUE and mem=BLUE, then allow instruction
3) If R0=GREEN and mem=GREEN, then allow instruction The inventors have recognized and appreciated that, although the above access control policy involves only a simple equality check (namely, checking whether R0=mem), three entries may be stored in the rule cache because there are three distinct color values (namely, RED, GREEN, and BLUE).[1] More generally, if a policy uses N distinct color values, N entries may be stored in a rule cache to implement an equality check.

[1] A rule cache entry (e.g., if R0=RED and mem=RED, then allow instruction) may be referred to herein as a "concrete" rule, whereas a policy rule (e.g., if R0=mem, then allow instruction) may be referred to herein as a "symbolic" rule.

The inventors have further recognized and appreciated that, while a small number of color values (e.g., tens of color values) may be sufficient for some policies (e.g., compartmentalization), a large number of color values (e.g., tens of thousands of color values) may be used by other policies. For instance, for a heap protection policy, it may be desirable to provide temporal safety (e.g., preventing an attacker from re-using a stale pointer). Accordingly, a new color value may be added each time a portion of memory is dynamically allocated, and thus a potentially unbounded number of colors may be used.

The inventors have recognized and appreciated that a bound may be imposed in practice based on a metadata tag size. For example, for 16-bit tags, $2^{16}=65,536$ color values may be possible. However, it may be impractical to provide a rule cache that accommodates more than a few thousand entries, because there may be limited area available on a System-on-Chip (SoC). As a result, rule cache misses may occur frequently, and the policy processor 150 may be frequently invoked, which may negatively impact performance.

In some embodiments, one or more policies (e.g., a heap protection policy) may be adapted to alias one or more color values. For instance, an equivalence relation may be provided over a set of color values, and a smaller set of color values may be obtained by taking a representative color value from each equivalence class. As an example, one or more test runs of relevant software may be conducted, and statistics may be collected regarding respective frequencies of color values. An equivalence relation may then be provided based on the observed frequencies. For instance, a frequently occurring color value may be related only to itself, and is thus not aliased. By contrast, multiple color values that occur infrequently may be grouped together, and may be replaced by a representative color value from the group. In this manner, fewer color values may be used, and hence fewer rule cache misses may occur.

The inventors have recognized and appreciated that, while aliasing color values of a policy may reduce a number of rule cache misses, an attacker may be able to exploit aliased color values to defeat a policy, and therefore there may be a negative impact on security. Accordingly, in some embodiments, one or more techniques are provided for improving performance without compromising security.

In some embodiments, metadata may be classified based on how the metadata is created. For instance, a binary representation of a metadata label may be augmented with one or more designated bits to indicate whether the metadata label is dynamically created (e.g., as a result of enforcing one or more policies). Additionally, or alternatively, metadata may be classified based on a type of metadata processing that uses the metadata. For instance, a binary representation of a metadata label may be augmented with one or more designated bits to indicate whether a comparison (e.g., equal to, less than, less than or equal to, greater than, greater than or equal to, partially equal to, ones' complement of, etc.) is to be performed on the metadata label. Additionally, or alternatively, metadata may be classified based on how the metadata is to be processed. For instance, a binary representation of a metadata label may be augmented with one or more designated bits to indicate whether the metadata label is to be processed by a hardware accelerator (e.g., specialized circuitry adapted to check equality, inequality, partial equality, ones' complement, etc.). Any suitable combination of one or more classifications, or no classification at all, may be used, as aspects of the present disclosure are not so limited.

Figure 4:
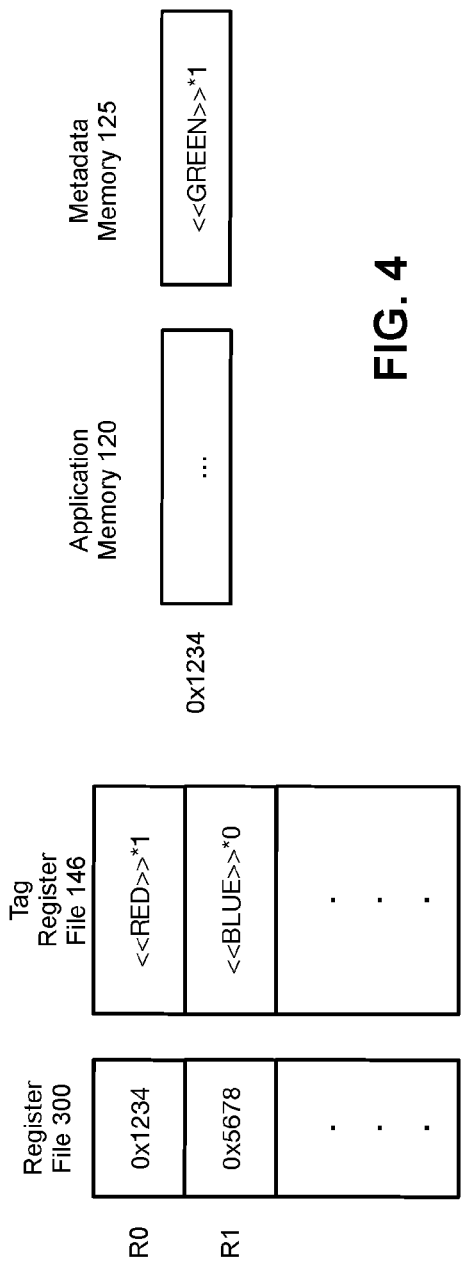
FIG. 4 shows another example involving the illustrative register file 300 of FIG. 3, in accordance with some embodiments.

FIG. 4 shows another example involving the illustrative register file 300 of FIG. 3, in accordance with some embodiments. In this example, the tag register corresponding to the address register R0 stores a binary representation of the metadata label RED, augmented with a comparison bit that is set to 1. This is shown in FIG. 4 as <<RED>>*1, and may indicate that a comparison (e.g., equality checking) is to be performed on the metadata symbol RED. Likewise, the metadata memory address corresponding to the application memory address 0x1234 may store a binary representation of the metadata label GREEN, augmented with a comparison bit that is set to 1. This is shown in FIG. 4 as <<GREEN>>*1, and may indicate that a comparison (e.g., equality checking) is to be performed on the metadata symbol GREEN.

It should be appreciated that aspects of the present disclosure are not limited to using comparison bits. Other classification bits, or no classification bit at all, may be used in addition to, or instead of, comparison bits. Moreover, despite the notation used herein (e.g., <<RED>>*1), aspects of the present disclosure are not limited to encoding classification bits in any particular manner. A classification bit may be appended, prepended, or otherwise encoded into a binary representation of metadata.

Figure 5:
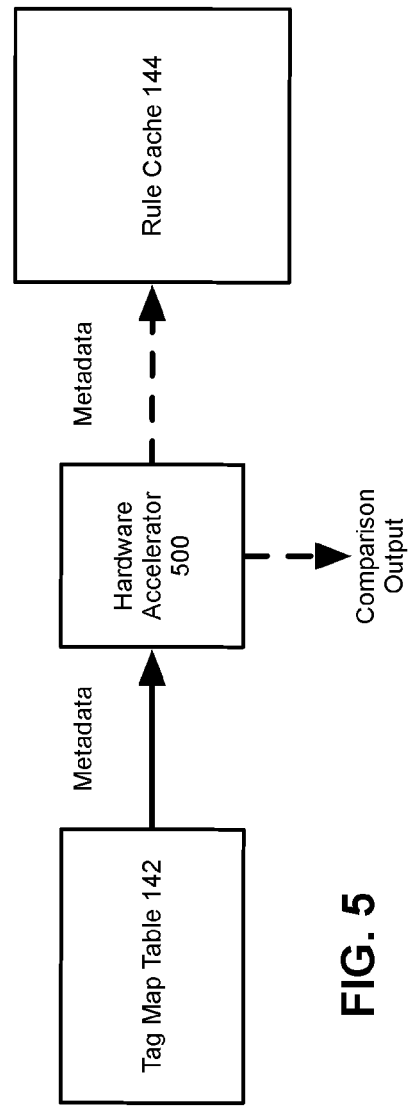
FIG. 5 shows an illustrative hardware accelerator 500, in accordance with some embodiments.

FIG. 5 shows an illustrative hardware accelerator 500, in accordance with some embodiments. For instance, the hardware accelerator 500 may include one or more hardware logic blocks inserted between a tag map table and a rule cache (e.g., the illustrative tag map table 142 and the illustrative rule cache 144 shown in FIG. 1). The one or more hardware logic blocks may be adapted to perform any suitable function, such as comparing two input metadata labels.

Referring back to the example of FIG. 4, the tag map table 142 may map an address of the address register R0 to an address of the corresponding tag register, and the metadata <<RED>>*1 may be read from the corresponding tag register. Additionally, or alternatively, the tag map table 142 may map the application memory address 0x1234 to the corresponding metadata memory address, and the metadata <<GREEN>>*1 may be read from the corresponding metadata memory address.

In some embodiments, the metadata associated with the address register R0 (e.g., <<RED>>*1 in the example of FIG. 4) and the metadata associated with the application memory address 0x1234 (e.g., <<GREEN>>*1 in the example of FIG. 4) may be provided to the hardware accelerator 500 as input. The hardware accelerator 500 may check if both metadata inputs include a comparison bit that is set to 1. If so, the hardware accelerator 500 may compare selected portions of the metadata inputs (e.g., <<RED>> and <<GREEN>>) to determine if there is a match, and may provide a comparison output accordingly. If at least one of the comparison bits is not set to 1, then the hardware accelerator 500 may forward the metadata inputs (or selected portions thereof, e.g., <<RED>> and <<GREEN>>, without comparison bits) to the rule cache 144 for further processing.

In some embodiments, the hardware accelerator 500 may include specialized circuitry adapted to perform a certain type of comparison efficiently. For instance, the hardware accelerator 500 may include a logic block adapted to check if two input bit strings are the same. In this manner, equality checking may be implemented in hardware logic, instead of via the rule cache 144. For a policy that uses a large number of distinct color values (e.g., a heap protection policy with dynamically created color values), such hardware logic implementation may significantly reduce a number of rule cache misses and/or a physical size of the rule cache 144, and hence significantly improve performance and/or reduce chip area.

It should be appreciated that any suitable set of metadata symbols may be involved in comparisons. Names of visually perceptible colors (e.g., RED, GREEN, BLUE, etc.) are used herein solely for purposes of illustration. Moreover, it should be appreciated that equality checking is discussed herein merely as an example. One or more other types of comparisons may be performed in addition to, or instead of, equality checking. For instance, in some embodiments, a comparison may be performed to determine if a bit string is a ones' complement of a second bit string. Additionally, or alternatively, a signed or unsigned arithmetic comparison (e.g., less than, less than or equal to, greater than, greater than or equal to, etc.) may be performed.

It should also be appreciated that aspects of the present disclosure are not limited to having a hardware logic block adapted to perform comparisons. In some embodiments, the hardware accelerator 500 may include a plurality of hardware logic blocks adapted to perform different functions in addition to, or instead of, comparisons. These functional blocks may be activated independently, for example, based on one or more policies that are currently being enforced. For instance, each policy may have a corresponding functional block, which may be activated when the policy's code is loaded into a policy processor (e.g., the illustrative policy processor 150 shown in FIG. 1) for execution.

Figure 6:
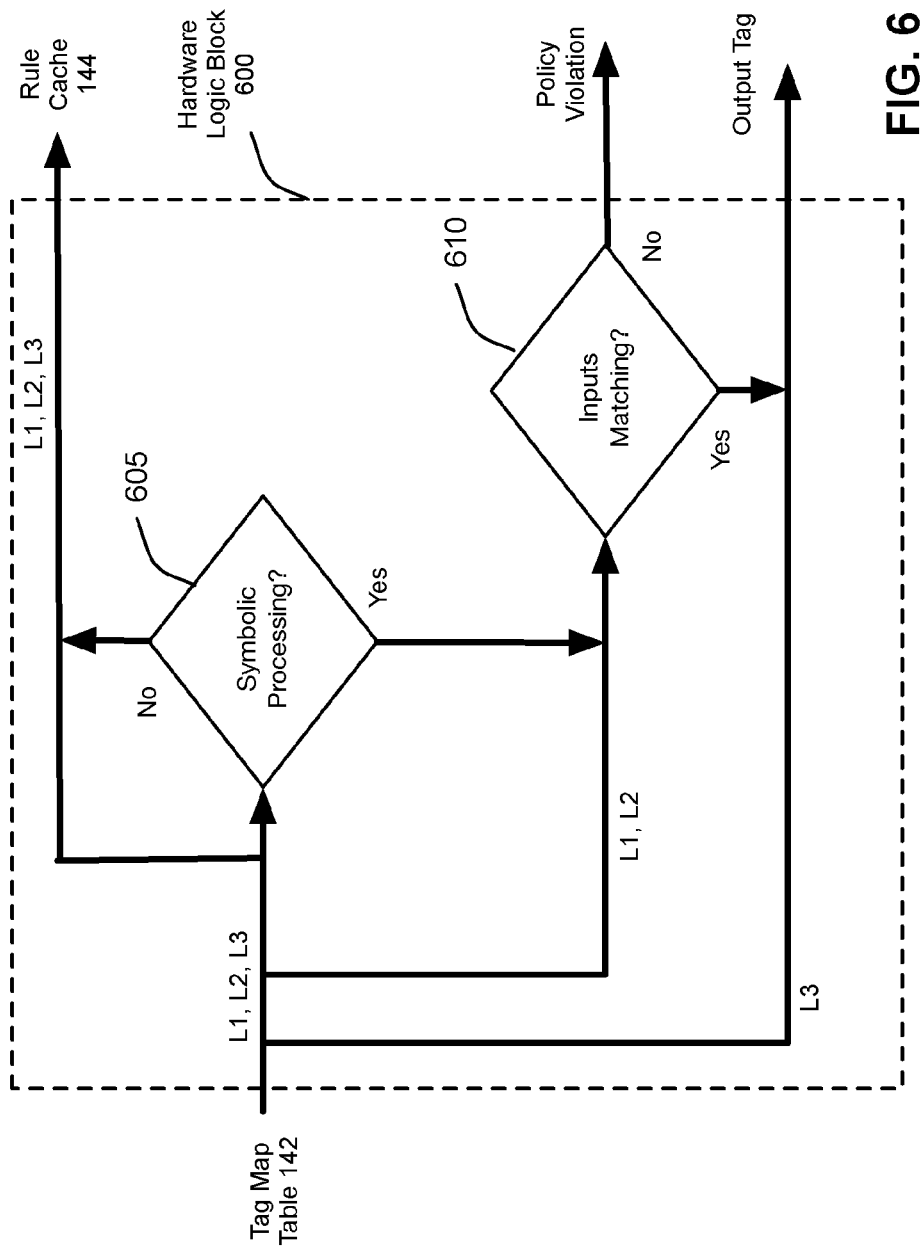
FIG. 6 shows an illustrative hardware logic block 600, in accordance with some embodiments.

FIG. 6 shows an illustrative hardware logic block 600, in accordance with some embodiments. For instance, the hardware logic block 600 may be part of the illustrative hardware accelerator 500 in the example of FIG. 5, and may be used to perform symbolic processing for a policy rule, such as a policy rule that receives three metadata labels as input, compares the first two input labels, and forwards the third input label to output if the first two input labels match. Thus, the hardware logic block 600 may provide a hardware implementation of a policy rule.

In some embodiments, the hardware logic block 600 may receive one or more metadata inputs from tag fetch logic, which may include the tag map table 142. The one or more metadata inputs may be in binary form. In the example shown in FIG. 6, the hardware logic block 600 receives three inputs, L1, L2, and L3. For instance, the input L1 may be associated with an address register for a data transfer instruction, the input L2 may be associated with a source of the data transfer instruction (e.g., an application memory address for a load instruction, a data register for a store instruction, or a source address for a direct memory access instruction), and the input L3 may be associated with a target of the data transfer instruction (e.g., a data register for the load instruction, an application memory address for the store instruction, or a target address for the direct memory access instruction).

Referring to the example of FIG. 4, the input L1 may be <<RED>>*1, the metadata read from the tag register corresponding to the address register R0, whereas the input L2 may be <<GREEN>>*1, the metadata read from the metadata memory address corresponding to the application memory address 0x1234, and the input L3 may be <<BLUE>>*0, the metadata read from the tag register corresponding to the data register R1.

In some embodiments, the hardware logic block 600 may include a sub-block 605, which may be configured to determine whether symbolic processing is to be performed. For instance, the inputs L1 and L2 may each include a classification bit indicative of whether symbolic processing is to be performed, and the sub-block 605 may check if both classification bits have been set to 1. If both classification bits have been set to 1, a sub-block 610 may be activated to compare selected portions of the inputs L1 and L2 (e.g., <<RED>> and <<GREEN>>, without classification bits). Otherwise, the three inputs L1, L2, and L3, or selected portions thereof (e.g., <<RED>>, <<GREEN>>, and <<BLUE>>, without classification bits), may be forwarded to the rule cache 144, which may check if there is an entry matching the three inputs. If there is no matching entry in the rule cache 144, the policy processor 150 may be invoked on the inputs L1, L2, and L3, or the selected portions thereof. Additionally, or alternatively, the inputs L1, L2, and L3, or the selected portions thereof, may be forwarded to one or more accelerators other than the hardware accelerator 500.

In the example of FIG. 6, an output of the sub-block 605 is used to gate an input to the sub-block 610, and an inverted output of the sub-block 605 is used to gate an input to the rule cache 144. However, it should be appreciated that aspects of the present disclosure are not limited to any particular configuration of hardware logic blocks.

In some embodiments, the sub-block 610 may be configured to perform an equality check on two input bit strings (e.g., <<RED>> and <<GREEN>>). If the input bit strings match, the input L3, a selected portion thereof (e.g., <<BLUE>>, without classification bits) may be forwarded along as an output of the hardware logic block 600. For instance, an output of the sub-block 610 may be used to gate an output of the hardware logic block 600. If the inputs L1 and L2 do not match, an error signal may be asserted, which may indicate that a policy has been violated. As a result, the store instruction attempting to write the data from the data register R1 to the location referenced by the application memory address 0x1234 (which is stored in the address register R0) may be disallowed.

In some embodiments, the hardware accelerator 500 may be configurable at run time to implement a plurality of different types of acceleration. For example, the sub-block 610 may be programmable, at run time, to switch among different types of matching, such as ==, >, <, >=, <=, etc. Additionally, or alternatively, an output sub-block may be provided to selectively forward one or more inputs (or selected portions thereof) in addition to, or instead of, L3 (or selected portion thereof).

In some embodiments, run time configurability may be provided via a lookup table, which may be implemented in any suitable manner (e.g., using a random-access memory). For instance, one or more values may be programmed into the lookup table at run time to indicate a desired acceleration operation corresponding to one or more classification bits. A key into the lookup table may be formed by concatenating, or otherwise combining, the one or more classification bits, and the lookup table may return the one or more values. However, it should be appreciated that aspects of the present disclosure are not limited to any particular technique for mapping a combination of one or more classification bits to a corresponding acceleration operation, or to using such a mapping at all. For instance, in some embodiments, an embedded FPGA fabric may be programmed to implement such a mapping.

The inventors have recognized and appreciated that some policy rules have a simple logical structure (e.g., the illustrative logical structure shown in FIG. 6), and therefore may be implemented using a small amount of hardware logic. By processing such policy rules symbolically using hardware logic (instead of a rule cache), a number of rule cache misses and/or a physical size of a rule cache may be reduced significantly, thereby significantly improving performance and/or reducing chip area.

Although various applications and potential advantages are described above in connection with FIGS. 5-6, it should be appreciated that aspects of the present disclosure are not limited to using a hardware accelerator. In some embodiments, one or more of the hardware logic blocks of the hardware accelerator 500 may be included in the tag map table 142 and/or the rule cache 144. Moreover, aspects of the present disclosure are not limited to using a classification bit to choose between a hardware accelerator and a rule cache. Additionally, or alternatively, one or more classification bits may be used to determine how a rule cache lookup is to be performed (e.g., which inputs are to be presented, to which rule cache the inputs are to be presented in case multiple rule caches are used, etc.).

It should also be appreciated that aspects of the present disclosure are not limited to processing metadata associated with data transfer instructions. For instance, in some embodiments, the inputs L1, L2, and L3 may be associated, respectively, with registers holding operands of an arithmetic instruction.

Figure 7A:
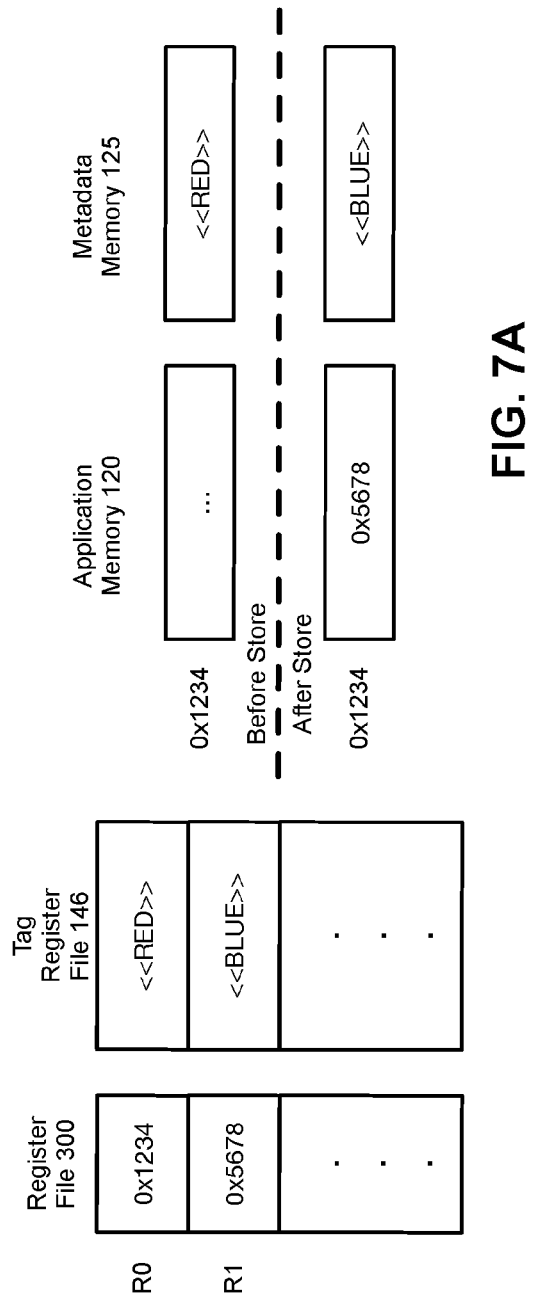
FIG. 7A shows another example involving the illustrative register file 300 of FIG. 3, in accordance with some embodiments.

FIG. 7A shows another example involving the illustrative register file 300 of FIG. 3, in accordance with some embodiments. In this example, the metadata label associated with the application memory address 0x1234 is RED, instead of GREEN. Thus, the illustrative access control rule described above may allow the store instruction to proceed, so that the content of the data register R1 may be written to the application memory address 0x1234.

In some embodiments, an information flow rule may be provided to propagate metadata associated with a data register to an application memory address to which data from the data register is written. In the example of FIG. 7A, the metadata label associated with the data register R1 (namely, BLUE) may, as a result of the store instruction, be carried over to the metadata memory address corresponding to the application memory address 0x1234, replacing the metadata label RED.

This may, however, interfere with the illustrative access control rule described above. For instance, associating the application memory address 0x1234 with the metadata label RED may mean that the application memory location referenced by the address 0x1234 is allocated for an application process A, and therefore the metadata label RED should remain with the address 0x1234 until the application memory location is released by the application process A, regardless of what content is stored in the application memory location. However, the illustrative information flow rule described above may replace the metadata label RED with the metadata label associated with the data register R1 (namely, BLUE), even though the application memory location referenced by the address 0x1234 has not been released by the application process A.

In some embodiments, interference between different rules may be avoided by using separate sets of metadata symbols. For instance, a policy language may be provided that allows metadata symbols to be declared using algebraic data types. As an example, there may be a metadata type Color, which may have three values: RED, BLUE, and GREEN. A constructor PTR may be applied to the metadata type Color to obtain a new metadata type PTR Color, which may also have three values: PTR RED, PTR BLUE, and PTR GREEN. Intuitively, an association with such a metadata symbol may be interpreted as a statement, "I am a red pointer," "I am a blue pointer," or "I am a green pointer."

Additionally, or alternatively, a constructor CEL may be applied to the metadata type Color to obtain a new metadata type CEL Color, which may also have three values: CEL RED, CEL BLUE, and CEL GREEN. Intuitively, an association with such a metadata symbol may be interpreted as a statement, "I reside at a red memory cell," "I reside at a blue memory cell," or "I reside at a green memory cell."

Figure 7B:
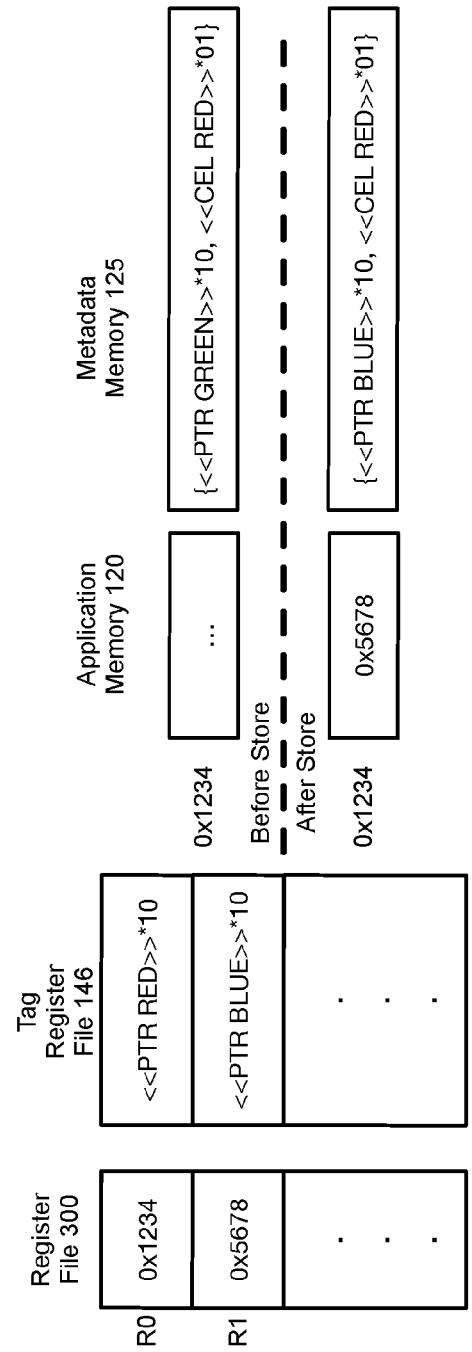
FIG. 7B shows another example involving the illustrative register file 300 of FIG. 3, in accordance with some embodiments.

FIG. 7B shows another example involving the illustrative register file 300 of FIG. 3, in accordance with some embodiments. In this example, separate sets of metadata symbols are used. For instance, instead of the metadata symbol RED, the address register R0 may be associated with the metadata symbol PTR RED, indicating that the application memory address 0x1234 stored in the address register R0 is a red pointer. Similarly, instead of the metadata symbol BLUE, the data register R1 may be associated with the metadata symbol PTR BLUE, indicating that the content of the data register R1 (which may be another application memory address, namely, 0x5678) is a blue pointer. Moreover, the application memory address 0x1234 may be associated with the metadata symbols CEL RED and PTR GREEN, indicating that the application memory address 0x1234 points to a red memory cell, and that a green pointer is stored therein.

In some embodiments, when a store instruction attempts to write the content of the data register R1 to the location referenced by the application memory address 0x1234, an access control rule may allow the store instruction to proceed, because the metadata associated with the address register R0 (namely, PTR RED) matches the metadata associated with the application memory address 0x1234 (namely, CEL RED).

On the other hand, an information flow rule may propagate the metadata associated with the data register R1 (namely, PTR BLUE) to the metadata memory address corresponding to the application memory address 0x1234, replacing the metadata symbol PTR GREEN. As a result, upon execution of the store instruction, the application memory address 0x1234 may be associated with the metadata symbol PTR BLUE, without disturbing the metadata symbol CEL RED. In this manner, the information flow rule may not interfere with the access control rule.

The inventors have recognized and appreciated that the metadata symbols PTR RED ("I am a red pointer"), PTR BLUE ("I am a blue pointer"), and PTR GREEN ("I am a green pointer") in the example of FIG. 7B may provide information about content that is stored at a location, whereas the metadata symbols CEL RED ("I reside at a red memory cell"), CEL BLUE ("I reside at a blue memory cell"), and CEL GREEN ("I reside at a blue memory cell") may provide information about the location itself.

The inventors have further recognized and appreciated that metadata that provides information about content and metadata that provides information about a location may have different update semantics. For example, in some instances, a piece of metadata may indicate that current content of an application memory location is considered private data of a particular user or application instance. Such content may be treated as private data regardless of how the content subsequently travels, and therefore the metadata may "flow" with the content. For instance, if the content is copied to a new location, the metadata may be carried over to an address of the new location. Additionally, or alternatively, if the content is overwritten by new content from another location, the metadata may be overwritten by metadata associated with the new content (e.g., metadata indicating that the new content is considered public data).

By contrast, in other instances, a piece of metadata may indicate that an application memory location is allocated for use by a particular user or application instance. Such metadata may stay "fixed" at the application memory location, regardless of what content is stored there. For instance, the metadata may be preserved even if content stored at the location is overwritten by new content. Additionally, or alternatively, if the content is copied to a new location, the metadata may not be carried over.

The inventors have recognized and appreciated that it may be desirable to make one or more hardware components aware of whether a metadata label includes flow metadata, fixed metadata, or both. This may allow a hardware component to process the metadata label differently depending on how the metadata label is classified, which may in turn lead to improved performance.

However, in practice, it may be challenging to implement this type of differentiated processing via hardware logic. For instance, metadata is often stored in an encoded form. It may be inefficient to decode a metadata label to determine whether the metadata label includes flow metadata, fixed metadata, or both (e.g., private data stored at a private location). Moreover, although the constructors PTR and CEL may be used to differentiate between flow metadata and fixed metadata for the illustrative heap protection policy discussed above, in practice a large number of policies may be enforced at the same time, and some of the policies may be loaded dynamically. Therefore, it may be challenging to keep track of such distinctions for all policies at a hardware level.

Accordingly, in some embodiments, a policy language may be provided that allows attribute values to be declared for metadata symbols. For instance, a metadata symbol such as PTR RED may be declared with an attribute value that indicates the metadata symbol is flow metadata, whereas a metadata symbol such as CEL RED may be declared with an attribute value that indicates the metadata symbol is fixed metadata.

In some embodiments, an attribute value may be declared for a metadata type. For example, with reference to the illustrative algebraic data types discussed above in connection with FIG. 7A, an attribute value may be declared for the metadata type Color to indicate that a metadata symbol of the type Color (e.g., RED, BLUE, GREEN, etc.) is comparison metadata. Additionally, or alternatively, an attribute value may be declared for the constructor PTR to indicate that a metadata symbol of the type PTR Color (e.g., PTR RED, PTR BLUE, PTR GREEN, etc.) is flow metadata. Additionally, or alternatively, an attribute value may be declared for the constructor CEL to indicate that a metadata symbol of the type CEL Color (e.g., CEL RED, CEL BLUE, CEL GREEN, etc.) is fixed metadata.

In some embodiments, a policy compiler and/or a policy linker (e.g., the illustrative policy compiler 220 and/or the illustrative policy linker 225 in the example of FIG. 2) may assemble attribute values for a composite metadata type. For instance, the policy compiler 220 and/or the policy linker 225 may mark the metadata symbol CEL RED with both the attribute value indicative of fixed metadata and the attribute value indicative of comparison metadata, because the constructor CEL is marked with the former, and the metadata symbol RED is marked with the latter. Likewise, the policy compiler 220 and/or the policy linker 225 may mark the metadata symbol PTR RED with both the attribute value indicative of flow metadata and the attribute value indicative of comparison metadata, because the constructor PTR is marked with the former, and the metadata symbol RED is marked with the latter.

Additionally, or alternatively, the policy compiler 220 and/or the policy linker 225 may assemble attribute values for a composite metadata label, which may include a set of metadata symbols for respective policies that are being enforced simultaneously. For instance, the policy compiler 220 and/or the policy linker 225 may mark the composite metadata label with a set of attribute values, where each attribute value in the set is used to mark some metadata symbol in the composite metadata label. With reference to the example of FIG. 7B, the application memory address 0x1234 may be associated with a composite metadata label {PTR GREEN, CEL RED}, where the metadata symbol PTR GREEN may be used by an information flow rule, whereas the metadata symbol CEL RED may be used by an access control rule. The policy compiler 220 and/or the policy linker 225 may mark this composite metadata label with all three attribute values: flow and comparison from PTR GREEN, and fixed and comparison from CEL RED.

It should be appreciated that access control rules and information flow rules are described herein solely for purposes of illustration. Flow metadata may be used by any suitable rule to determine how to update metadata, and fixed metadata may be used by any suitable rule to determine whether to allow an instruction.

In some embodiments, the policy compiler 220 and/or the policy linker 225 may use one or more attribute values for a metadata label to determine how to construct a binary representation of metadata. For instance, a binary representation of the metadata label may be augmented with one or more bits that encode one or more respective attribute values, such as a first bit for flow, a second bit for fixed, a third bit for comparison, etc. Thus, a metadata label such as PTR RED may have a binary representation with designated bits 101 (for flow and comparison), which may be denoted <<PTR RED>>*101. Likewise, a metadata label such as CEL RED may have a binary representation with designated bits 011 (for fixed and comparison), which may be denoted <<CEL RED>>*011. A composite metadata label such as {PTR GREEN, CEL RED} may have a binary representation with designated bits 111 (for flow, fixed, and comparison), which may be denoted <<{PTR GREEN, CEL RED}>>*111. Additionally, or alternatively, respective designated bits may be maintained for component metadata symbols, such as {<<PTR GREEN>>*101, <<CEL RED>>*011}.

The inventors have recognized and appreciated that such designated bits may be readily decoded by hardware logic to allow differentiated processing, thereby improving performance. However, it should be appreciated that aspects of the present disclosure are not limited to using any designated bit to perform differentiated processing at a hardware level, or to any particular combination of one or more designated bits. For instance, returning to the example of FIG. 7B, two designated bits are shown: 00 for none, 01 for fixed, 10 for flow, and 11 for both.

FIG. 8 shows an illustrative hardware logic block 800, in accordance with some embodiments. For instance, the hardware logic block 800 may be used to provide differentiated processing of metadata based on one or more classification bits. In some embodiments, the hardware logic block 800 may be provided as part of the illustrative hardware accelerator 500 shown in FIG. 5. However, that is not required. In some embodiments, one or more functionalities of the hardware logic block 800 may instead be implemented by a tag map table and/or a rule cache (e.g., the illustrative tag map table 142 and/or the illustrative rule cache 144 shown in FIG. 1).

In the example of FIG. 8, the hardware logic block 800 receives three inputs, L1, L2, and L3, from tag fetch logic, which may include the tag map table 142. These inputs may be in binary form. In some instances, the input L1 may be associated with an address register for a data transfer instruction, the input L2 may be associated with a source of the data transfer instruction (e.g., an application memory address for a load instruction, a data register for a store instruction, or a source address for a direct memory access instruction), and the input L3 may be associated with a target of the data transfer instruction (e.g., a data register for the load instruction, an application memory address for the store instruction, or a target address for the direct memory access instruction).

Referring to the example of FIG. 7B, the input L1 may be <<PTR RED>>*10, the metadata read from the tag register corresponding to the address register R0, whereas the input L2 may be <<PTR BLUE>>*10, the metadata read from the tag register corresponding to the data register R1, and the input L3 may be {<<PTR GREEN>>*10, <<CEL RED>>*01}, the metadata read from the metadata memory address corresponding to the application memory address 0x1234.

In some embodiments, the hardware logic block 800 may include a sub-block 805, which may be configured to check if the inputs L1, L2, and L3 all include designated bits 00 (neither flow nor fixed). This may be performed expeditiously, without fully decoding L1, L2, and L3. If L1, L2, and L3 all include designated bits 00, no further metadata processing may be performed, and the data transfer instruction may be allowed.

The inventors have recognized and appreciated that, in many instances, a host processor (e.g., the illustrative host processor 110 shown in FIG. 1) may be processing application data with neither flow metadata nor fixed metadata. For instance, when application data that is associated with fixed metadata, but no flow metadata, is loaded into a data register, the fixed metadata is not carried over, and therefore the application data, residing in the data register, may have neither flow metadata nor fixed metadata. Subsequently, the host processor 110 may perform arithmetic instructions on the application data with neither flow metadata nor fixed metadata. The inventors have recognized and appreciated that the sub-block 805 may allow such instructions to be quickly identified and disposed of without further metadata processing (e.g., without any rule cache lookup), which may in turn allow tag processing hardware (e.g., the illustrative tag processing hardware 140 shown in FIG. 1) to catch up following operations that take more than one clock cycle.

For example, in some instances, the tag processing hardware 140 may have yet to retrieve metadata (e.g., from the illustrative metadata memory 125 shown in FIG. 1) for a first instruction executed by the host processor 110, even though the host processor 110 has already executed at least one second instruction after the first instruction. Disposing of the at least one second instruction expeditiously, based on designated bits, may keep the tag processing hardware 140 from falling too far behind the host processor 110.

In some embodiments, if not all of L1, L2, and L3 include designated bits 00, a sub-block 810 may be activated to check if any of the inputs L1, L2, or L3 includes designated bits 10 (flow). For instance, an inverted output of the sub-block 805 may be used to gate an input to the sub-block 810.

The inventors have recognized and appreciated that, if none of L1, L2, and L3 includes flow metadata, there may be no need to perform any metadata update. For instance, referring to the example of FIG. 7A, if no information flow rule is being enforced, the metadata label BLUE associated with the data register R1 may not be marked with designated bits 10 (flow), and may not be carried over as a result of the store instruction. Therefore, the metadata associated with the application memory address 0x1234 may not be updated following the store instruction (e.g., the metadata label RED may remain).

As another example, a heap protection policy may be enforced, but neither the data register R1 nor the memory location at the application memory address 0x1234 may store a pointer. Thus, neither the data register R1 nor the application memory address 0x1234 may be associated with any flow metadata of the heap protection policy, and no metadata update may be performed as a result of the store instruction.

Accordingly, in some embodiments, the sub-block 810 may check, expeditiously, if any of the inputs L1, L2, or L3 includes designated bits 10 (flow), without fully decoding L1, L2, and L3. If none of L1, L2, and L3 is marked with 10 (flow), L1, L2, and L3 (or selected portions thereof) may be forwarded to a fixed rule cache 144A, which may be configured to process fixed metadata only. For instance, an inverted output of the sub-block 810 may be used to gate an input to the fixed rule cache 144A.

The inventors have recognized and appreciated that, because there is no metadata update, the fixed rule cache 144A may not output any metadata label, and therefore may be narrower than the rule cache 144. Thus, by using a separate rule cache configured to process fixed metadata only, memory savings may be achieved. However, it should be appreciated that aspects of the present disclosure are not limited to using a separate rule cache.

In some embodiments, if at least one of L1, L2, and L3 includes designated bits 10 (flow), a sub-block 815 may be activated. For instance, an output of the sub-block 810 may be used to gate an input to the sub-block 815.

The inventors have recognized and appreciated that, if the input L3, which may be associated with the target of the data transfer instruction, does not include fixed metadata, there may be no need to perform any rule cache lookup. For instance, referring again to the example of FIG. 7A, if no access control rule is being enforced, the metadata label RED associated with the application memory address 0x1234 may not be marked with designated bits 01 (fixed), and the store instruction may be allowed without performing any rule cache lookup. As a result of the store instruction, the metadata label BLUE associated with the data register R1 may be carried over, without being fully decoded, to the metadata memory address associated with the application memory address 0x1234. This may be appropriate because an information flow rule may simply indicate that flow metadata is to be propagated from source to target. Precise meaning of the flow metadata may be irrelevant for such an information flow rule.

Accordingly, in some embodiments, the sub-block 815 may check, expeditiously, if L3 includes designated bits 01 (fixed), without fully decoding L3. If L3 does not include designated bits 01 (fixed), the sub-block 815 may check if L1 and L2 are reducible. For instance, the sub-block 815 may check if only one of L1 and L2 includes designated bits 10 (flow). Additionally, or alternatively, the sub-block 815 may check if both L1 and L2 include designated bits 10 (flow) but include the same flow metadata.

If L3 does not include designated bits 01 (fixed) and only one of L1 and L2 includes designated bits 10 (flow), then that one of L1 and L2 (or a selected portion thereof) may be forwarded along as an output of the hardware logic block 800. Additionally, or alternatively, if L3 does not include designated bits 01 (fixed) and both L1 and L2 include designated bits 10 (flow) but include the same flow metadata, then either L1 or L2 (or a selected portion thereof) may be forwarded along as an output of the hardware logic block 800, provided L3 does not include designated bits 01 (fixed).

In some embodiments, L1 or L2 (or a selected portion thereof) may be forwarded along as an output of the hardware logic block 800 without being fully decoded. Again, this may be appropriate because an information flow rule may simply indicate that flow metadata is to be propagated from source to target, without regard to precise meaning of the flow metadata. For instance, the input L1 may be associated with a register storing a first operand of an arithmetic instruction (e.g., adding a constant offset to a memory address), the input L2 may be associated with a register storing a second operand of the arithmetic instruction, and the input L3 may be associated with a register storing a result of the arithmetic instruction. After execution of the instruction, flow metadata may simply be propagated from one of the operands (e.g., the memory address) to the result.

In some embodiments, an output of the sub-block 815 may be used to gate an output of the hardware logic block 800. For instance, if L3 does not include designated bits 01 (fixed), the sub-block 815 may output a signal to enable the output of the hardware logic block 800. Additionally, or alternatively, the sub-block 815 may output a signal to select between L1 and L2 as the output of the hardware logic block 800.

In some embodiments, if one or more checks performed by the sub-block 815 fail, L1, L2, and L3 (or selected portions thereof) may be forwarded to the rule cache 144 for further processing. For instance, an inverted output of the sub-block 815 may be used to gate an input to the rule cache 144.

It should be appreciated that details of implementation are shown in FIG. 8 and described above solely for purposes of illustration. For instance, the hardware logic block 800 may include any suitable combination of one or more of the sub-blocks 805, 810, and 815, and/or one or more other sub-blocks. Moreover, aspects of the present disclosure are not limited to any particular ordering of the sub-blocks 805, 810, and 815. In some embodiments, the sub-blocks 805, 810, and 815 may be placed in parallel, instead of being in a sequence.

It should also be appreciated that the techniques described herein may be implemented in any suitable manner, for example, using any suitable combination of software and/or hardware. For instance, any one or more of the checks performed by the hardware logic block 800 may be implemented via software executed by a policy processor (e.g., the illustrative policy processor 150 shown in FIG. 1).

In some embodiments, a single rule may incorporate both access control and information flow aspects. Referring to the example of FIG. 7B, a combined rule may check whether the content metadata associated with the address register R0 (namely, PTR RED) matches the location metadata associated with the application memory address 0x1234 (namely, CEL RED). If so, the content metadata associated with the data register R1 (namely, PTR BLUE) may be propagated to the metadata memory address associated with the application memory address 0x1234.

The inventors have recognized and appreciated that, while using a combined rule may result in fewer invocations of a policy processor and/or fewer accesses to a rule cache, there may be higher rule cache pressure. For instance, in the example of FIG. 7B, with a combined rule and three colors RED, BLUE, and GREEN, $3^2=9$ rule cache entries may be stored as follows.
1) If R0=PTR RED and mem={CEL RED, DEF} and R1=PTR RED then mem={CEL RED, PTR RED}
2) If R0=PTR RED and mem={CEL RED, DEF} and R1=PTR BLUE then mem={CEL RED, PTR BLUE}
3) If R0=PTR RED and mem={CEL RED, DEF} and R1=PTR GREEN then mem={CEL RED, PTR GREEN}
4) If R0=PTR BLUE and mem={CEL BLUE, DEF} and R1=PTR RED then mem={CEL BLUE, PTR RED}
5) If R0=PTR BLUE and mem={CEL BLUE, DEF} and R1=PTR BLUE then mem={CEL BLUE, PTR BLUE}
6) If R0=PTR BLUE and mem={CEL BLUE, DEF} and R1=PTR GREEN then mem={CEL BLUE, PTR GREEN}
7) If R0=PTR GREEN and mem={CEL GREEN, DEF} and R1=PTR RED then mem={CEL GREEN, PTR RED}
8) If R0=PTR GREEN and mem={CEL GREEN, DEF} and R1=PTR BLUE then mem={CEL GREEN, PTR BLUE}
9) If R0=PTR GREEN and mem={CEL GREEN, DEF} and R1=PTR GREEN then mem={CEL GREEN, PTR GREEN}

In this example, the symbol DEF denotes a default metadata value, such as a bit string of all 1's. For instance, the content metadata associated with the application memory address 0x1234 prior to the store instruction (namely, PTR GREEN) may be irrelevant in deciding whether the store instruction should be allowed, and may be replaced by the content metadata associated with the data register R1 (namely, PTR BLUE) as a result of the store instruction. Therefore, the content metadata associated with the application memory address 0x1234 prior to the store instruction may be masked (e.g., replaced by the default symbol DEF) before being presented to a rule cache (e.g., the illustrative rule cache 144 in the example of FIG. 1).

The inventors have recognized and appreciated that the combined rule described above may lead to increased rule cache pressure because the content metadata associated with the address register R0 and the content metadata associated with the data register R1 may be independent of each other. For instance, the content metadata associated with the address register R0 and the content metadata associated with the data register R1 may independently take on one of three distinct color values (namely, PTR RED, PTR BLUE, and PTR GREEN), so that a total of $3^2=9$ rule cache entries may arise. More generally, if a rule has M independent variables, where each variable may take on one of N distinct values, a total of $N^M$ entries may be stored in the rule cache.

By contrast, with M separate rules each involving just one variable, M×N rule cache entries may be sufficient. Referring again to the example of FIG. 7B, with separate rules for access control and information flow, 2×3=6 rule cache entries may be provided as follows.
1) If R0=PTR RED and mem=CEL RED, then allow store instruction
2) If R0=PTR BLUE and mem=CEL BLUE, then allow store instruction
3) If R0=PTR GREEN and mem=CEL GREEN, then allow store instruction
1) If R1=PTR RED, then mem=PTR RED
2) If R1=PTR BLUE, then mem=PTR BLUE
3) If R1=PTR GREEN, then mem=PTR GREEN The inventors have recognized and appreciated that, where M is constant (e.g., two variables, one for access control and the other for information flow), M×N grows more slowly than $N^M$ as N (the number of distinct color values) grows. Therefore, it may be possible to reduce rule cache pressure by breaking down a rule involving M independent variables into multiple rules that each involve a smaller number of independent variables.

However, the inventors have further recognized and appreciated that, if separate access control and information flow rules are enforced via composite rule cache entries, a reduction in cache pressure may not be achieved. For instance, a composite rule cache entry may be constructed as a matrix of M rows, where each row corresponds to a respective policy rule and stores a constituent rule cache entry for that policy rule. Referring to the illustrative access control and information flow rules described above, there may be M=2 rows in each composite rule cache entry, one for the access control rule and one for the information flow rule. Since each row has N=3 possibilities, there may be $N^M=3^2=9$ possible composite rule cache entries. That is the same number of rule cache entries for the illustrative combined rule described above, so there is no reduction.

Accordingly, in some embodiments, separate policy rules (e.g., an access control rule and an information flow rule) may be enforced using separate rule cache entries. Techniques are provided herein for managing multiple rule cache lookups, so that an instruction may be allowed only if all policy rules represented by the separate rule cache entries are satisfied. For instance, in some embodiments, one or more hardware logic blocks may be provided to use one or more metadata labels to construct inputs for the different rule cache lookups.

Figure 9:
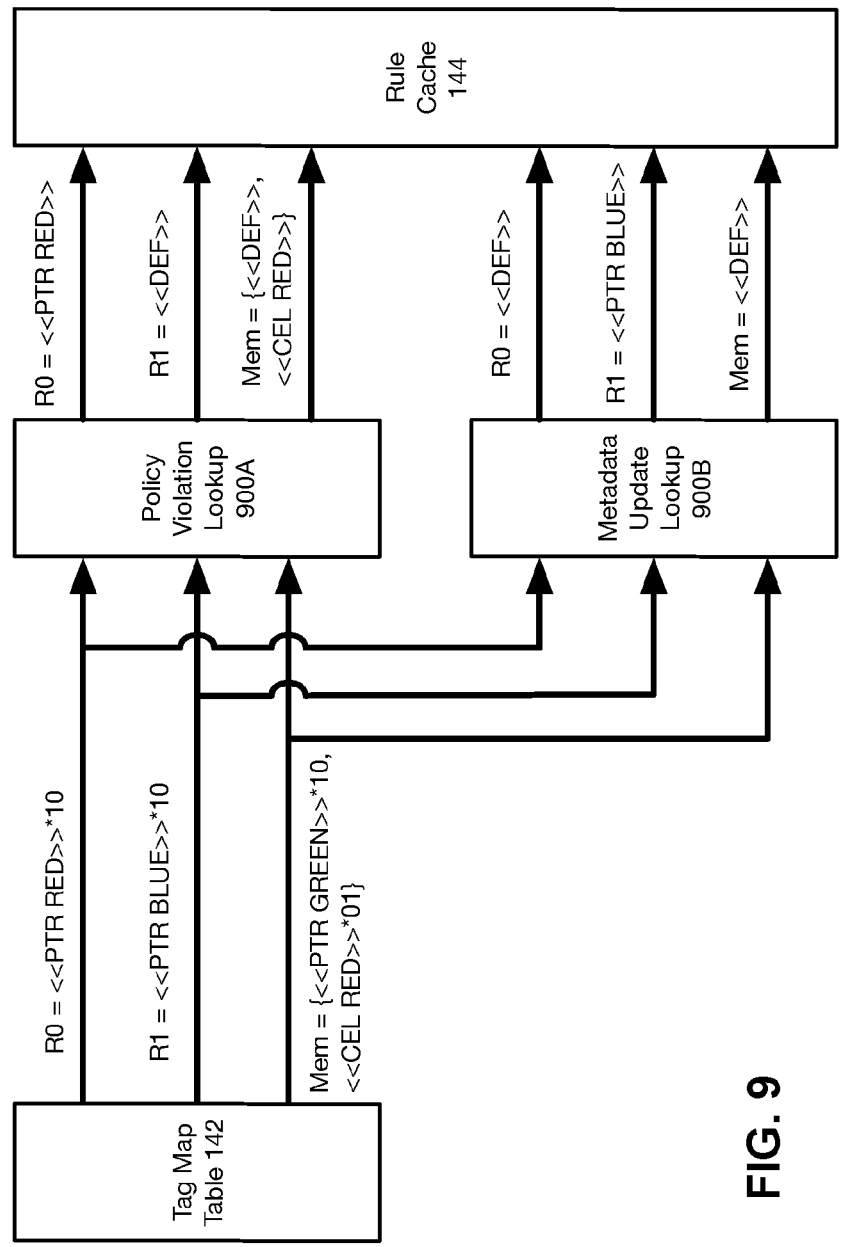
FIG. 9 shows illustrative hardware logic blocks 900A-B, in accordance with some embodiments.

FIG. 9 shows illustrative hardware logic blocks 900A-B, in accordance with some embodiments. For instance, the hardware logic blocks 900A-B may be used to construct inputs for different rule cache lookups. In some embodiments, the hardware logic blocks 900A-B may be provided as part of the illustrative hardware accelerator 500 shown in FIG. 5. However, that is not required. In some embodiments, one or more functionalities of the hardware logic blocks 900A-B may instead be implemented by a tag map table and/or a rule cache (e.g., the illustrative tag map table 142 and/or the illustrative rule cache 144 shown in FIG. 1).

Similar to the illustrative hardware logic block 800 in the example of FIG. 8, the hardware logic blocks 900A-B may each receive three metadata inputs from tag fetch logic, which may include the tag map table 142. Referring to the example of FIG. 7B, the first input may be <<PTR RED>>*10, the metadata read from the tag register corresponding to the address register R0, whereas the second input may be <<PTR BLUE>>*10, the metadata read from the tag register corresponding to the data register R1, and the third input may be {<<PTR GREEN>>*10, <<CEL RED>>*01}, the metadata read from the metadata memory address corresponding to the application memory address 0x1234.

In some embodiments, binary representations of metadata may include designated bits indicative of how metadata symbols are classified, such as 00 for none, 01 for fixed, 10 for flow, and 11 for both. For instance, the metadata symbol PTR RED associated with the address register R0, the metadata symbol PTR BLUE associated with the data register R1, and the metadata symbol PTR GREEN associated with the application memory address 0x1234 may be marked with 10 (flow), whereas the metadata symbol CEL RED associated with the application memory address 0x1234 may be marked with 01 (fixed).

In some embodiments, the hardware logic block 900A may be configured to use the metadata inputs to construct an input for a first rule cache lookup, such as a lookup for an access control rule. For instance, the hardware logic block 900A may mask flow metadata from the source and/or the target of the data transfer instruction. Referring again to the example of FIG. 7B, the hardware logic block 900A may mask the metadata symbol PTR BLUE associated with the data register R1 and the metadata symbol PTR GREEN associated with the application memory address 0x1234, because both may be marked with 10 (flow). The resulting input to the rule cache 144 may include the following, where the symbol DEF denotes a default metadata value (e.g., a bit string of all 1's).

R0=PTR RED, R1=DEF, mem={DEF, CEL RED}

In some embodiments, the metadata {<<PTR GREEN>>*10, <<CEL RED>>*01} associated with the application memory address 0x1234 may be a 32-bit string, where the first 16 bits may encode PTR GREEN (with designated bits 10) and the last 16 bits may encode CEL RED (with designated bits 01). Thus, each of <<PTR GREEN>> and <<CEL RED>> may have 14 bits. To mask the metadata symbol PTR GREEN, the 32-bit string encoding {<<PTR GREEN>>*10, <<CEL RED>>*01} may be combined with a 32-bit mask via an OR operator, where the first 16 bits of the mask are all 1's, and the last 16 bits of the mask are all 0's. Although not shown in FIG. 9, the mask may, in some embodiments, be output by the tag map table 142.

It should be appreciated that aspects of the present disclosure are not limited any particular technique for masking flow metadata, or to masking flow metadata at all. In some embodiments, a default metadata value of all 0's may be used, and the 32-bit string encoding {<<PTR GREEN>>*10, <<GEL RED>>*01} may be combined with a 32-bit mask via an AND operator, where the first 16 bits of the mask are all 0's, and the last 16 bits of the mask are all 1's.

In some embodiments, the hardware logic block 900B may be configured to use the metadata inputs to construct an input for a second rule cache lookup, such as a lookup for an information flow rule. For instance, the hardware logic block 900B may mask the metadata symbol PTR RED associated with the address register R0, because metadata associated with an address register may not be relevant for an information flow rule. Additionally, or alternatively, the hardware logic block 900B may mask fixed metadata from the source of the data transfer instruction. Additionally, or alternatively, the hardware logic block 900B may mask both fixed metadata and flow metadata from the target of the data transfer instruction. The resulting input to the rule cache 144 may include the following, where the symbol DEF denotes a default metadata value (e.g., a bit string of all 1's).

R0=DEF, R1=PTR BLUE, mem=DEF

In this manner, the access control rule and the information flow rule may be enforced using separate rule cache lookups, which, as explained above, may reduce rule cache pressure. However, it should be appreciated that aspects of the present disclosure are not limited to enforcing different rules using separate rule cache lookups. In some embodiments, one or both of the access control rule and the information flow rule may be enforced without using a rule cache lookup (e.g., using one or more of the symbolic processing techniques described above in connection with FIGS. 6, 8). For instance, the rule cache lookup for the information flow rule may be replaced by hardware logic processing, as discussed above in connection with the illustrative sub-block 815 shown in FIG. 8. Additionally, or alternatively, the hardware logic block 900A may be configured to provide input to the illustrative fixed rule cache 144A, as discussed above in connection with the illustrative sub-block 810 shown in FIG. 8. Additionally, or alternatively, the hardware logic block 900A may be configured to output the metadata label PTR RED associated with the address register R0 and the metadata label CEL RED associated with the application memory address 0x1234 to the illustrative sub-block 610 shown in FIG. 6, which may be adapted to check that the metadata label PTR RED and the metadata label CEL RED are content and location counterparts of the same color (which may be a form of partial equality), and if so, output the metadata label PTR BLUE provided by the hardware logic block 900B.

In some embodiments, a tag map table (e.g., the illustrative tag map table 142 shown in FIG. 1) may be configured to allow multiple fetches of metadata on a single input application memory address. The fetched metadata may then be used to perform multiple lookups in a rule cache, for example, as described above in connection with FIG. 9. Additionally, or alternatively, multiple rule caches may be used, for example, as described above in connection with FIG. 8.

Figure 10:
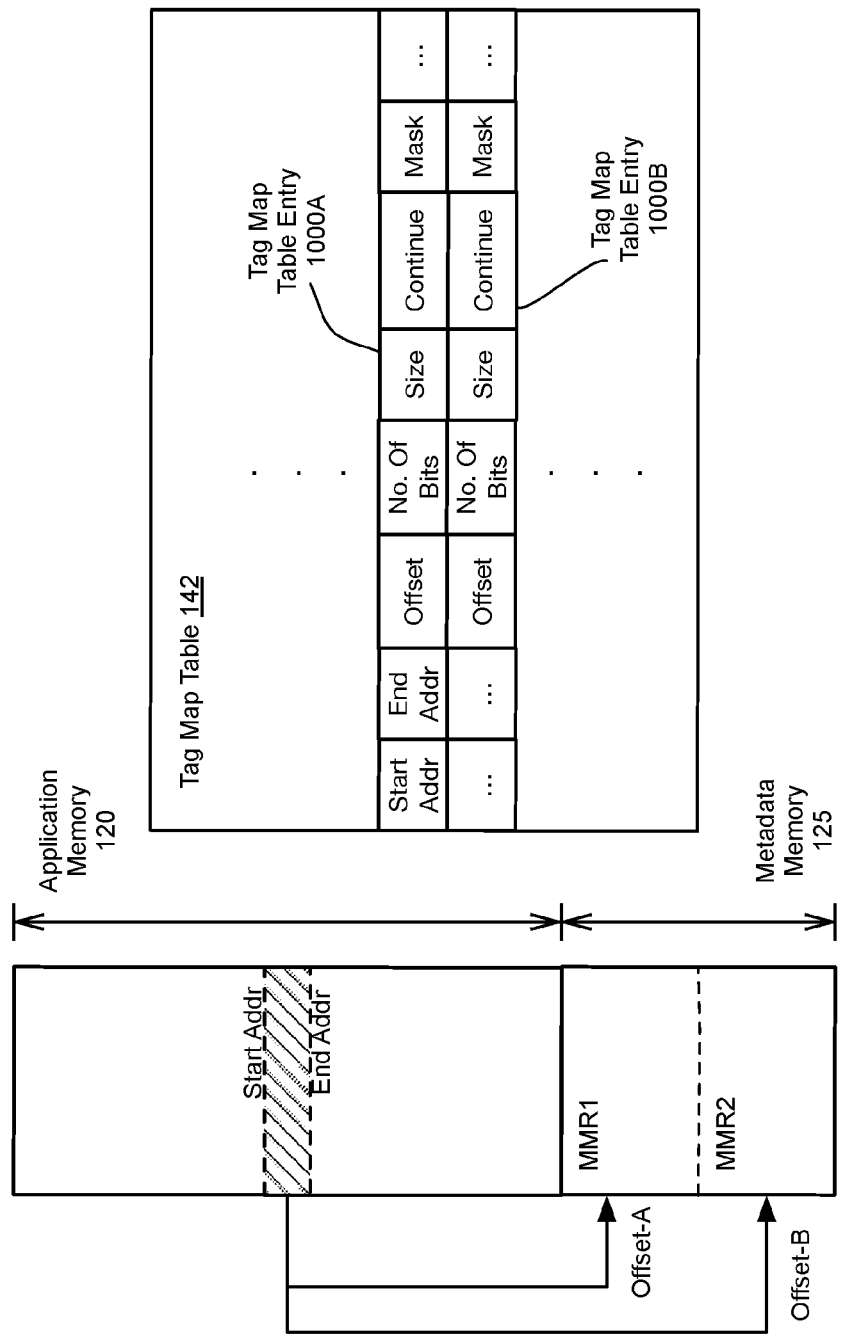
FIG. 10 shows illustrative tag map table entries 1000A-B, in accordance with some embodiments.

FIG. 10 shows illustrative tag map table entries 1000A-B, in accordance with some embodiments. For instance, the entries 1000A-B may be in the illustrative tag map table 142 shown in FIG. 1, and may be linked so that both entries may be accessed on a single input application memory address.

In some embodiments, the tag map table 142 may be implemented using a fully associative array. Additionally, or alternatively, the tag map table 142 may be implemented using a hardware page table walker. If the fully associative array becomes full, one or more overflow entries may be stored in a table in a memory (e.g., the illustrative metadata memory 125 shown in FIG. 1). If an input address does not match any entry in the fully associative array, the hardware page table walker may be used to walk through the table in the memory to identify an entry, if any, that matches the input address.

In the example of FIG. 10, the tag map table entry 1000A stores, in an "Offset" field, a first offset value to be added to an input address in an application memory (e.g., the illustrative application memory 120 shown in FIG. 1) to obtain a first address in a metadata memory (e.g., the illustrative metadata memory 125 shown in FIG. 1). Similarly, the tag map table entry 1000B may store, in an "Offset" field, a second offset value to be added to the input address to obtain a second metadata memory address. The first and second offset values are shown in FIG. 10, respectively, as "Offset-A" and "Offset-B."

Additionally, or alternatively, the tag map table entry 1000A may store information that associates the tag map table entry 1000A with one or more application memory addresses. For instance, the tag map table entry 1000A may store a start address and an end address, which may indicate an address range with which the tag map table entry 1000A is associated. In some embodiments, the same start address and end address may be stored in the tag map table entry 1000B, although that is not required. In some embodiments, a different start address and/or a different end address may be stored in the tag map table entry 1000B (e.g., a subrange of the address range of the tag map table entry 1000A).

In some embodiments, when a host processor (e.g., the illustrative host processor 110 shown in FIG. 1) attempts to load data from, or store data to, an application memory, a target address of the load/store instruction may be used by tag processing hardware (e.g., the illustrative tag processing hardware 140 shown in FIG. 1) to determine whether the load/store instruction should be allowed.

In some embodiments, the tag processing hardware 140 may match the target address to an entry in the tag map table 142, such as the tag map table entry 1000A. For instance, the tag processing hardware 140 may determine that the target address falls within an application memory range indicated by the start address and the end address stored in the tag map table entry 1000A. The tag processing hardware 140 may then add the offset value stored in the tag map table entry 1000A (Offset-A) to the target address to obtain a first metadata memory address, and may use the first metadata memory address to retrieve, from the metadata memory 125, a first metadata label associated with the target address.

However, it should be appreciated that aspects of the present disclosure are not limited to any particular technique for mapping a target address to a metadata memory address. In some embodiments, a metadata memory address may be obtained by applying a mask to the target address. For instance, the mask may include N zeros, so that a block of $2^N$ addresses may be mapped to a same metadata memory address. A result of masking the N least significant bits to zero may be compared to a first value. If the result matches the first value, the target address may be combined with a second value (e.g., using an OR operation) to obtain the metadata memory address. In some embodiments, the first value may be indicative of an address block of size $2^N$ in the application memory, and the second value may be indicative of an offset with N trailing zeros. The first and second values may not share any power of 2, so that combing the target address with the second value using an OR operation may result in a sum of the target address and the offset. This may provide savings in area on a chip, because an OR operations may be simpler to implement than an addition operation.

In some embodiments, the tag map table entries 1000A-B may be linked together by setting a bit in a "Continue" field of the tag map table entry 1000A. For instance, the tag processing hardware 140 may check the bit in the "Continue" field of the tag map table entry 1000A. If that bit has been set to 1, the tag processing hardware 140 may continue to the tag map table entry 1000B. The tag processing hardware 140 may add the offset value stored in the tag map table entry 1000B (Offset-B) to the target address to obtain a second metadata memory address, and may use the second metadata memory address to retrieve, from the metadata memory 125, a second metadata label associated with the target address.

In some embodiments, the tag map table entry 1000B may also have a "Continue" field that stores a bit. If that bit has been set to 1, the tag processing hardware 140 may continue to a next entry (not shown in FIG. 10) in the tag map table entry 142. In this manner, any suitable number of entries in the tag map table 142 may be linked together, which may in turn allow any suitable number of policy rules to be enforced via separate rule cache lookups.

However, it should be appreciated that aspects of the present disclosure are not limited to using a "Continue" field to link together multiple tag map table entries. In some embodiments, the tag processing hardware 140 may be configured to invoke the tag map table 142 multiple times using the same input application memory address. For instance, a counter may be used to keep track of a number of times the tag map table 142 is to be accessed.

Additionally, or alternatively, the tag map table entry 1000A may include a field (not shown in FIG. 10) that stores a pointer pointing to another tag map table entry to be accessed, or to an additional tag map table storing one or more entries to be accessed. Additionally, or alternatively, the tag processing hardware 140 may be configured to decompose a binary representation of metadata (e.g., a 32-bit value) retrieved via a single tag map table fetch into multiple binary representations of metadata (e.g., first 16 bits as a first binary representation of metadata, and last 16 bits as a second binary representation of metadata) to be used in different rule cache lookups.

Moreover, while Offset-A and Offset-B in the example of FIG. 10 point to disparate regions of the metadata memory 125, aspects of the present disclosure are not so limited. In some embodiments, Offset-A and Offset-B may point to a same region of the metadata memory 125. For instance, Offset-A may point to an even byte, whereas Offset-B may point to an immediately following odd byte. In this manner, consecutive bytes may be retrieved, which may improve cache performance.

Referring again to the examples shown in FIGS. 7B, 9, the target address matching the tag map table entry 1000A may be the application memory address 0x1234 stored in the illustrative address register R0, whereas the first metadata retrieved from the first metadata memory address may include a binary representation of the metadata symbol CEL RED, and the second metadata retrieved from the second metadata memory address may include a binary representation of the metadata symbol PTR GREEN. In some embodiments, the first metadata may include one or more designated bits indicative of how the metadata symbol CEL RED is classified, such as 01 for fixed. Likewise, the second metadata may include one or more designated bits indicative of how the metadata symbol PTR GREEN is classified, such as 10 for flow.

In some embodiments, the metadata memory 125 may include two regions, shown as MMR1 and MMR2 in the example of FIG. 10. The region MMR1 may be designated for storing fixed metadata, where the region MMR2 may be designated for storing flow metadata. In this manner, the metadata symbols CEL RED and PTR GREEN may be stored without classification bits. For instance, one or more hardware logic blocks may be provided to strip the bits 01 before storing fixed metadata to the region MMR1, and/or add the bits 01 after retrieving fixed metadata from the region MMR1. Likewise, one or more hardware logic blocks may be provided to strip the bits 10 before storing flow metadata to the region MMR2, and/or add the bits 10 after retrieving fixed metadata from the region MMR2. Such hardware logic blocks may be part of, or separate from, the tag map table 142.

The inventors have recognized and appreciated that stripping classification bits prior to storage may reduce an amount of memory used for storing metadata. However, it should be appreciated that aspects of the present disclosure are not limited to storing metadata without classification bits.

In the example shown in FIG. 10, the application memory 120 and the metadata memory 125 are portions of a same physical memory. A memory management component may be used that implements an appropriate protection scheme to prevent instructions executing on the host processor from modifying metadata stored in the metadata memory 125. However, it should be appreciated that aspects of the present disclosure are not so limited. In some embodiments, the application memory 120 and the metadata memory 125 may be implemented on physically separate memories, and an appropriate mapping scheme may be used to map application memory addresses to metadata memory addresses.

In some embodiments, the tag map table entry 1000A may include a field denoted "No. of Bits." The No. of Bits field may store a value indicating a length of an encoded metadata value to be retrieved from the metadata memory. For instance, the No. of Bits field may store a value indicating that the encoded metadata value may have a length of zero bits, one bit, two bits, three bits, four bits, five bits, . . . , 8 bits (or one byte), . . . , 16 bits (or two bytes), etc. However, it should be appreciated that aspects of the present disclosure are not limited to indicating encoded metadata length in terms of bits. In some embodiments, a "No. of Bytes" field may be provided. Similarly, the tag map table entry 1000B may also include a field denoted "No. of Bits," which may store a value indicating a length of an encoded metadata value to be retrieved from the metadata memory.

The inventors have recognized and appreciated that the "No. of Bits" fields in the tag map table entries 1000A-B may be configured with different values. For instance, in some embodiments, more distinct values may be used for fixed metadata compared to flow metadata (or vice versa). Accordingly, a higher value may be stored in the "No. of Bits" field in the tag map table entries 1000A compared to the tag map table entries 1000B (or vice versa). This may provide flexibility in metadata usage. However, it should be appreciated that aspects of the present disclosure are not limited to storing any particular value or combination of values in the "No. of Bits" fields.

In some embodiments, the tag map table 142 may assign one or more classification bits to a region of the application memory 120. For instance, the tag map table 142 may map an address in the application memory 120 to an address in the metadata memory 125, and the one or more classification bits may be added to a tag retrieved from the metadata memory address.

In some embodiments, the tag map table 142 may allow one or more classification bits to be stored in a smaller tag by changing a position of the one or more classification bits as the tag is loaded from the metadata memory 125. For instance, an 8-bit tag in memory may be converted to a 32-bit system representation by shifting three classification bits from positions 7:5 in the 8-bit tag to positions 31:29 in the 32-bit system tag.

Illustrative techniques for encoding/decoding metadata values are described in International Patent Application No.: PCT/US2019/060698, entitled "SYSTEMS AND METHODS FOR METADATA ENCODING," filed on Nov. 11, 2019, which is incorporated herein by reference in its entirety. However, it should be appreciated that aspects of the present disclosure are not limited to any particular encoding/decoding technique.

In some embodiments, the tag map table entry 1000A may include a field denoted "Mask." The Mask field may store a bit string to be combined with an encoding of metadata to mask one or more selected bits in the encoding. For instance, as described above in connection with FIG. 9, the tag map table 142 may output a 32-bit string encoding, {<<PTR GREEN>>*10, <<CEL RED>>*01}, of the metadata associated with the application memory address 0x1234, where the first 16 bits may encode PTR GREEN (with designated bits 10) and the last 16 bits may encode CEL RED (with designated bits 01). The Mask field of the tag map table entry 1000A may store a 32-bit mask, where the first 16 bits of the mask are all 1's, and the last 16 bits of the mask are all 0's. The illustrative policy violation lookup 900A shown in FIG. 9 may combine this mask with the 32-bit string encoding {<<PTR GREEN>>*10, <<CEL RED>>*01} to mask the metadata label PTR GREEN, and a result may be used to provide input to the rule cache 144.

Similarly, the tag map table entry 1000B may include a field denoted "Mask" for storing one or more masking bits. For instance, the Mask field of the tag map table entry 1000B may store a 32-bit mask, where the first 16 bits of the mask are all 0's, and the last 16 bits of the mask are all 1's. This mask may be combined with the 32-bit string encoding {<<PTR GREEN>>*10, <<CEL RED>>*01} to mask the metadata label CEL RED.

However, it should be appreciated that aspects of the present disclosure are not limited to any particular technique for masking metadata, or to using a mask to construct a rule cache input or a metadata output.

It should also be appreciated that aspects of the present disclosure are not limited to enforcing policies against instructions executed by a host processor. For instance, the inventors have recognized and appreciated that a transfer of data via direct memory access (DMA) may be viewed as a load instruction from a source memory location immediately followed by a store instruction to a target memory location, without storing the data in any intermediate data register. Accordingly, in some embodiments, one or more of the techniques described herein may be used to check data transfer instructions performed by a DMA device.

Figure 11:
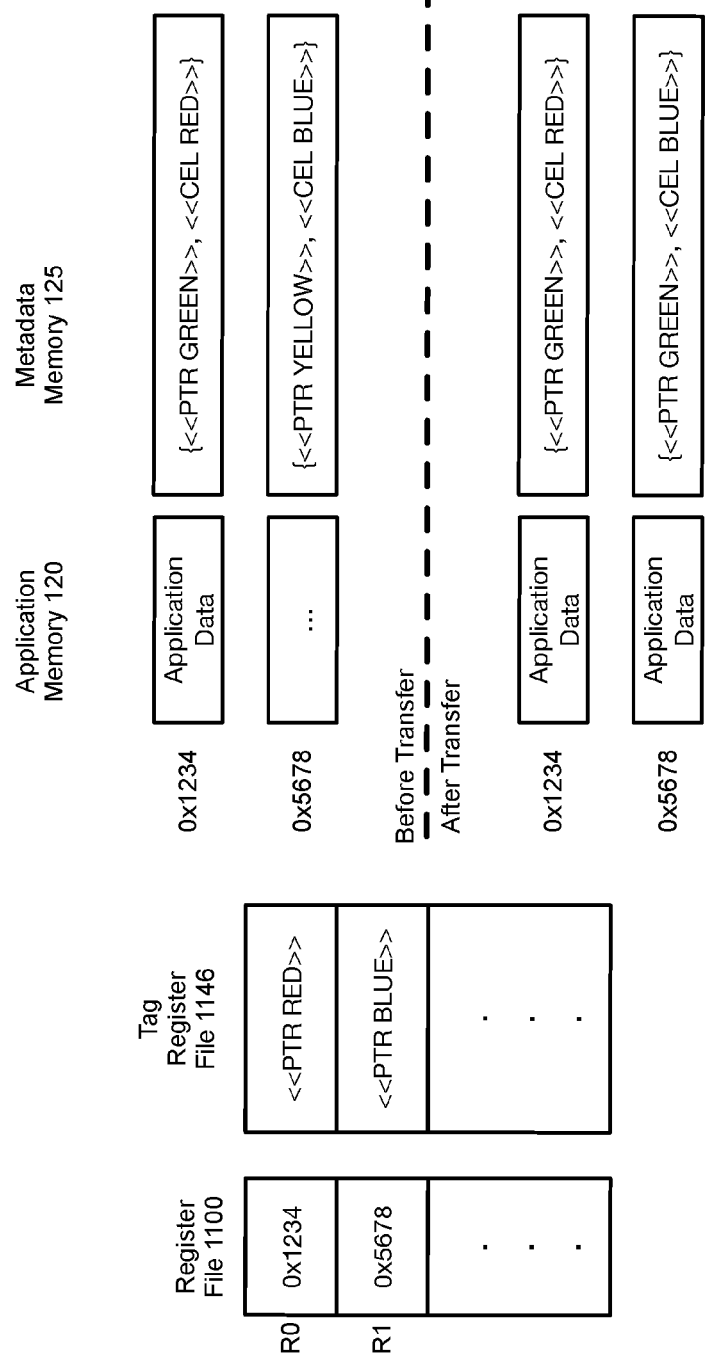
FIG. 11 shows an illustrative register file 1100, in accordance with some embodiments.

FIG. 11 shows an illustrative register file 1100, in accordance with some embodiments. The register file 1100 may be a register file of a DMA device, and may include a plurality of registers, such as registers R0, R1, etc.

In some embodiments, the DMA device may execute a data transfer instruction to copy data from a source location in an application memory (e.g., the illustrative application memory 120 shown in FIG. 1) to a target location in the same application memory or a different application memory. An address (e.g., 0x1234) of the source location may be stored in a first address register (e.g., R0), and an address (e.g., 0x5678) of the target location may be stored in a second data register (e.g., R1).

In the example of FIG. 11, each register in the register file 1100 has a corresponding tag register for storing metadata. The corresponding tag registers may be in an illustrative tag register file 1146. For instance, the register R0 may have a corresponding tag register in the tag register file 1146, and the corresponding tag register may store a binary representation <<PTR RED>> of a metadata label RED. Likewise, the register R1 may have a corresponding tag register in the tag register file 1146, and the corresponding tag register may store a binary representation <<PTR BLUE>> of a metadata label PTR BLUE.

Additionally, or alternatively, the application memory address 0x1234 stored in the address register R0 may have a corresponding address in a metadata memory (e.g., the illustrative metadata memory 125 shown in FIG. 1). Metadata associated with the application memory address 0x1234 may be stored at the corresponding metadata memory address. For instance, in the example of FIG. 11, a binary representation of metadata, {<<PTR GREEN>>, <<CEL RED>>}, may be stored at the metadata memory address corresponding to the application memory address 0x1234. Similarly, the application memory address 0x5678 stored in the address register R1 may have a corresponding address in the metadata memory 125. Metadata associated with the application memory address 0x5678 may be stored at the corresponding metadata memory address. For instance, in the example of FIG. 11, a binary representation of metadata, {<<PTR YELLOW>>, <<CEL BLUE>>}, may be stored at the metadata memory address corresponding to the application memory address 0x5678.

In some embodiments, tag processing hardware (e.g., the illustrative tag processing hardware 140 shown in FIG. 1, or a separate instance of tag processing hardware for checking DMA instructions) may apply one or more rules to determine whether a DMA instruction should be allowed to copy data stored at the application memory address 0x1234 to the application memory address 0x5678. Such a rule may be provided by a policy processor and/or a rule cache (e.g., the illustrative policy processor 150 and/or the illustrative rule cache 144 shown in FIG. 1). Additionally, or alternatively, symbolic rule processing may be used, for example, as described above in connection with FIGS. 5-6.

For example, an access control rule may be provided that checks whether flow metadata associated with the source address register R0 matches fixed metadata associated with the source location referenced by the application memory address 0x1234 stored in the source address register R0. In the example of FIG. 11, the metadata label PTR RED associated with the source address register R0 may be marked with 10 (flow), whereas the metadata label CEL RED associated with the application memory address 0x1234 may be marked with 01 (fixed).

Additionally, or alternatively, the access control rule may check whether flow metadata associated with the target address register R1 matches fixed metadata associated with the target location referenced by the application memory address 0x5678 stored in the target address register R0. In the example of FIG. 11, the metadata label PTR BLUE associated with the target address register R1 may be marked with 10 (flow), whereas the metadata label CEL BLUE associated with the application memory address 0x5678 may be marked with 01 (fixed).

One or more of the techniques described herein may be used to apply an access control rule against metadata labels. For instance, a rule cache lookup may be performed (e.g., using one or more of the techniques described above in connection with FIGS. 8-10), and/or a hardware logic block may be provided to check whether two input metadata labels (e.g., PTR RED and CEL RED) are counterparts of the same color (e.g., using one or more of the techniques described above in connection with FIGS. 5-6).

In some embodiments, an information flow rule for DMA may be provided. The inventors have recognized and appreciated that, in a DMA context, there may be no metadata update for the source location. By contrast, for the target location, fixed metadata may be preserved, whereas flow metadata may be updated (e.g., replaced by flow metadata from the source location). One or more of the techniques described herein may be used to apply such an information flow rule. For instance, a rule cache lookup may be performed (e.g., using one or more of the techniques described above in connection with FIGS. 8-10), and/or a hardware logic block may be provided to forward flow metadata without decoding (e.g., using one or more of the techniques described above in connection with FIGS. 5-6).

The inventors have further recognized and appreciated that, in some embodiments, one or more classification bits may be used to allow a rule cache to be omitted in favor of a small amount of hardware logic (e.g., the illustrative hardware accelerator 500 shown in FIG. 5). If the hardware logic encounters a combination of one or more input signals that the hardware logic is unable to process, the hardware logic may invoke a policy processor (e.g., the illustrative policy processor 150 shown in FIG. 1). In this manner, chip area may be reduced (e.g., by omitting the rule cache), and/or metadata processing speed may be improved on common inputs.

It should be appreciated that DMA transfers are not limited to memory-to-memory transfers. The techniques described herein for protecting DMA transfers may, additionally or alternatively, be used to protect other types of DMA transfers (e.g., to and/or from a peripheral device such as a USB storage device).

The inventors have also recognized and appreciated that, to check an instruction of a certain type, more than three input metadata labels may be presented to a rule cache. By contrast, many common instructions have only three input metadata labels (e.g., R0, R1, and mem in the examples discussed above in connection with FIGS. 3-10). Thus, memory space may be wasted by a rule cache that is able to accommodate four inputs.

For instance, some instruction sets have vector instructions, and a vector instruction may perform a plurality of operations across multiple memory locations over multiple clock cycles. In some embodiments, each such memory location may be associated with a respective metadata label, so that there may be heterogeneous metadata across the vector. In some embodiments, one or more classification bits (e.g., 00 for neither, 01 for fixed, 10 for flow, 11 for both) may be provided for the respective metadata labels, and one or more of the techniques described herein may be used to check the vector instruction against one or more policies.

In some embodiments, a vector instruction may include a multiply-accumulate (MAC) instruction, which may multiply each element of a vector with a scalar value, and accumulate the results. Three registers may be used: an address register holding an application memory address at which a current element of the vector is stored, a scalar register holding the scalar value, and an accumulator register for storing a result that has been accumulated thus far. A host processor (e.g., the illustrative host processor 110 in the example of FIG. 1) may step through the vector in a number of iterations. At each iteration, the host processor 110 may use the application memory address stored in the address register to retrieve the current element of the vector, multiply the current element with the scalar value stored in the scalar register, add the multiplication result to the current accumulation result stored in the accumulator register to obtain a new accumulation result, and store the new accumulation result in the accumulator register.

Thus, to check a MAC instruction, four input metadata labels may be presented to a rule cache, including a respective metadata label associated with each of the three registers, and a metadata label associated with the location referenced by the application memory address stored in the address register.

Accordingly, in some embodiments, one or more of the techniques described herein may be used to check a MAC instruction via multiple rule cache lookups. Each lookup may have fewer than four inputs, so that a narrower rule cache may be used. For instance, a first lookup may be performed to apply an access control rule, for example, to determine whether the MAC instruction should be allowed. The access control may be applied against flow metadata associated with the address register and fixed metadata associated with the location referenced by the application memory address stored in the address register. Additionally, or alternatively, a second lookup may be performed to apply an information flow rule, for example, to update flow metadata associated with the accumulator register based on flow metadata associated with the scalar register and/or flow metadata associated with the application memory address stored in the address register.

In some embodiments, one or both of these rule cache lookups may be replaced by processing performed by one or more hardware logic blocks, for example, as discussed above in connection with the examples of FIGS. 5-6, 8-10. For instance, if no input metadata label is marked with 10 (flow), the second rule cache lookup may be omitted, thereby reducing rule cache bandwidth by 50%.

It should be appreciated that vector instructions such as MAC are discussed above solely for purposes of illustration. The techniques described herein may be used to check any suitable instruction in addition to, or instead of, vector instructions. For instance, in some embodiments, PUSH and/or POP instructions which transfer multiple values between an in-memory stack and a register file may be checked using one or more of the techniques described herein.

Thus, the inventors have recognized and appreciated that fixed and/or flow classification bits may be used to allow certain checks to be performed by one or more simple hardware circuits, so that a narrower rule cache may be used. Additionally, or alternatively, such classification bits may be used to improve a performance of a wider rule cache. However, it should be appreciated that aspects of the present disclosure are not limited to using any particular types of classification bits, or any classification bit at all.

In some embodiments, one or more classification bits may be used to provide differentiated processing of metadata. For instance, one or more designated bits in a binary representation of metadata may indicate how a remaining portion of the binary representation should be parsed (e.g., by the illustrative hardware accelerator 500 in the example of FIG. 5). As an example, a 32-bit binary representation may include 4 designated bits which, when interpreted, may cause the hardware accelerator 500 to parse the remaining 28 bits into an 18-bit chunk and a 10-bit chunk. The 18-bit chunk may be interpreted as a 16-bit encoding of metadata augmented with two classification bits, whereas the 10-bit chunk may be interpreted as an 8-bit encoding of metadata augmented with two classification bits. The 16-bit encoding may represent a set of two metadata symbols (e.g., {A, B}), while the 8-bit encoding may represent a set of one metadata symbol (e.g., {C}).

Thus, the one or more designated bits may indicate how a set of metadata symbols (e.g., {A, B, C}) may be divided into two or more subsets (e.g., {A, B} and {C}). However, it should be appreciated that aspects of the present disclosure are not limited to parsing metadata in any particular manner, or at all.

In some embodiments, a hardware accelerator may process a chunk of metadata depending on one or more associated classification bits. For instance, referring to the above example, the two classification bits for the 16-bit encoding may indicate that the 16-bit encoding represents two metadata symbols to be passed along to a rule cache and/or a policy processor (e.g., the illustrative rule cache 144 and/or the illustrative policy processor 150 in the example of FIG. 1). Additionally, or alternatively, the classification bits for the 8-bit encoding may indicate that the 8-bit encoding represents a metadata symbol to be processed symbolically (e.g., as described above in connection with the example of FIG. 6).

Figure 12:
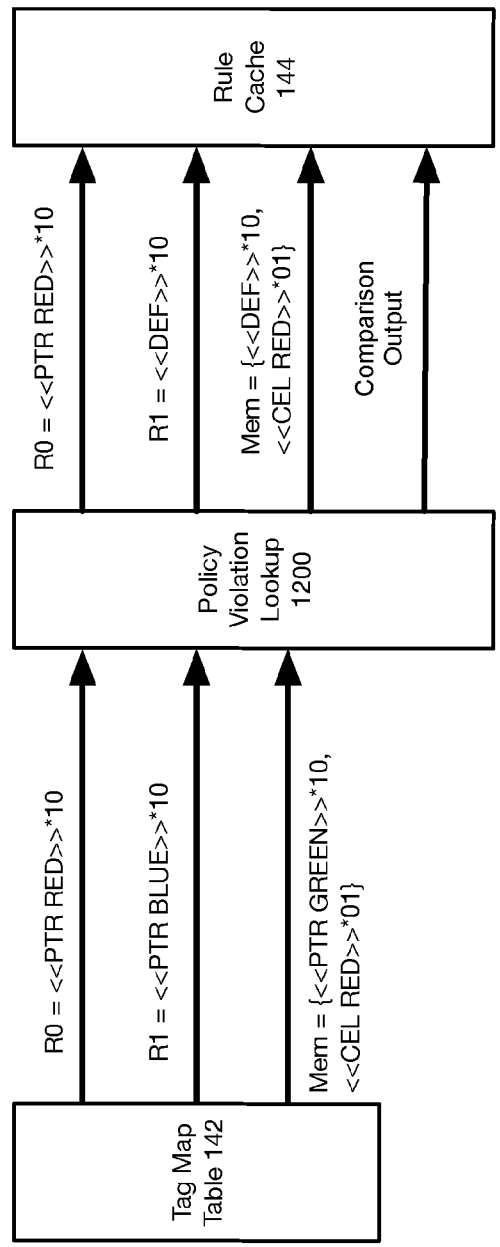
FIG. 12 shows an illustrative hardware logic block 1200, in accordance with some embodiments.

FIG. 12 shows an illustrative hardware logic block 1200, in accordance with some embodiments. The hardware logic block 1200 may be similar to the illustrative hardware logic block 900A in the example of FIG. 9. For instance, the hardware logic block 1200 may be configured to look up the illustrative rule cache 144 based on one or more metadata inputs. Additionally, or alternatively, the hardware logic block 1200 may provide a comparison output to the rule cache 144.

Similar to the hardware logic block 900A, the hardware logic block 1200 may receive three metadata inputs from tag fetch logic, which may include the tag map table 142. Referring to the example of FIG. 7B, the first input may be <<PTR RED>>*10, the metadata read from the tag register corresponding to the address register R0, whereas the second input may be <<PTR BLUE>>*10, the metadata read from the tag register corresponding to the data register R1, and the third input may be {<<PTR GREEN>>*10, <<CEL RED>>*01}, the metadata read from the metadata memory address corresponding to the application memory address 0x1234. The hardware logic block 1200 may use classification bits to identify flow metadata associated with the address register R0 (e.g., <<PTR RED>>) and fixed metadata associated with the application memory address 0x1234 (e.g., <<CEL RED>>).

In some embodiments, the binary representation <<PTR RED>> may include a first portion corresponding to the constructor PTR and a second portion corresponding to the color RED. This may be denoted <<PTR>><<RED>>. Likewise, the binary representation <<CEL RED>> may include a first portion corresponding to the constructor CEL and a second portion corresponding to the color RED. This may be denoted <<CEL>><<RED>>. The hardware logic block 1200 may be configured to parse such metadata to identify color portions. Additionally, or alternatively, the hardware logic block 1200 may be configured to perform a comparison on the color portions (e.g., using one or more of the techniques described above in connection with FIGS. 5-6).

In some embodiments, the hardware logic block 1200 may provide a comparison result to the rule cache 144, which may process one or more rule cache inputs based on the comparison result. For instance, the rule cache 144 may use classification bits to identify flow metadata associated with the address register R0 (e.g., <<PTR RED>>) and fixed metadata associated with the application memory address 0x1234 (e.g., <<CEL RED>>). In response to identifying such metadata, the rule cache 144 may check the comparison result received from the hardware logic block 1200.

If the comparison result indicates there is a match in color, the rule cache 144 may, before performing a lookup, mask color portions of the flow metadata associated with the address register R0 and/or the fixed metadata associated with the application memory address 0x1234 (e.g., using one or more of the techniques described above in connection with FIG. 9). For instance, the rule cache 144 may replace <<RED>> in <<PTR>><<RED>> and <<CEL>><<RED>> with some default metadata <<DEF>>, resulting in <<PTR>><<DEF>> and <<CEL>><<DEF>>, respectively.

Additionally, or alternatively, the hardware logic block 1200 may use classification bits to mask color portions of the flow metadata associated with the address register R0 and/or the fixed metadata associated with the application memory address 0x1234 (e.g., using one or more of the techniques described above in connection with FIG. 9). The rule cache 144 may perform a lookup based on masked inputs (e.g., <<PTR>><<DEF>> and <<CEL>><<DEF>>). Another hardware logic block may be provided to combine an output of the rule cache 144 and the comparison result received from the hardware logic block 1200.

In this manner, instead of storing an entry for each color value, the rule cache 144 may simply store a single entry, such as the following.

1) If R0=PTR DEF and mem=CEL DEF, then allow store instruction

Thus, concrete metadata values may be abstracted away from rule cache entries, and may instead be processed symbolically by the hardware logic block 1200. This may reduce rule cache pressure by a factor of N (the number of distinct color values). However, it should be appreciated that aspects of the present disclosure are not limited to masking color portions of metadata presented to a rule cache, or to having separate color portions at all.

The inventors have recognized and appreciated that, in some instances, determining whether an instruction is to be allowed may be done more expeditiously than determining updated metadata. For instance, determining whether to allow an instruction may simply involve comparing metadata symbols, which may be performed by a hardware logic block (e.g., as described above in connection with the example of FIG. 6). By contrast, determining updated metadata may involve looking up the rule cache 144 and/or invoking the policy processor 150 (e.g., for a DMA transfer).

The inventors have recognized and appreciated that it may be desirable to allow a result of executing a first instruction to be written back to memory (e.g., the illustrative application memory 120 in the example of FIG. 1) as soon as it is determined that the first instruction is to be allowed, even if updated metadata is not yet available. For example, this may allow a host processor (e.g., the illustrative host processor 110 in the example of FIG. 1) to proceed with one or more second instructions, while the updated metadata for the first instruction is still being looked up and/or computed.

However, the inventors have recognized and appreciated that, if a result of executing a first instruction is written to an application memory location before corresponding metadata is available, that result may be accessed by a second instruction before a metadata memory location corresponding to the application memory location is updated. As a result, the second instruction may be checked for policy violation based on out-of-date metadata stored at the corresponding metadata memory location, which may lead to failure to detect a policy violation.

Accordingly, in some embodiments, one or more designated bits may be provided in a binary representation of metadata to indicate whether a portion of the metadata is out of date. For instance, a tag register associated with a register storing a result of executing an instruction may store a binary representation of metadata that includes a first portion and a second portion, along with a classification bit for the first portion to indicate whether the first portion is out of date, and likewise for the second portion. Such a classification bit may be referred to herein as an out-of-date bit.

In some embodiments, the binary representation may further include two classification bits for the first portion indicating that the first portion includes fixed metadata, as well as two classification bits for the second portion indicating that the second portion includes flow metadata. Thus, when the result of executing the instruction is stored into the register, only the second portion of metadata (flow) may be updated.

In some embodiments, if it is determined that the instruction is to be allowed, but updated metadata for the second portion is not yet available, the out-of-date bit for the second portion of metadata (flow) may be set to 1. When the updated metadata becomes available (e.g., as returned by the rule cache 144 and/or the policy processor 150), the second portion of metadata may be updated, and the corresponding out-of-date bit may be set to 0.

In this manner, when it is determined that the instruction is to be allowed, the result of executing the instruction may be written to an application memory location, even if updated metadata is not yet available. For instance, a store instruction attempting to write the result to the application memory location may be checked based on the first portion of metadata associated with the result register (fixed), without regard to the second portion of metadata associated with the result register (flow). Assuming the out-of-date bit for the first portion of metadata remains 0, the store instruction may be allowed. As a result, the second portion of metadata, along with the associated out-of-date bit (which has been set to 1), may be carried over to a metadata memory location corresponding to the application memory location.

In some embodiments, tag processing hardware (e.g., by the illustrative tag processing hardware 140 in the example of FIG. 1) may be configured to check an out-of-date bit for a portion of metadata before using that portion of metadata to check policy compliance. Thus, if a subsequent instruction attempts to access the result from the application memory location while the out-of-date bit is still set to 1, the tag processing hardware 140 may determine that the application memory location is associated with out-of-date metadata, and may wait for the updated metadata to become available before checking the subsequent instruction.

In some embodiments, the tag processing hardware 140 may maintain a record of registers and/or application memory locations that are associated with out-of-date metadata. Such a record may include dependency information (e.g., one or more data transfer instructions involving out-of-date flow metadata). Thus, when the updated metadata becomes available for the result register, the tag processing hardware 140 may use the dependency information to map the result register to the application memory location at which the result has been stored, and may use the updated metadata to update the metadata memory location corresponding to the application memory location.

Additionally, or alternatively, the tag processing hardware 140 may maintain a record of classification bits associated with one or more registers and/or application memory locations. Such a record may be updated based on data dependencies among the one or more registers and/or application memory locations. For instance, for an arithmetic instruction with first and second operands, an OR operation may be performed on first and second flow bits that are associated, respectively, with registers storing the first and second operands. A result of the OR operation may be used to update a flow bit associated with a register storing a result of the arithmetic instruction. In this manner, one or more logical operations may be used to maintain an up-to-date record of classification bits for metadata being processed by the tag processing hardware 140.

The inventors have recognized and appreciated various advantages of maintaining an up-to-date record of classification bits. For instance, as described above in connection with FIG. 8, classification bits may be used to determine whether certain instructions may be quickly disposed of without further metadata processing (e.g., arithmetic instructions on application data with neither flow metadata nor fixed metadata). Therefore, a record of classification bits may be used to eliminate instructions to be checked by the tag processing hardware 140.

Illustrative configurations of various aspects of the present disclosure are provided below.

A1. A method for metadata processing, the method comprising acts of: receiving one or more metadata inputs; and processing the one or more metadata inputs to determine whether to allow an instruction, comprising: identifying one or more classification bits from a metadata input of the one or more metadata inputs; and processing the metadata input based on the one or more classification bits.

A2. The method of configuration A1, wherein: the one or more classification bits are identified without decoding the metadata input.

A3. The method of configuration A1, wherein: processing the metadata input based on the one or more classification bits comprises: parsing, based on the one or more classification bits, the metadata input into at least a first portion and a second portion.

A4. The method of configuration A3, wherein: processing the metadata input based on the one or more classification bits further comprises: processing the first portion and the second portion of the metadata input differently.

A5. The method of configuration A4, wherein: the one or more classification bits comprise one or more first classification bits; and the method further comprises: identifying one or more second classification bits from the first portion of the metadata input; and processing the first portion of the metadata input based on the one or more second classification bits.

A6. The method of configuration A1, wherein: processing the metadata input based on the one or more classification bits comprises: determining, based on the one or more classification bits, whether to perform a rule cache lookup based on the metadata input.

A7. The method of configuration A1, wherein: processing the metadata input based on the one or more classification bits comprises: determining, based on the one or more classification bits, whether to use at least one hardware logic block to process the metadata input.

A8. The method of configuration A7, wherein: the metadata input comprises a first metadata input; the one or more metadata inputs further comprises a second metadata input; and the at least one hardware logic block is configured to perform a comparison between a portion of the first metadata input and a portion of the second metadata input.

A9. The method of configuration A7, wherein: the at least one hardware logic block is programmable to perform different types of processing on the metadata input.

A10. The method of configuration A7, wherein: processing the metadata input based on the one or more classification bits further comprises: selecting, based on the one or more classification bits, the at least one hardware logic block from a plurality of hardware logic blocks.

A11. The method of configuration A10, wherein: the plurality of hardware logic blocks correspond, respectively, to a plurality of polices; and the method further comprises an act of: activating the at least one hardware logic block in response to at least one corresponding policy being loaded.

A12. The method of configuration A7, wherein: the at least one hardware logic block is configured to construct, based on the metadata input, respective inputs for a plurality of rule cache lookups.

A13. The method of configuration A12, wherein: the instruction comprises a vector instruction having a plurality of component operations; and the plurality of rule cache lookups correspond, respectively, to the plurality of component operations.

A14. The method of configuration A12, wherein: the instruction comprises a direct memory access instruction having at least one load component and at least one store component; and the plurality of rule cache lookups comprise at least first and second lookups corresponding, respectively, to the at least one load component and the at least one store component.

A15. The method of configuration A1, wherein: the metadata input is associated with a register or memory location used by the instruction; and the one or more classification bits indicate the metadata input is for determining whether the instruction is allowed to use the register or memory location.

A16. The method of configuration A15, wherein: processing the metadata input based on the one or more classification bits comprises: using the metadata input to construct an input for looking up a rule cache storing one or more allowed metadata input patterns.

A17. The method of configuration A1, wherein: the metadata input is associated with a first register or memory location used by the instruction; and the one or more classification bits indicate the metadata input is for performing a metadata update for a second register or memory location used by the instruction.

A18. The method of configuration A17, wherein: processing the metadata input based on the one or more classification bits comprises: using the metadata input to construct an input for looking up a rule cache storing one or more entries that map metadata input patterns to metadata output patterns.

B1. A method for metadata processing, the method comprising acts of: receiving an application memory address; accessing mapping information associated with the application memory address; and using the mapping information to retrieve metadata from a memory region of a plurality of metadata memory regions, wherein the plurality of metadata memory regions correspond, respectively, to a plurality of metadata classifications.

B2. The method of configuration B1, wherein: the metadata retrieved from the memory region is in a representation for storage; and the method further comprises an act of:
transforming the metadata into a representation for processing, wherein the representation for processing comprises one or more classification bits based on the metadata classification of the metadata memory region from which the metadata is retrieved.

B3. The method of configuration B2, wherein: transforming the metadata comprises augmenting the representation for storage with the one or more classification bits based on the metadata classification of the metadata memory region from which the metadata is retrieved.

B4. The method of configuration B2, wherein: the representation for storage has a first length; the representation for processing has a second length different from the first length; transforming the metadata comprises shifting the one or more classification bits from a first position in the representation for storage to a second position in the representation for processing.

B5. The method of configuration B2, wherein: the one or more classification bits indicate the metadata is for determining whether an instruction is allowed to use a memory location identified by the application memory address.

B6. The method of configuration B2, wherein: the application memory address identifies a first memory location used by an instruction; and the one or more classification bits indicate the metadata is for performing a metadata update for a second memory location or a register used by the instruction.

B7. The method of configuration B1, wherein: the mapping information comprises first mapping information; the metadata comprises first metadata; the memory region comprises a first memory region; and the method further comprises acts of: accessing second mapping information associated with the application memory address; and using the second mapping information to retrieve second metadata from a second memory region of the plurality of metadata memory regions.

B8. The method of configuration B7, wherein: the metadata classification of the first metadata memory region comprises a first metadata classification; the first metadata classification indicates the first metadata is for determining whether an instruction is allowed to use a memory location identified by the application memory address; and the method further comprises an act of: using the first metadata to construct an input for looking up a rule cache storing one or more allowed metadata input patterns.

B9. The method of configuration B7, wherein: the application memory address identifies a first memory location used by an instruction; the metadata classification of the second metadata memory region comprises a second metadata classification; the second metadata classification indicates the second metadata is for performing a metadata update for a second register or memory location used by the instruction; and the method further comprises an act of: using the second metadata to construct an input for looking up a rule cache storing one or more entries that map metadata input patterns to metadata output patterns.

B10. The method of configuration B7, wherein: the first mapping information is accessed from a first entry in a tag map table; the first entry includes a continue bit; and the method further comprises an act of: determining, based on the continue bit in the first entry, whether to access another entry in the tag map table.

B11. The method of configuration B10, wherein: the second mapping information is accessed from a second entry in the tag map table in response to determining that another entry is to be accessed.

C1. A method for metadata processing, the method comprising acts of: identifying at least one metadata symbol from a metadata label; identifying at least one attribute value associated with the at least one metadata symbol; using the at least one attribute value to determine one or more classification bits; generating a binary representation for the metadata label, wherein: the binary representation comprises at least one portion representing the at least one metadata symbol; and the binary representation associates the one or more classification bits with the at least one portion representing the at least one metadata symbol.

C2. The method of configuration C1, wherein: the at least one attribute value is identified based on at least one data type of the at least one metadata symbol.

C3. The method of configuration C1, wherein: the at least one metadata symbol comprises a constructor and one or more arguments; and identifying at least one attribute value associated with the at least one metadata symbol comprises: identifying a first attribute value associated with the constructor; and/or identifying a second attribute value associated with an argument of the one or more arguments.

C4. The method of configuration C3, wherein: the first attribute value indicates the at least one metadata symbol is for determining whether an instruction is allowed.

C5. The method of configuration C3, wherein: the first attribute value indicates the at least one metadata symbol is for performing metadata update.

C6. The method of configuration C3, wherein: the second attribute value indicates the argument is for comparison against another value of a same data type as the argument.

C7. The method of configuration C6, wherein: the data type of the argument comprises a set of color values; and the method further comprises acts of: conducting test runs of at least one software application, the at least one software application comprising a plurality of software components; assigning, to each of the plurality of software components, a color value from the set of color values; collecting statistics on the color values from the test runs of the at least one software application; and reassigning, based on the collected statistics, the color values to the plurality of software components.

C8. The method of configuration C3, wherein: the at least one attribute value comprises the first attribute value and the second attribute value; and using the at least one attribute value to determine one or more classification bits comprises encoding the first and second attribute values into the one or more classification bits.

D1. A method for metadata processing, the method comprising acts of: identifying one or more registers and/or one or more application memory locations used by an instruction; accessing one or more classification bits for the one or more registers and/or one or more application memory locations; and determining, based on the one or more classification bits, whether to allow the instruction.

D2. The method of configuration D1, wherein: the one or more classification bits are accessed from a record of classification bits for a plurality of registers and/or application memory locations; the one or more registers and/or one or more application memory locations used by the instruction comprise one or more input registers and/or one or more input application memory locations; and the method further comprises an act of: in response to determining that the instruction is allowed, updating at least one entry in the record, the at least one entry corresponding to one or more output registers and/or one or more output application memory locations used by the instruction.

D3. The method of configuration D2, wherein: the one or more input registers and/or one or more input application memory locations comprise a first input register or application memory location and a second input register or application memory location; the one or more classification bits comprise one or more first classification bits for the first input register or application memory location; the one or more classification bits further comprise one or more second classification bits for the second input register or application memory location; and updating the at least one entry comprises acts of: performing at least one logical operation on the one or more first classification bits and/or the one or more second classification bits to obtain one or more third classification bits; and storing the one or more third classification bits in the at least one entry.

D4. The method of configuration D1, wherein: the instruction is determined to be allowed based on the one or more classification bits, without performing a rule cache lookup or invoking a policy processor.

D5. The method of configuration D1, wherein: the instruction is not determined to be allowed based on the one or more classification bits, and the method further comprises an act of: accessing additional metadata associated with the one or more registers and/or one or more application memory locations; and performing a rule cache lookup and/or invoking a policy processor based on the additional metadata to determine if the instruction is allowed.

E1. A system comprising circuitry and/or one or more processors programmed by executable instructions, wherein the circuitry and/or the one or more programmed processors are configured to perform the method of any of configurations A1-A18, B1-B11, C1-C8.

E2. At least one computer-readable medium having stored thereon at least one netlist for the circuitry of configuration E1.

E3. At least one computer-readable medium having stored thereon at least one hardware description that, when synthesized, produces the at least one netlist of configuration E2.

E4. The at least one computer-readable medium of configuration E3, wherein the at least one hardware description is in an encrypted form.

E5. At least one computer-readable medium having stored thereon the executable instructions of configuration E1.

Figure 13:
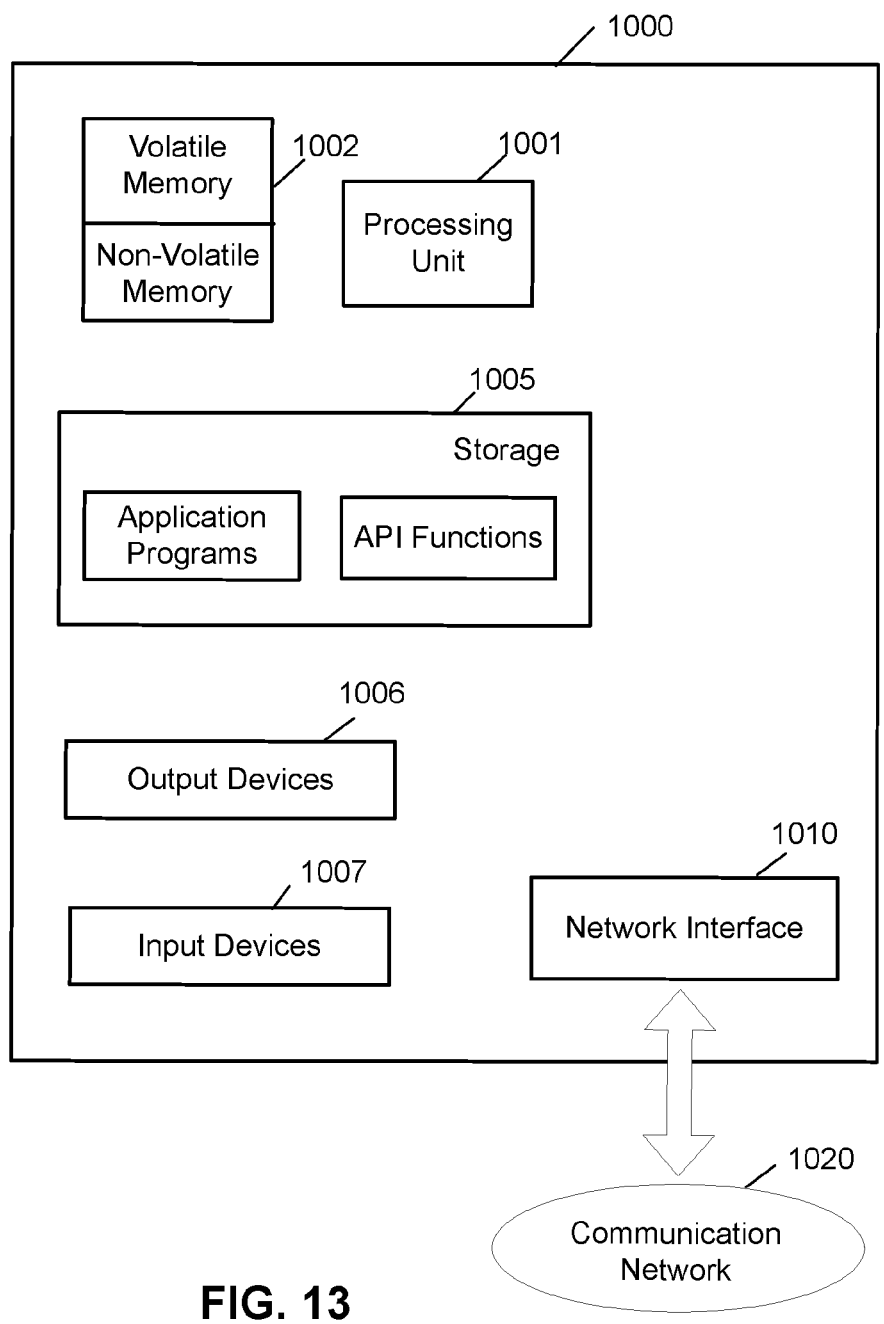
FIG. 13 shows, schematically, an illustrative computer 1000 on which any aspect of the present disclosure may be implemented.

FIG. 13 shows, schematically, an illustrative computer 1000 on which any aspect of the present disclosure may be implemented.

In the example shown in FIG. 13, the computer 1000 includes a processing unit 1001 having one or more processors and a non-transitory computer-readable storage medium 1002 that may include, for example, volatile and/or non-volatile memory. The memory 1002 may store one or more instructions to program the processing unit 1101 to perform any of the functions described herein. The computer 1000 may also include other types of non-transitory computer-readable medium, such as storage 1005 (e.g., one or more disk drives) in addition to the system memory 1002. The storage 1005 may also store one or more application programs and/or resources used by application programs (e.g., software libraries), which may be loaded into the memory 1002.

The computer 1000 may have one or more input devices and/or output devices, such as devices 1006 and 1007 illustrated in FIG. 13. These devices may be used, for instance, to present a user interface. Examples of output devices that may be used to provide a user interface include printers and display screens for visual presentation of output, and speakers and other sound generating devices for audible presentation of output. Examples of input devices that may be used for a user interface include keyboards and pointing devices (e.g., mice, touch pads, and digitizing tablets). As another example, the input devices 1007 may include a microphone for capturing audio signals, and the output devices 1006 may include a display screen for visually rendering, and/or a speaker for audibly rendering, recognized text.

In the example shown in FIG. 13, the computer 1000 also includes one or more network interfaces (e.g., the network interface 1010) to enable communication via various networks (e.g., the network 1020). Examples of networks include a local area network (e.g., an enterprise network) and a wide area network (e.g., the Internet). Such networks may be based on any suitable technology and operate according to any suitable protocol, and may include wireless networks and/or wired networks (e.g., fiber optic networks).

Having thus described several aspects of at least one embodiment, it is to be appreciated that various alterations, modifications, and improvements will readily occur to those skilled in the art. Such alterations, modifications, and improvements are intended to be within the spirit and scope of the present disclosure. Accordingly, the foregoing descriptions and drawings are by way of example only.

The above-described embodiments of the present disclosure may be implemented in any of numerous ways. For example, the embodiments may be implemented using hardware, software, or a combination thereof. When implemented in software, the software code may be executed on any suitable processor or collection of processors, whether provided in a single computer, or distributed among multiple computers.

Also, the various methods or processes outlined herein may be coded as software that is executable on one or more processors running any one of a variety of operating systems or platforms. Such software may be written using any of a number of suitable programming languages and/or programming tools, including scripting languages and/or scripting tools. In some instances, such software may be compiled as executable machine language code or intermediate code that is executed on a framework or virtual machine. Additionally, or alternatively, such software may be interpreted.

The techniques disclosed herein may be embodied as a non-transitory computer-readable medium (or multiple computer-readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more processors, perform methods that implement the various embodiments of the present disclosure discussed above. The computer-readable medium or media may be transportable, such that the program or programs stored thereon may be loaded onto one or more different computers or other processors to implement various aspects of the present disclosure as discussed above.

The terms "program" or "software" are used herein to refer to any type of computer code or set of computer-executable instructions that may be employed to program one or more processors to implement various aspects of the present disclosure as discussed above. Moreover, it should be appreciated that according to one aspect of this embodiment, one or more computer programs that, when executed, perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Program modules may include routines, programs, objects, components, data structures, etc. that perform particular tasks or implement particular abstract data types. Functionalities of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields to locations in a computer-readable medium that convey relationship between the fields. However, any suitable mechanism may be used to establish a relationship between information in fields of a data structure, including through the use of pointers, tags, or other mechanisms that establish relationship between data elements.

Various features and aspects of the present disclosure may be used alone, in any combination of two or more, or in a variety of arrangements not specifically discussed in the embodiments described in the foregoing, and are therefore not limited to the details and arrangement of components set forth in the foregoing description or illustrated in the drawings. For example, aspects described in one embodiment may be combined in any manner with aspects described in other embodiments.

Also, the techniques disclosed herein may be embodied as methods, of which examples have been provided. The acts performed as part of a method may be ordered in any suitable way. Accordingly, embodiments may be constructed in which acts are performed in an order different from illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

What is claimed is:

1. A method for metadata processing, the method comprising acts of:
   receiving one or more metadata inputs associated with an instruction, wherein:
      the one or more metadata inputs comprises a metadata input from a metadata storage location corresponding to an application data storage location used by the instruction;
      the metadata input comprises one or more first bit positions and one or more second bit positions;
      the one or more first bit positions of the metadata input encode at least one metadata symbol; and
      the one or more second bit positions of the metadata input comprise one or more classification bits indicating one or more attribute values associated with the at least one metadata symbol; and
   processing the one or more metadata inputs to determine whether to allow the instruction, comprising:
      identifying the one or more classification bits from the metadata input; and
      processing the metadata input based on the one or more classification bits.

2. The method of claim 1, wherein:
the one or more classification bits are identified without decoding the one or more first bit positions of the metadata input that encode the at least one metadata symbol.

3. The method of claim 1, wherein:
the at least one metadata symbol comprises at least one first metadata symbol and at least one second metadata symbol; and
processing the metadata input based on the one or more classification bits comprises:
   parsing, based on the one or more classification bits, the one or more first bit positions of the metadata input into at least a first portion and a second portion encoding, respectively, the at least one first metadata symbol and the at least one second metadata symbol.

4. The method of claim 3, wherein:
processing the metadata input based on the one or more classification bits further comprises:
   processing the first portion of the metadata input in a first manner; and
   processing the second portion of the metadata input in a second manner different from the first manner.

5. The method of claim 4, wherein:
the one or more classification bits comprise one or more first classification bits; and
the method further comprises:
   identifying one or more second classification bits from the first portion of the metadata input; and
   processing the first portion of the metadata input based on the one or more second classification bits.

6. The method of claim 1, wherein:
processing the metadata input based on the one or more classification bits comprises:
   determining, based on the one or more classification bits, whether to perform a rule query based on the metadata input.

7. The method of claim 1, wherein:
processing the metadata input based on the one or more classification bits comprises:
   determining, based on the one or more classification bits, whether to use at least one hardware logic block to process the metadata input.

8. The method of claim 7, wherein:
the metadata input comprises a first metadata input;
the one or more metadata inputs further comprises a second metadata input; and
the at least one hardware logic block is configured to perform a comparison between a portion of the first metadata input and a portion of the second metadata input.

9. The method of claim 7, wherein:
the at least one hardware logic block is programmable at run time to perform different types of processing on the metadata input.

10. The method of claim 7, wherein:
determining, based on the one or more classification bits, whether to use at least one hardware logic block comprises:
   selecting, based on the one or more classification bits, the at least one hardware logic block from a plurality of hardware logic blocks.

11. The method of claim 10, wherein:
the plurality of hardware logic blocks correspond, respectively, to a plurality of polices; and
the method further comprises an act of:
   activating the at least one hardware logic block in response to at least one corresponding policy being loaded.

12. The method of claim 7, wherein:
the at least one hardware logic block is configured to construct, based on the metadata input, respective inputs for a plurality of rule queries.

13. The method of claim 12, wherein:
the instruction comprises a vector instruction having a plurality of component operations; and
the plurality of rule queries correspond, respectively, to the plurality of component operations.

14. The method of claim 12, wherein:
the instruction comprises a direct memory access instruction having at least one load component and at least one store component; and the plurality of rule queries comprise at least first and second queries corresponding, respectively, to the at least one load component and the at least one store component.

15. The method of claim 1, wherein:
the application data storage location comprises a register or memory location used by the instruction; and
the one or more classification bits indicate the metadata input is for determining whether the instruction is allowed to use the register or memory location.

16. The method of claim 15, wherein:
processing the metadata input based on the one or more classification bits comprises:
    using the metadata input to construct an input for a rule query to determine whether the metadata input matches one or more allowed input metadata patterns.

17. The method of claim 1, wherein:
the application data storage location comprises a first register or memory location used by the instruction; and
the one or more classification bits indicate the metadata input is for performing a metadata update for a second register or memory location used by the instruction.

18. The method of claim 17, wherein:
processing the metadata input based on the one or more classification bits comprises:
    using the metadata input to construct an input for a rule query to determine whether the metadata input matches an entry that maps an input metadata pattern to an output metadata pattern.

19. The method of claim 1, wherein:
the one or more classification bits comprises one or more first classification bits indicating that a first portion of the metadata input relates to content stored at a location; and
the one or more classification bits further comprises one or more second classification bits indicating that a second portion of the metadata input relates to the location at which the content is stored.

20. The method of claim 1, wherein:
processing the metadata input based on the one or more classification bits comprises:
applying one or more first update semantics to a first portion of the metadata input; and
applying one or more second update semantics to a second portion of the metadata input, wherein the one or more second update semantics are different from the one or more first update semantics.

21. The method of claim 1, wherein:
the one or more first bit positions of the metadata input comprise a first portion and a second portion;
the one or more classification bits comprise one or more first classification bits associated with the first portion; and processing the metadata input based on the one or more classification bits comprises:
    modifying the first portion based on the one or more first classification bits.

22. A system comprising circuitry configured to perform a method comprising acts of:
receiving one or more metadata inputs associated with an instruction, wherein:
    the one or more metadata inputs comprises a metadata input from a metadata storage location corresponding to an application data storage location used by the instruction;
    the metadata input comprises one or more first bit positions and one or more second bit positions;
    the one or more first bit positions of the metadata input encode at least one metadata symbol; and
    the one or more second bit positions of the metadata input comprise one or more classification bits indicating one or more attribute values associated with the at least one metadata symbol; and
processing the one or more metadata inputs to determine whether to allow the instruction, comprising:
    identifying the one or more classification bits from the metadata input of the one or more metadata inputs; and
    processing the metadata input based on the one or more classification bits.

23. At least one non-transitory computer-readable storage medium having stored thereon at least one hardware description which, when synthesized, produces at least one netlist for circuitry configured to perform a method comprising acts of:
receiving one or more metadata inputs associated with an instruction, wherein:
    the one or more metadata inputs comprises a metadata input from a metadata storage location corresponding to an application data storage location used by the instruction;
    the metadata input comprises one or more first bit positions and one or more second bit positions;
    the one or more first bit positions of the metadata input encode at least one metadata symbol; and
    the one or more second bit positions of the metadata input comprise one or more classification bits indicating one or more attribute values associated with the at least one metadata symbol; and
processing the one or more metadata inputs to determine whether to allow the instruction, comprising:
    identifying the one or more classification bits from the metadata input of the one or more metadata inputs; and
    processing the metadata input based on the one or more classification bits.

* * * * *